(12) United States Patent
Du et al.

(10) Patent No.: US 11,210,838 B2
(45) Date of Patent: Dec. 28, 2021

(54) FUSING, TEXTURING, AND RENDERING VIEWS OF DYNAMIC THREE-DIMENSIONAL MODELS

(71) Applicant: Microsoft Technology Licensing, LLC, Redmond, WA (US)

(72) Inventors: Ruofei Du, College Park, MD (US); Benjamin F. Cutler, Seattle, WA (US); Wen-Yu Chang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/671,402

(22) Filed: Nov. 1, 2019

(65) Prior Publication Data

US 2020/0066026 A1 Feb. 27, 2020

Related U.S. Application Data

(63) Continuation of application No. 15/863,799, filed on Jan. 5, 2018, now Pat. No. 10,504,274.

(51) Int. Cl.
 *G06T 15/04* (2011.01)
 *G06T 17/00* (2006.01)
(52) U.S. Cl.
 CPC .............. *G06T 15/04* (2013.01); *G06T 17/00* (2013.01)
(58) Field of Classification Search
 CPC ......... G06T 15/04; G06T 15/20; G06T 17/00; H04N 5/3415; H04N 7/15–157; H04L 12/1813–1831
 See application file for complete search history.

(56) References Cited

U.S. PATENT DOCUMENTS

| 6,961,061 B1 * | 11/2005 | Johnson ............... G06T 15/503 345/473 |
| 2007/0091921 A1 * | 4/2007 | Elliot ..................... H04L 47/29 370/468 |

(Continued)

FOREIGN PATENT DOCUMENTS

KR        101769118 B1 *  8/2017   ............. G06T 19/00

OTHER PUBLICATIONS

Orts-Escolano, Sergio, et al. "Holoportation: Virtual 3d teleportation in real-time." Proceedings of the 29th Annual Symposium on User Interface Software and Technology. 2016. (Year: 2016).*

(Continued)

*Primary Examiner* — Daniel F Hajnik
(74) *Attorney, Agent, or Firm* — Klarquist Sparkman, LLP

(57) ABSTRACT

Various approaches described herein improve the quality of results when fusing depth maps to generate dynamic three-dimensional ("3D") models, applying texture details to dynamic 3D models, or rendering views of textured, dynamic 3D models. For example, when fusing depth maps to generate a dynamic 3D model, a fusion component can also incorporate intrinsic color values for points of the dynamic 3D model, potentially making the dynamic 3D model more accurate, especially for areas in which depth values are not reliable or not available. As another example, when applying texture details, a rendering component can apply smoothed, viewpoint-dependent texture weights to texture values from different texture maps, which can reduce blurring and avoid the introduction of noticeable seams. As another example, a rendering component can apply special effects indicated by metadata to rendered views, thereby allowing a content provider to assert artistic control over presentation.

25 Claims, 26 Drawing Sheets
(15 of 26 Drawing Sheet(s) Filed in Color)

(56) References Cited

U.S. PATENT DOCUMENTS

| | | | |
|---|---|---|---|
| 2010/0302244 A1* | 12/2010 | Best | G06T 19/00 345/426 |
| 2011/0211036 A1* | 9/2011 | Tran | G06F 3/005 348/14.08 |
| 2013/0232430 A1* | 9/2013 | Reitan | G09G 3/003 715/765 |
| 2014/0111534 A1* | 4/2014 | Niles | G06T 15/60 345/589 |
| 2016/0054798 A1* | 2/2016 | Messingher | G06F 3/016 345/156 |
| 2016/0134840 A1* | 5/2016 | McCulloch | G06K 9/00208 348/14.03 |
| 2018/0246698 A1* | 8/2018 | Huang | A63F 13/65 |
| 2018/0286106 A1* | 10/2018 | Apodaca | G06T 3/40 |
| 2019/0378305 A1* | 12/2019 | Fitzgerald | H04N 19/124 |

OTHER PUBLICATIONS

Cooperstock, Jeremy R. "Multimodal telepresence systems." IEEE Signal Processing Magazine 28.1 (2010): 77-86. (Year: 2010).*

Akenine-Moller, Thomas and Eric Haines. "Real-Time Rendering." 2nd ed. (2002), pp. 669-674. (Year: 2002).*

Xia, Pengye, and Klara Nahrstedt. "Object-level bandwidth adaptation framework for 3D tele-immersive system." 2013 IEEE International Conference on Multimedia and Expo (ICME). IEEE, 2013. (Year: 2013).*

Communication pursuant to Rules 161(1) and 162 EPC dated Aug. 12, 2020, from European Patent Application No. 18837107.4, 3 pp.

\* cited by examiner software 180 implementing one or more innovations for fusing, texturing, and/or rendering views of dynamic 3D models

301

302

303

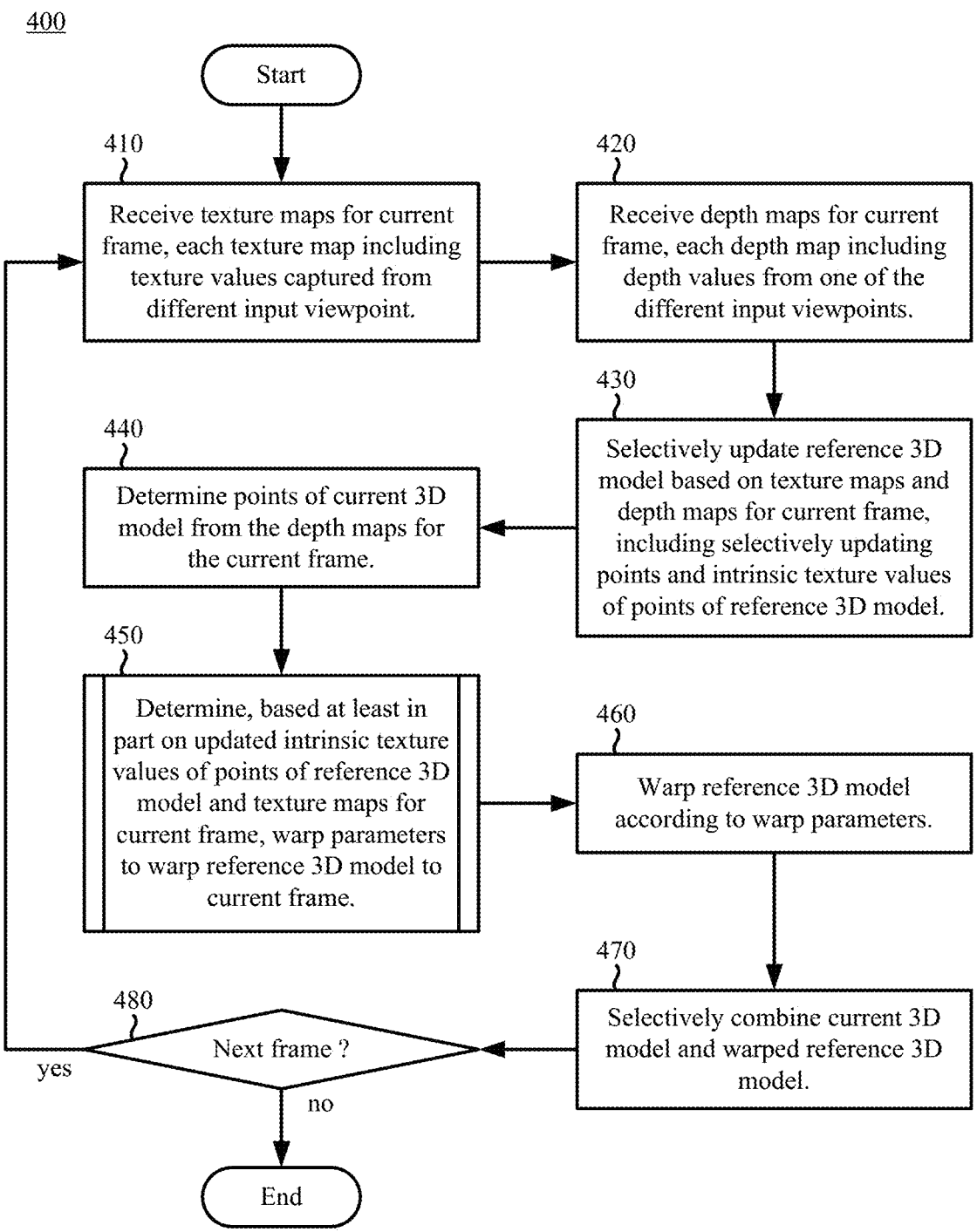

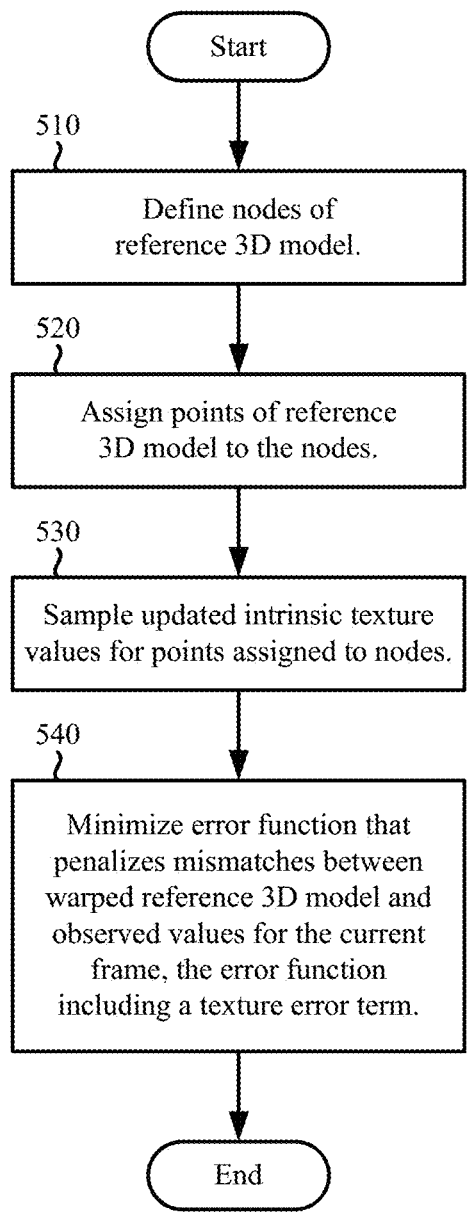

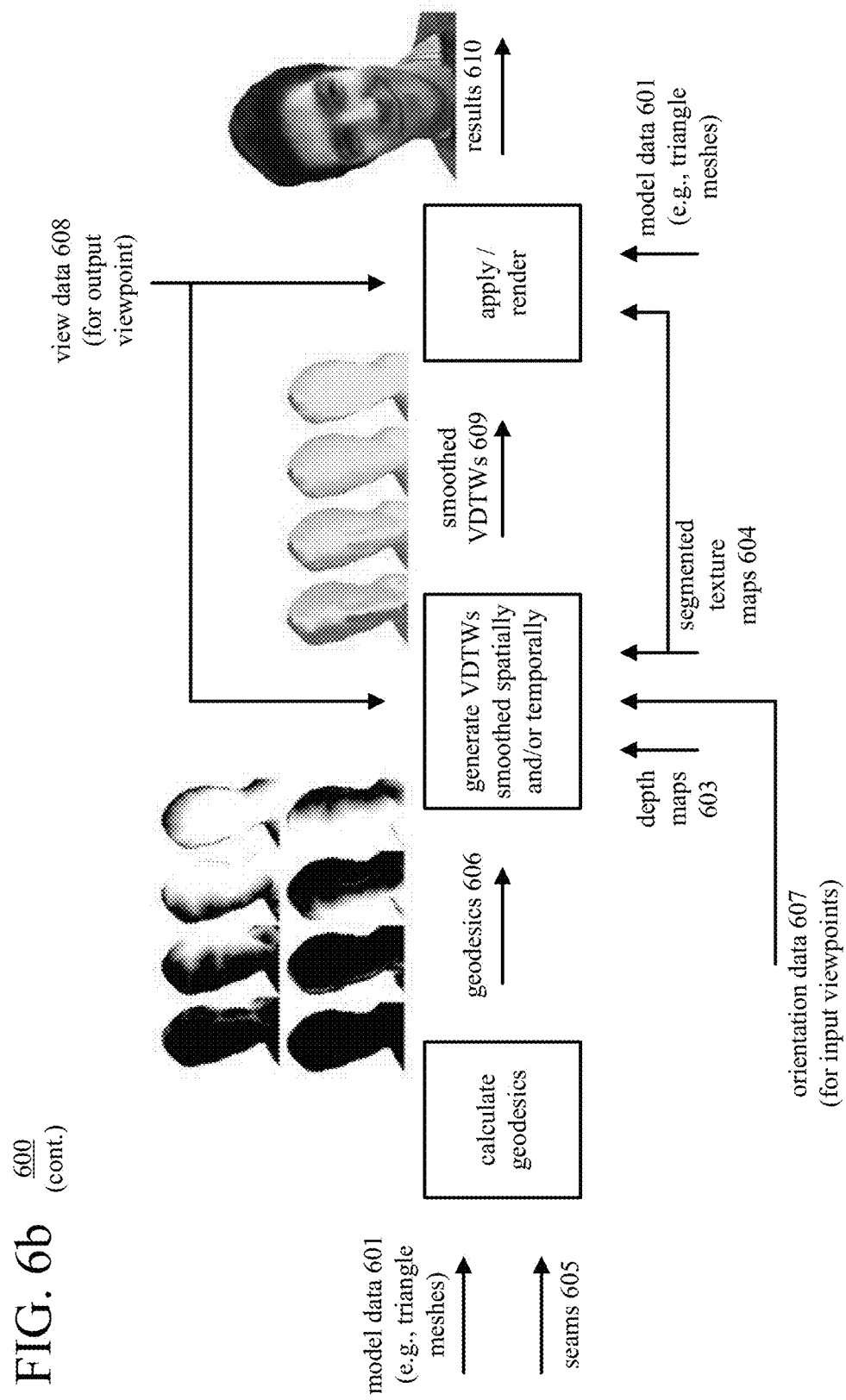
FIG. 6b  600 (cont.)

Features for one way to calculate geodesic distance
values, which can be used to smooth texture weights.

801

802

803

1000

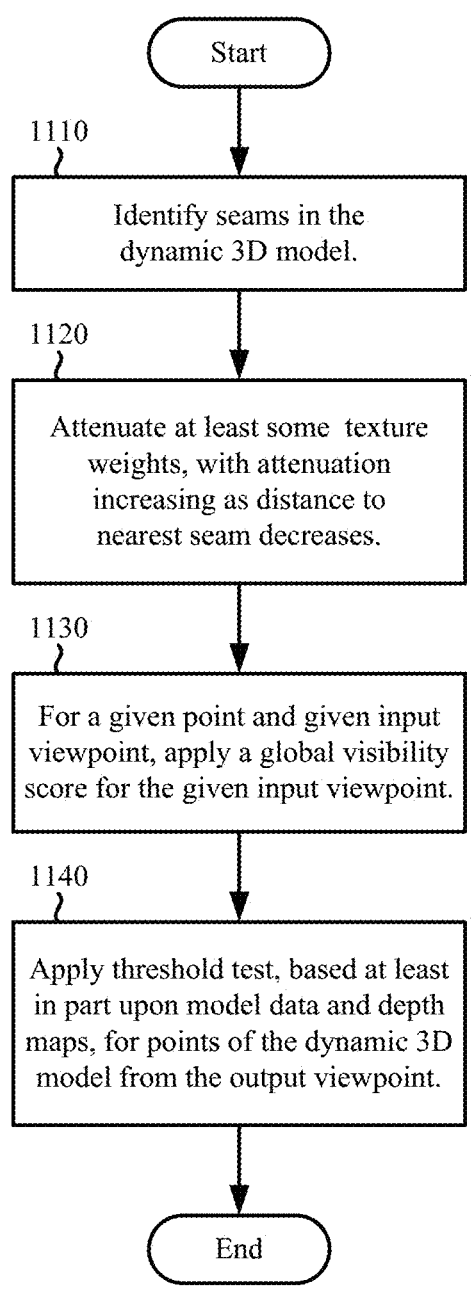
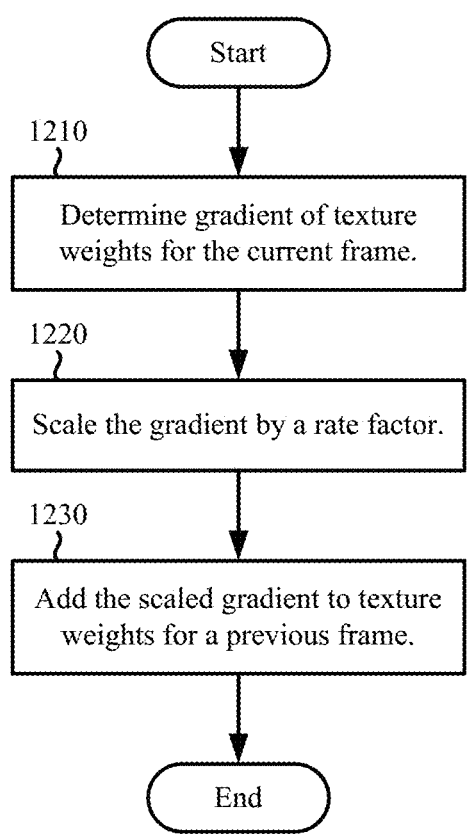

Start

1310 — Receive texture maps for current frame, each texture map including texture values (e.g., color values) captured from different input viewpoint.

1320 — Receive model data for current frame, the model data including points (e.g., vertices of triangles of a mesh) of the dynamic 3D model.

1330 — Determine viewpoint-dependent texture weights for current frame for at least some of the points of the dynamic 3D model, including, for a given point, for a given input viewpoint among the different input viewpoints, determining a base weight based at least in part on the input viewpoint and an output viewpoint.

1340 — For the at least some of the points, apply corresponding texture values according to the viewpoint-dependent texture weights for the current frame.

1350 — Render a view of the textured, dynamic 3D model from an output viewpoint.

1360 Next frame ? — yes (loop back to 1310) / no

End

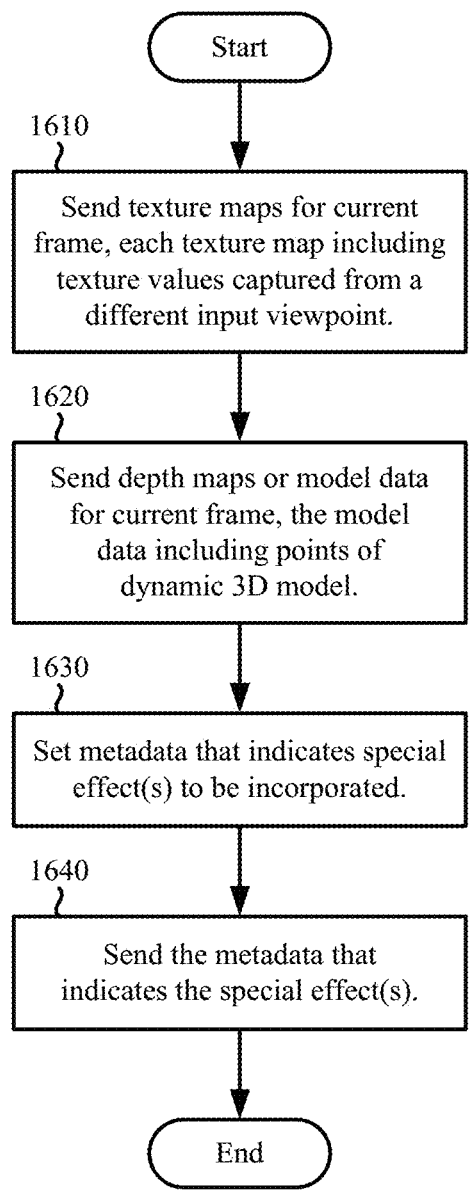
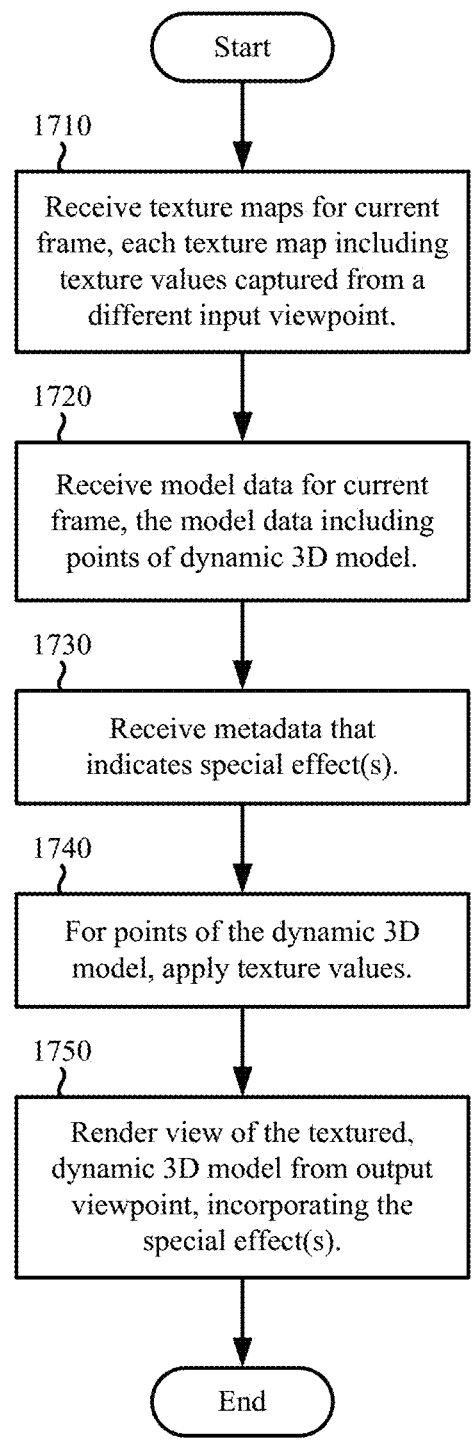

FUSING, TEXTURING, AND RENDERING VIEWS OF DYNAMIC THREE-DIMENSIONAL MODELS

CROSS REFERENCE TO RELATED APPLICATIONS

This application is a continuation of U.S. patent application Ser. No. 15/863,799, filed Jan. 5, 2018, the disclosure of which is hereby incorporated by reference.

BACKGROUND

Virtual reality ("VR") technology simulates a user's physical presence in a synthetic, computer-generated environment. Often, VR equipment includes a VR headset with a display screen and headphones to present realistic images and sounds for the computer-generated environment. With VR technology, a user can look around the computer-generated environment and, in many cases, navigate through and interact with features of the environment. In some VR systems, a user can communicate with one or more other, remote users, who are virtually present in the environment. Similarly, augmented reality ("AR") technology layers artificial, computed-generated content over camera input and/or audio input, thereby blending what the user sees and hears in their real surroundings with the artificially-generated content.

Although some VR systems generate a synthetic environment from scratch, many VR systems and AR systems create a three-dimensional ("3D") model of an actual, physical environment using equipment that captures details of the physical environment. For example, the locations of objects in the physical environment are estimated using depth cameras from different viewpoints (perspectives) around the physical environment. In "depth maps" for a frame (e.g., associated with a timestamp or time slice), the depth cameras capture depth values that indicate how far objects are from the respective depth cameras. From these depth values in depth maps for the frame, the VR/AR system creates a 3D model of the physical environment and objects in it. The 3D model can represent the surfaces of objects as vertices in 3D space, which are connected to form triangles that approximately cover the surfaces of the objects. The VR/AR system can track the 3D model as it changes over time, from frame-to-frame, generating a dynamic 3D model, which provides a deformable, volumetric representation of the objects. A dynamic 3D model—adding the dimension of time to 3D spatial reconstruction—can provide the foundation for 4D reconstruction technology in diverse applications such as 3D telepresence for business conferencing or personal communication, broadcasting of live concerts or other events, and remote education. Typically, a VR/AR system also uses video cameras to record texture details (e.g., color values) for the surfaces of objects in the physical environment from different viewpoints. Such texture details can be applied ("textured" or "stitched") to surfaces of a dynamic 3D model when producing ("rendering") views of the 3D model for output.

In recent years, VR technology and AR technology have become more common. The commoditization of VR technology and AR technology, together with the availability of inexpensive depth camera technology, have increased interest in ways to generate accurate, dynamic 3D models of a physical environment with spatiotemporal performance capture. In particular, some recent systems are able to fuse multiple depth maps in real-time into dynamic 3D models that provide deformable, volumetric representations of objects in a physical environment. Although such systems can produce high-fidelity dynamic 3D models in many scenarios, when depth values are unreliable or unavailable, the resulting dynamic 3D models may be inaccurate or incomplete. Also, in some situations, previous approaches to stitching texture details from different viewpoints onto a dynamic 3D model may produce blurred details or noticeable seams, which can detract from overall quality, especially for regions of interest such as faces. Finally, previous approaches to rendering views of a dynamic 3D model, especially for real-time applications, are limited with respect to how artistic effects may be applied to the rendered views.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various approaches described herein improve the quality of results when fusing depth maps to generate dynamic three-dimensional ("3D") models of a computer-represented environment, when applying texture details to dynamic 3D models, or when rendering views of textured, dynamic 3D models. For example, when fusing depth maps to generate a dynamic 3D model, a fusion component of a computer system also incorporates intrinsic texture values (e.g., color values) for points of the dynamic 3D model. This can make the dynamic 3D model more accurate, especially for areas in which depth values are not reliable or not available. As another example, when applying texture details to a dynamic 3D model, a rendering component of a computer system applies smoothed, viewpoint-dependent texture weights to texture values from different texture maps. This can reduce blurring and avoid the introduction of noticeable seams in rendered views, especially for regions of interest such as faces. As another example, a rendering component of a computer system can apply special effects indicated by metadata when rendering views of a textured, dynamic 3D model. This can allow a broadcaster or content provider to assert artistic control over the presentation of the textured, dynamic 3D model.

In many of the examples described herein, a component of a computer system uses texture maps for a current frame, depth maps for the current frame, and/or model data for a dynamic 3D model. Each of the texture maps for the current frame can include texture values (e.g., color values) captured from a different input viewpoint in a computer-represented environment. Each of the depth maps for the current frame can include depth values captured from one of the different input viewpoints. The model data can include points (e.g., vertices of triangles of a mesh) of the dynamic 3D model of the computer-represented environment.

According to a first set of techniques and tools described herein, a rendering component of a computer system performs operations to texture a dynamic 3D model of a computer-represented environment. The rendering component receives texture maps and model data for a current frame. The rendering component determines texture weights for the current frame for at least some of the points of the dynamic 3D model. In doing so, the rendering component smoothes at least some of the texture weights for the current frame spatially around seams in the dynamic 3D model and/or temporally relative to previous texture weights. For the at least some of the points of the dynamic 3D model, the rendering component applies corresponding texture values according to the smoothed texture weights for the current frame. Finally, the rendering component renders a view of the textured (with applied texture values), dynamic 3D model from an output viewpoint. In many cases, the smoothing of texture weights can mitigate perceptible artifacts such as blurring and seams in the rendered views.

According to a second set of techniques and tools described herein, a rendering component of a computer system performs operations to texture a dynamic 3D model of a computer-represented environment. The rendering component receives texture maps and model data for a current frame. The rendering component determines viewpoint-dependent texture weights for the current frame for at least some of the points of the dynamic 3D model. In doing so, for a given point among the at least some points of the dynamic 3D model, for a given input viewpoint among the different input viewpoints, the rendering component determines a base weight based at least in part on the given input viewpoint and an output viewpoint. For the at least some of the points of the dynamic 3D model, the rendering component applies corresponding texture values according to the viewpoint-dependent texture weights for the current frame. Finally, the rendering component renders a view of the textured (with applied texture values), dynamic 3D model from the output viewpoint. Using viewpoint-dependent texture weights (with base weights based on the output viewpoint) can avoid blurriness caused by normal-based blending.

According to a third set of techniques and tools described herein, a server computer system specifies special effects for rendered views of a textured, dynamic 3D model of a computer-represented environment. The server computer system sets metadata that indicates one or more special effects to be incorporated when, for at least some points of a dynamic 3D model, applying texture values and rendering a view of the 3D model from an output viewpoint. The server computer system sends the metadata that indicates the special effect(s) to one or more client computer systems. In addition, the server computer system sends texture maps and depth maps (or model data) for the current frame to the client computer system(s). In this way, the server computer system can compactly indicate special effects to be applied to rendered views of the textured, dynamic 3D model.

According to a fourth set of techniques and tools described herein, a rendering component of a client computer system applies special effects to rendered views of a textured, dynamic 3D model of a computer-represented environment. The rendering component receives texture maps and model data for a current frame. The rendering component receives metadata that indicates one or more special effects. For at least some of points of the dynamic 3D model, the rendering component applies corresponding texture values. Finally, the rendering component renders a view of the textured, dynamic 3D model from an output viewpoint. The rendered view incorporates the special effect(s) indicated with the metadata. In this way, the rendering component can apply a wide range of special effects specified by a content author or other source.

According to a fifth set of techniques and tools described herein, a fusion component of a computer system generates a dynamic 3D model of a computer-represented environment. The fusion component receives texture maps and depth maps for a current frame. The fusion component selectively updates a reference 3D model based on the texture maps for the current frame and the depth maps for the current frame. In particular, the fusion component selectively updates points of a reference 3D model and selectively updates intrinsic texture values of the points of the reference 3D model. The fusion component can also determine points of a current 3D model from the depth maps for the current frame and determine, based at least in part on the updated intrinsic texture values of the points of the reference 3D model and the texture maps for the current frame, warp parameters to warp the reference 3D model to the current frame. Finally, the fusion component can warp the reference 3D model according to the warp parameters and selectively combine the current 3D model and the warped reference 3D model. By incorporating intrinsic texture values when selectively updating the reference 3D model and/or determining warp parameters, the model generating tool can make the dynamic 3D model more accurate, especially for areas in which depth values are not reliable or not available.

The innovations described herein can be implemented as part of a method, as part of a computer system configured to perform the method or as part of a tangible computer-readable media storing computer-executable instructions for causing a computer system, when programmed thereby, to perform the method. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 is a flowchart illustrating a generalized technique for applying intrinsic texture values when generating a dynamic 3D model, and FIG. 5 is a flowchart illustrating an example technique for determining warp parameters based at least in part on intrinsic texture values.

FIGS. 6a and 6b are diagrams illustrating an example of applying texture values of texture maps to a dynamic 3D model using smoothed, viewpoint-dependent texture weights.

FIG. 11 is a flowchart illustrating an example technique for spatial smoothing of texture weights, and FIG. 12 is a flowchart illustrating an example technique for temporal smoothing of texture weights.

FIG. 13 is a flowchart illustrating a generalized technique for applying texture values of texture maps to a dynamic 3D model using viewpoint-dependent texture weights.

FIG. 16 is a flowchart illustrating a generalized technique for specifying metadata that indicates special effects for rendered views of textured, dynamic 3D models, and FIG. 17 is a flowchart illustrating a generalized technique for applying special effects indicated by metadata for rendered views of textured, dynamic 3D models.

DETAILED DESCRIPTION

Figure 1:
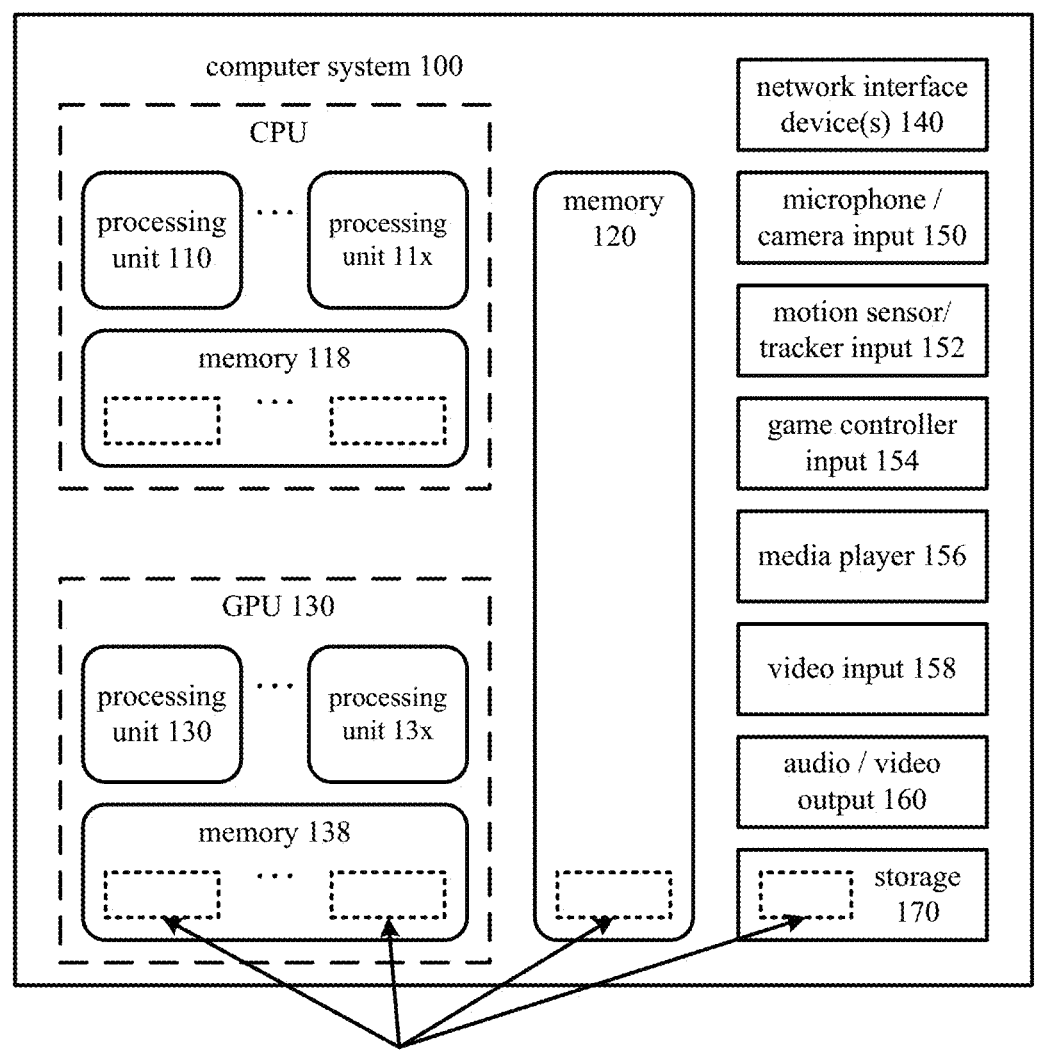
FIG. 1 is a diagram illustrating an example computer system in which one or more of the approaches described herein can be implemented.

Various approaches described herein improve the quality of results when fusing depth maps to generate dynamic three-dimensional ("3D") models of a computer-represented environment, when applying texture details to dynamic 3D models, or when rendering views of textured, dynamic 3D models. For example, when fusing depth maps to generate a dynamic 3D model, a fusion component of a computer system also incorporates intrinsic texture values (e.g., color values) for points of the dynamic 3D model. This can make the dynamic 3D model more accurate, especially for areas in which depth values are not reliable or not available. As another example, when applying texture details to a dynamic 3D model, a rendering component of a computer system applies smoothed, viewpoint-dependent texture weights to texture values from different texture maps. This can reduce blurring and avoid the introduction of noticeable seams in rendered views, especially for regions of interest such as faces. As another example, a rendering component of a computer system can apply special effects indicated by metadata to rendered views of a textured, dynamic 3D model. This can allow a broadcaster or content provider to assert artistic control over the presentation of the textured, dynamic 3D model. Any of these approaches can improve the quality of 4D reconstruction technology in diverse applications such as 3D telepresence for business conferencing or personal communication, broadcasting of live concerts or other events, and remote education.

As used herein, the term "dynamic 3D model" encompasses triangular meshes of vertices and other deformable, volumetric representations in a 3D computer graphics environment or other computer-represented environment. The computer-represented environment can represent a real-world scene (e.g., constructed from imaging/scanning of the real-world scene), represent a synthetic, virtual scene (e.g., constructed entirely from graphics processing tools, or created for a virtual reality application), or represent a hybrid scene that blends results of imaging/scanning of a real-world scene and computer-generated content (e.g., constructed for an augmented reality application).

As used herein, the term "texture value" encompasses a color value or other value, which can be associated with a point of a dynamic 3D model or with a location of a texture map (e.g., image). The other value can be, for example, an opacity value defining an opacity associated with the point/location or a specularity value defining a specularity coefficient associated with the point/location. Alternatively, the texture value can define another attribute. In a texture map, which is two-dimensional, a texture value at a location can represent an attribute of a point of a dynamic 3D model, as captured from an input viewpoint.

As used herein, the term "frame" encompasses data associated with a given time stamp or time slice. At different stages of processing, for example, the data for a given frame can include input video images from different video cameras at a time stamp/slice, such as input color images (for texture maps) or monochrome images, depth maps at the time stamp/slice, segmented texture maps at the time stamp/slice, and/or model data for a dynamic 3D model at the time stamp/slice.

A point can be visualized as a small sub-block, or voxel, that occupies volume in 3D space, adjacent other sub-blocks (for other points) in the 3D space. Alternatively, a point can be considered an infinitesimally small point, occupying no volume in the 3D space, but connected to other points during rendering operations. For purposes of explaining operations herein, the terms "vertex," "voxel," and "point" are used interchangeably.

Although operations described herein are in places described as being performed by a GPU architecture for a graphics card of a desktop computer system, head-mounted display, gaming console, etc. in many cases the operations can be performed by another type of architecture (e.g., a multi-core CPU architecture) and/or other type of computer system (e.g., smartphone, tablet computer). More generally, various alternatives to the examples described herein are possible. For example, certain techniques described with reference to flowchart diagrams can be altered by changing the ordering of stages shown in the flowcharts, by splitting, repeating or omitting certain stages, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The computer system (100) is not intended to suggest any limitation as to scope of use or functionality, as the innovations may be implemented in diverse computer systems, including special-purpose computer systems adapted for graphics processing or modeling of complex environments.

With reference to FIG. 1, the computer system (100) includes processing units (110 . . . 11x) and local memory (118) of a central processing unit ("CPU"). The processing units (110 . . . 11x) are, for example, processing cores on a single chip, and execute computer-executable instructions. The number of processing units (110 . . . 11x) of the CPU depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing unit(s) (110 . . . 11x).

The computer system (100) also includes processing units (130 . . . 13x) and local memory (138) of a GPU. The number of processing units (130 . . . 13x) of the GPU depends on implementation. The processing units (130 . . . 13x) are, for example, single-instruction, multiple data ("SIMD") units of the GPU. A shader unit or other processing block of the GPU can include one or more SIMD units. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. Each element of the SIMD unit can be considered a separate thread of the SIMD unit. A group of n threads for a SIMD unit can also be called a wave or warp. Threads of a given SIMD unit execute the same code in lockstep on (potentially) different data. In some GPU architectures, a SIMD unit can have an extra lane for data that is the same across all threads of the SIMD unit, which results in a group of n threads plus one scalar thread for that SIMD unit (the scalar thread does not execute code like the n threads of the SIMD unit). The local memory (138) may be volatile memory (e.g., registers, cache, RAM), non-volatile memory (e.g., ROM, EEPROM, flash memory, etc.), or some combination of the two, accessible by the respective processing unit(s) (130 . . . 13x). The local memory (138) stores software (180) implementing one or more innovations for fusing, texturing, and/or rendering views of dynamic 3D models, for operations performed by threads executing on the respective processing units (130 . . . 13x), in the form of computer-executable instructions.

The computer system (100) includes shared memory (120), which may be volatile memory (e.g., registers, cache, RAM), non-volatile memory (e.g., ROM, EEPROM, flash memory, etc.), or some combination of the two, accessible by the processing unit(s) (110 . . . 11x) of the CPU and the processing units (130 . . . 13x) of the GPU. The memory (120) stores software (180) implementing one or more innovations for fusing, texturing, and/or rendering views of dynamic 3D models, at least for high-level control of operations performed by threads of the processing units (130 . . . 13x), in the form of computer-executable instructions. In the GPU, a thread (also called an execution thread or thread of execution), in general, executes a sequence of computer-executable instructions and may have data (e.g., defining a state) associated with it in local memory (138) and/or shared memory (120). Threads also execute on processing units (110 . . . 11x) of the CPU, where such a thread, in general, includes a sequence of computer-executable instructions and may have data (e.g., defining a state) associated with it in local memory (118) and/or shared memory (120).

Alternatively, a processing unit can be a processor in an application-specific integrated circuit ("ASIC") or any other type of processor. The processing unit(s) (110 . . . 11x, 130 . . . 13x) can be part of a system-on-a-chip ("SoC").

The computer system (100) includes one or more network interface devices (140). The network interface device(s) (140) enable communication over a network to another computing entity (e.g., server, other computer system). The network interface device(s) (140) can support wired connections and/or wireless connections, for a wide-area network, local-area network, personal-area network or other network. For example, the network interface device(s) can include one or more Wi-Fi transceivers, an Ethernet port, a cellular transceiver and/or another type of network interface device, along with associated drivers, software, etc. The network interface device(s) (140) convey information such as computer-executable instructions, audio or video input or output, or other data in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

A camera input (150) can accept video input in analog or digital form from a video camera, which captures natural video for texture maps. A texture map includes texture values captured from an input viewpoint (perspective) for a given frame (e.g., associated with a timestamp or time slice). A camera input (150) can also accept input in analog or digital form from one or more monochrome video cameras, whose input is used to determine depth values from an input viewpoint for a given frame. For example, two monochrome video cameras in a stereo configuration can provide input to a depth generator, which determines depth values from an input viewpoint for a given frame. Examples of configurations of cameras are described in the next section. Although FIG. 1 shows a single camera input (150), the computer system (100) can include multiple camera inputs (150) from different input viewpoints and/or different cameras at those input viewpoints. An audio input accepts audio input in analog or digital form from one or more microphones (150), which capture audio.

The computer system (100) optionally includes a motion sensor/tracker input (152) for a motion sensor/tracker, which can track the movements of a user and objects around the user. For example, the motion sensor/tracker allows a user (e.g., player of a game) to interact with the computer system (100) through a natural user interface using gestures and spoken commands. The motion sensor/tracker can incorporate gesture recognition, facial recognition and/or voice recognition. In some example implementations, the motion sensor/tracker input (152) can provide depth values as a depth camera/depth generator and/or provide texture values as a video camera, instead of the camera input(s) (150).

A game controller input (154) accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (100) optionally includes a media player (156) and video input (158). The media player (156) can play DVDs, Blu-ray disks, other disk media and/or other formats of media. The video input (158) can accept input video in analog or digital form (e.g., from a cable input, HDMI input or other input).

A video output (160) provides video output to a display device. The video output (160) can be an HDMI output or other type of output. An audio output (160) provides audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing one or more innovations for fusing, texturing, and/or rendering views of dynamic 3D models.

The computer system (100) may have additional features. For example, the computer system (100) includes one or more other input devices and/or one or more other output devices. The other input device(s) may be a touch input device such as a keyboard, mouse, pen, or trackball, a scanning device, or another device that provides input to the computer system (100). The other output device(s) may be a printer, CD-writer, or another device that provides output from the computer system (100).

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The innovations can be described in the general context of computer-readable media. Computer-readable media are any available tangible media that can be accessed within a computing environment. By way of example, and not limitation, with the computer system (100), computer-readable media include memory (118, 120, 138), storage (170), and combinations thereof. The term computer-readable media does not encompass transitory propagating signals or carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computer system or device. In general, a computer system or device can be local or distributed, and can include any combination of special-purpose hardware and/or hardware with software implementing the functionality described herein.

For the sake of presentation, the detailed description uses terms like "determine," "receive" and "provide" to describe computer operations in a computing system. These terms denote operations performed by a computer and should not be confused with acts performed by a human being. The actual computer operations corresponding to these terms vary depending on implementation.

II. Example Environments for 3D Capturing, Fusing, Texturing, and/or Rendering.

Figure 2A:
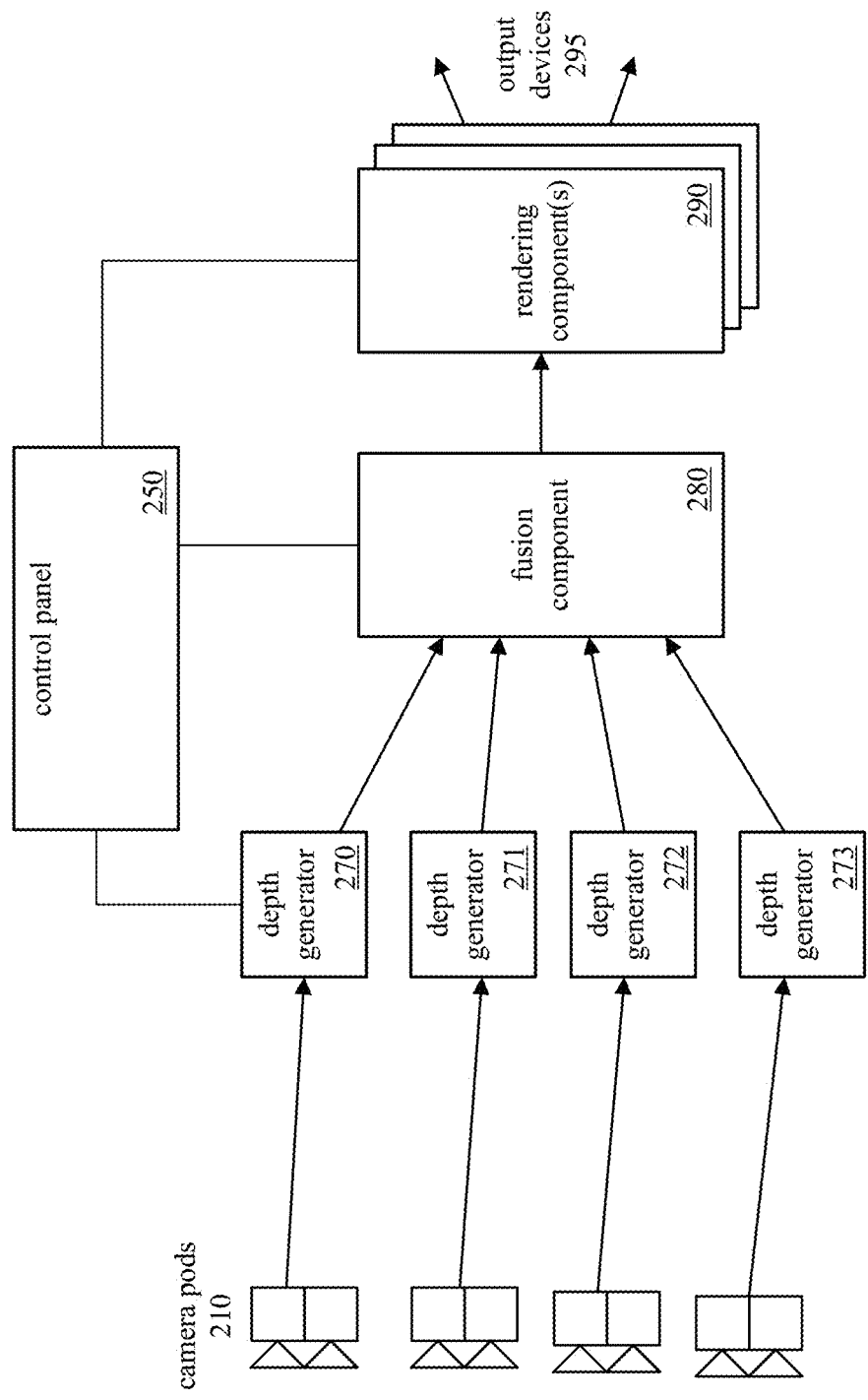
FIGS. 2a and 2b are diagrams illustrating example environments for capturing, fusing, texturing, and rendering views of textured, dynamic 3D models.
Figure 2B:
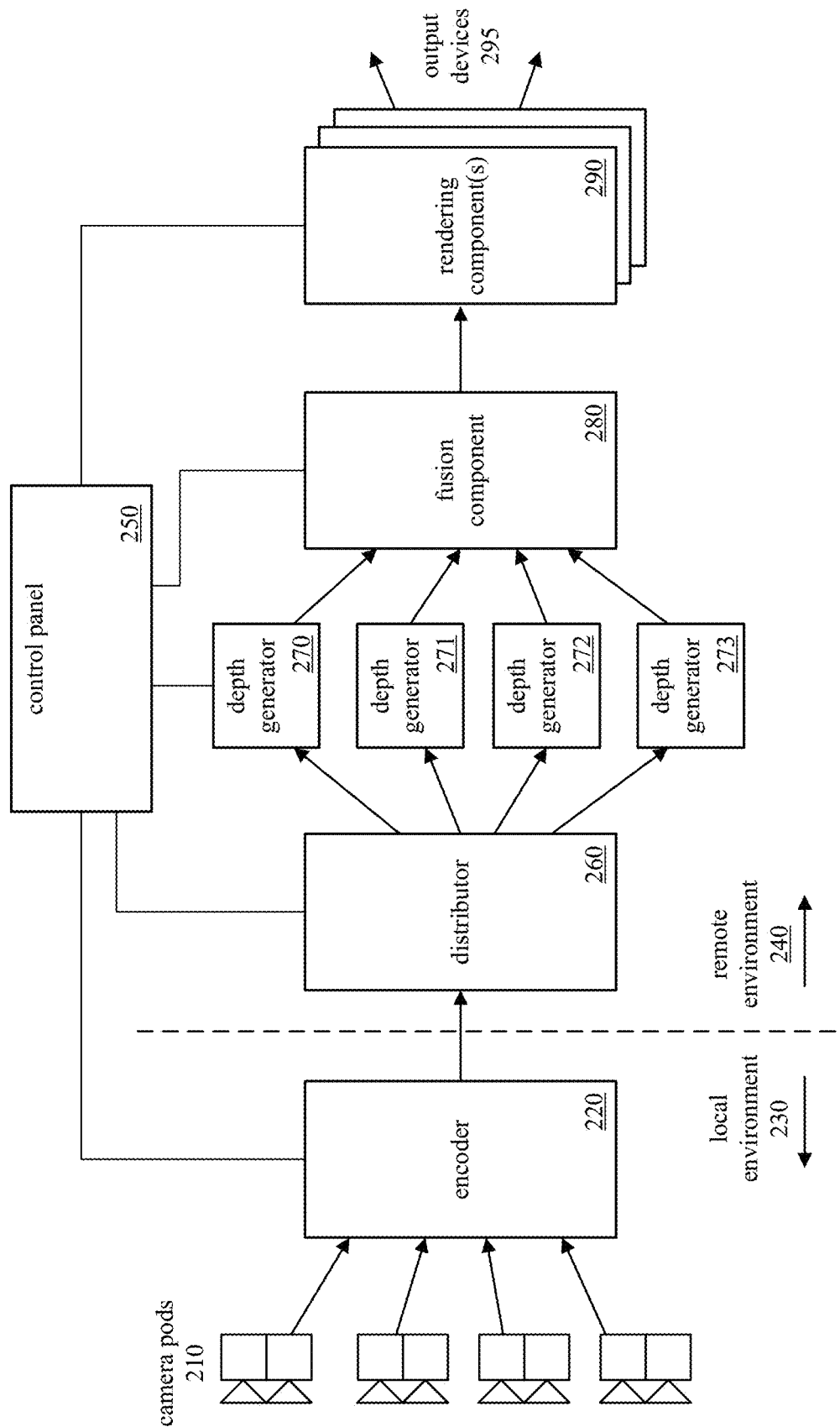

FIGS. 2a and 2b illustrate example environments (201, 202) with systems for capturing, fusing, texturing, and/or rendering of dynamic 3D models. Systems described in this section can be used to capture real-world video input that is used to generate a dynamic 3D model, fuse depth values generated from some of the captured video into the dynamic 3D model, apply texture details to the dynamic 3D model, and render views of the textured, dynamic 3D model for output to a display device such as a VR headset or AR headset. Depending on implementation, different components in the example environments (201, 202) can be implemented in the same, local computer system or in different computer systems connected over one or more networks. Thus, for example, each component shown in the example environments (201, 202) can run on a separate computer system, which may be a desktop or laptop computer, a physical or virtual server, a gaming console, a headset, etc. depending on the component. Or, different subsets of the components shown in the example environments (201, 202) can run on the same computer system. All of the components or subsets of the components can be located at the same physical location (e.g., same room or same building, connected via a local area network) or at different physical locations (e.g., connected via one or more wide area networks, such as the Internet).

In the example environment (201) of FIG. 2a, the system includes a control panel (250), which is also called a controller or control panel component. The control panel (250) can be implemented as software and/or hardware that is separate from the other components of the example environment (201). For example, the control panel (250) can run as software on a separate computer system or virtual server, providing a central point of control for the overall environment (201). The control panel (250) controls the overall process of capturing real-world video input and generating a dynamic 3D model. The control panel (250) can also control processes of applying texture values to the dynamic 3D model and rendering views of the textured, dynamic 3D model. In order to provide this control, the control panel (250) is connected to the various components of the system via network connections or other connections.

In order to provide real-world video input, video cameras are used to capture images of real-world objects (e.g., people or things). Some of the video cameras capture images that are used to generate depth values for dynamic 3D models. Other video cameras capture images (texture maps) that are used to apply texture values (e.g., color values in an RGB format) to dynamic 3D models. The example environment (201) includes a number of camera pods (210) (also called camera groups). For example, each of the camera pods (210) can include two monochrome video cameras and one color video camera. The monochrome video cameras can use infrared ("IR") bandpass filters and an IR speckle pattern to improve stereo correspondence matching. FIG. 2a shows 24 cameras organized as eight camera pods (210), but more or fewer camera pods can be utilized. Each camera pod (210) includes a pair of monochrome video cameras and a color video camera that capture images from a different input viewpoint. In some example implementations, a minimum of two camera pods are used to provide enough depth information to generate a dynamic 3D model; using more camera pods can, in some situations, improve the quality of the generated dynamic 3D model.

The spatial resolution of the images can be 720p (1280 sample values×720 sample values), 1080p (1920 sample values×1080 sample values), UHD (3840 sample values×2160 sample values), or some other number of sample values per image. In general, a pixel is the set of one or more collocated sample values for a location in an image, which may be arranged in different ways for different chroma sampling formats. Before some operations (e.g., typical encoding operations, operations that use intrinsic color values when generating dynamic 3D models as described in section III, or some special effects operations as described in section V), the sample values of images can be converted to a color space such as YUV, in which sample values of a luma (Y) component represent brightness or intensity values, and sample values of chroma (U, V) components represent chroma values. The precise definitions of the chroma values (and conversion operations between a YUV-type color space and another color space such as an RGB-type color space) depend on implementation. In general, as used herein, the term YUV-type color space indicates any color space with a luma (or luminance) component and one or more chroma (or chrominance) components, including Y'UV, YIQ, Y'IQ and YDbDr as well as variations such as YCbCr and YCoCg. Chroma sample values may be sub-sampled to a lower chroma sampling rate (e.g., for a YUV 4:2:0 format) in order to reduce the spatial resolution of chroma sample values, or the chroma sample values may have the same resolution as the luma sample values (e.g., for a YUV 4:4:4 format). The term RGB-type color space indicates a color space that includes R, G, and B components in any order, which may be the color space used for video camera or a display device.

The video output of the camera pods (250) (e.g., streams images for texture values and streams of monochrome images for generating depth values) can be transferred, on a frame-by-frame basis, to other components that process the video output. Such transfers can be performed within a local computer system or between different computer systems across one or more computer networks.

In FIG. 2a, for example, video output of the camera pods (250) for a given frame (e.g., associated with a time stamp or time slice) is provided to depth generators (270-273). In general, a depth generator (270-273) can be implemented as software and/or hardware that receives and processes video output from cameras. A depth generator (270-273) can perform some or all of the following operations: receiving video output (e.g., comprising monochrome images and/or color images) for a given frame from video cameras in camera pods (210); generating depth maps from different input viewpoints for the given frame from some of the received video output (e.g., from the monochrome images); and transmitting the depth maps and/or texture maps (e.g., color images) to a fusion component or other component. In FIG. 2a, each depth generator (270-273) receives video images from two camera pods (e.g., via a wired connection such as a USB cable, via a wireless connection, or via a network connection). For example, the first depth generator (270) receives video images for a given frame from the top two camera pods having two different input viewpoints. In this arrangement, the first depth generator (270) generates two depth maps for the given frame from the two distinct input viewpoints of the top two camera pods. The remaining depth generators (271-273) each receive video images for the given frame from their respective pairs of camera pods and generate two depth maps for the given frame from the different input viewpoints of those camera pods. The depth generators (270-273) can repeat such operations on a frame-by-frame basis, generating series of depth maps for the respective input viewpoints. In some example implementations, each depth generator (270-273) is a software application that runs on a different computer system. For example, each depth generator (270-273) can run on its own computer system, with each computer system having two graphics cards, and with each graphics card processing the series of video images from one camera pod. Alternatively, depth generators can run on more or fewer computer systems, or on virtual machines (e.g., using cloud computing resources).

In the example environment (201) of FIG. 2a, the depth maps produced by the depth generators (270-273) are provided (e.g., over a network) to a fusion component (280). The fusion component (280) can be implemented as software and/or hardware. In general, the fusion component (280) performs some or all of the following operations: receiving depth maps from depth generators; receiving texture maps from the depth generators (e.g., passed through the depth generators), camera pods, or another component; generating a dynamic 3D model; and transmitting model data for the dynamic 3D model and texture maps to rendering components. Specifically, for a given frame (e.g., associated with a timestamp or time slice), the fusion component (280) combines depth maps from different input viewpoints for the given frame to generate a 3D model for the given frame, which may include updating a reference 3D model (which is based on 3D model data for one or more previous frames) and estimating a current 3D model (based on the depth maps for the given frame). For example, the 3D model is a mesh of vertices for triangles or other volumetric representation. In some example implementations, the fusion component (280) runs as software on a separate computer system or separate virtual machine. Model data for the dynamic 3D model generated by the fusion component is transmitted (e.g., over a network) to one or more rendering components (290), which can also be called renderers or rendering engines.

A rendering component (290) can be implemented as software and/or hardware. In general, a rendering component (290) receives model data for the dynamic 3D model along with texture maps for a given frame, applies texture values (e.g., color values) from one or more of the texture maps for the given frame to the dynamic 3D model for the given frame, and generates two-dimensional ("2D") views of the textured, dynamic 3D model from an output viewpoint (also called a user viewpoint or user camera perspective). The rendered views can be output to an output device (295) such as a holographic display device for display. For example, a rendering component (290) can generate left and right 1080p images to display as 3D holographic video output in a VR or AR headset. Some examples of holographic display devices that can be utilized as output devices (295) include the Microsoft® HoloLens® and the HTC VIVE™. A rendering component (290) can also output rendered views, e.g., the same pair of left/right rendered 2D views or a single rendered 2D view, to another display device (e.g., a computer monitor) or component (e.g., an encoder for gameplay broadcast). In some example implementations, each of the one or more rendering components (290) runs as software on a computer system different than the fusion component (280) and different from any other rendering component (290). Each of the rendering component(s) (290) produces output for a different output device (295) (e.g., a different holographic display device).

FIG. 2b shows another example environment (202) with a system for capturing, fusing, texturing, and rendering of textured, dynamic 3D models. The example environment (202) contains the components shown in FIG. 2a for the example environment (201), but in a different configuration and with some additional components. Specifically, the example environment (202) includes an encoder (220) and a distributor (260). In the system shown in FIG. 2b, the depth generators (270-273), fusion component (280), and rendering component(s) (290) perform operations as described above with reference to FIG. 2a.

The encoder (220), which can be implemented with software and/or hardware, receives video images for a given frame from cameras of the camera pods (210), encodes the video images for the given frame (e.g., using one or more video encoders), and transmits the encoded video images to the distributor (260). For the given frame, the encoder (220) can pack the video images from the cameras (e.g., video images in a 1080p resolution or some other resolution) into a larger image (e.g., an image in a 4K resolution) and encode the larger image (e.g., using a single video encoder). The encoder (220) can combine individual video images as they are received into the larger video image (e.g., on a frame-by-frame basis). For example, from each of the eight camera pods (210), the encoder (220) can receive two monochrome images (used to generate depth values) and one color image for a given frame, combine the images according to a pre-defined tiled arrangement into a larger image for the given frame, encode the larger image, and transmit the encoded image to the distributor (260). In some example implementations, the encoder (220) runs (e.g., as a software application, hardware-accelerated encoder, or hardware encoder) on a separate computer system or virtual machine from the other components of the environment (202).

The distributor (260), which can be implemented with software and/or hardware, receives encoded images for a given frame from the encoder (220), decodes the images, and divides the reconstructed images into images that correspond to the input video images from the cameras for the given frame. The distributor (260) sends at least some of the separated video images to the depth generators (270-273) for processing. For example, the distributor (260) sends monochrome video images for a pair of cameras of a camera pod (210) to a corresponding one of the depth generators (270-273), for generation of a depth map for a given frame. In some example implementations, the distributor (260) runs (e.g., as a software application, hardware-accelerated decoder, or hardware decoder, with additional logic to partition reconstructed images) on a separate computer system or virtual machine from the other components of the environment (202).

In FIG. 2b, the camera pods (210) and the encoder (220) operate in a local environment (230), while the other components (including the distributor (260), depth generators (270-273), fusion component (280), rendering component(s) (290), and control panel (250)) operate in a remote environment (240). The components of the local environment (230) communicate with the components of the remote environment (240) via one or more network connections (e.g., wired network connections, wireless network connections, or a combination). For example, the components of the local environment (230) could be located in a specific geographical location (e.g., a room in a building) while the components in the remote environment (240) could be located in a different geographical location (or multiple different geographical locations). For example, some of the components of the remote environment (240) could be hosted in server computers or virtual servers located in a remote data center. In some example implementations, the local environment (230) is a mobile environment (e.g., an automobile) in which the camera pods (210) and encoder (220) operate and communicate with components of the remote environment (240) (e.g., with the distributor (260) and/or the control panel (250)) using a wireless network connection (e.g., a cellular data connection). In this configuration, the encoder (220) can encode video images so that the encoded video images can be transmitted over a relatively low-bandwidth network connection, which can allow the system to operate effectively in the mobile environment.

In particular, whether implemented in a mobile environment or otherwise, the configuration of components shown in the environment (202) of FIG. 2b can provide capture and construction of high-quality dynamic 3D models of objects (e.g., people, things), to be transmitted to a remote viewer in real-time for a virtual presence or conferencing application. This can allow a user to see and interact with remote participants in 3D as if the remote participants are actually present in the physical space of the user.

In the environments (201, 202) of FIGS. 2a and 2b, depth generators (270-273) generate depth maps for a given frame from video images for the given frame. Alternatively, a component can combine depth generator with a camera pod. For example, the component can be a depth camera (e.g., incorporating two monochrome video cameras and depth generator, or otherwise providing a depth map). One example component with a depth camera is the Microsoft® Kinect® camera, which can provide a depth map and texture map for a given frame. In this configuration, depth cameras can connect directly to the fusion component (280) (e.g., in the arrangement depicted in FIG. 2a) or encoder (220) (e.g., in the arrangement depicted in FIG. 2b), which can encode the texture maps and/or depth maps.

III. Generation of a Dynamic 3D Model Using Intrinsic Texture Values.

This section describes approaches to generating dynamic 3D models that use intrinsic texture values as well as depth values. The approaches can be implemented as part of a fusion component such as the fusion component (280) shown in FIGS. 2a and 2b, which receives depth maps and texture maps captured from different input viewpoints and generates a dynamic 3D model. In some example implementations, the approaches described in this section extend approaches presented in Dou et al., "Fusion4D: Real-time Performance Capture of Challenging Scenes," ACM Transaction on Graphics, 2016 ("Fusion4D reference"). Alternatively, the approaches described in this section can be implemented in some other way.

A. Introduction.

The Fusion4D reference presents a processing pipeline for live, multi-view performance capture. In summary, as part of the pipeline, the Fusion4D system uses depth values in depth maps for a current frame to incrementally and selectively update a reference volume V (also called a key volume), which is associated with a mesh of vertices for a dynamic 3D model. This can help maintain the coherency of the dynamic 3D model over time. Specifically, the Fusion4D system obtains N depth maps and N RGB images for a current frame. In a data fusion stage, the Fusion4D system uses the N depth maps to selectively update the reference volume V. A new reference volume can be started periodically or when there is a radical change to the dynamic 3D model. Otherwise, the current reference volume V is selectively updated (in the data fusion stage) based on the depth maps for the current frame.

Then, in a non-rigid motion field estimation stage, the Fusion4D system estimates warp parameters G to warp (deform) the current reference volume V so that it aligns with the depth maps for the current frame. Specifically, the Fusion4D system samples a set of K embedded deformation nodes $S_m$ within the reference volume V. Every vertex $v_m$ in the mesh for the reference volume V is "skinned" to a closest node of the nodes $S_m$. A local deformation around each node k (for k equal 1 to K) is defined using an affine transformation $A_k$ and translation $t_k$ for the node. Also, a global rotation R and global translation T are defined. The warp parameters G includes the global rotation R, the global translation T, and, for each node k, the affine transformation $A_k$ and local translation $t_k$ for the node. To calculate the warp parameters G, the Fusion4D system uses an energy function E(G) that penalizes misalignment between the warped reference volume V and the observed N depth maps for the current frame. The energy function E(G) also regularizes the types of deformations that are allowed and incorporates various constraints and information about prior results. Specifically, the energy function in the Fusion4D reference is:

$$E(G) = \lambda_{data}E_{data}(G) + \lambda_{hull}E_{hull}(G) + \lambda_{rot}E_{rot}(G) + \lambda_{rot}E_{rot}(G) + \lambda_{smooth}E_{smooth}(G) \quad (1),$$

where $E_{data}(G)$ is a data term that penalizes misalignment between the warped reference volume V and the observed N depth maps for the current frame, $E_{hull}(G)$ is a visual hull term that quantifies deviations of the warped reference volume V from boundaries of a visual hull, $E_{corr}(G)$ is a correspondence term that quantifies differences in texture value correspondences, $E_{rot}(G)$ is a rotation term that quantifies deviations of local affine transformations for nodes of the reference volume V from rigid transformations, and $E_{smooth}(G)$ is a smoothing term that quantifies variability in local affine transformations for neighboring nodes of the reference volume V. $\lambda_{data}$, $\lambda_{hull}$, $\lambda_{corr}$, $\lambda_{rot}$, and $\lambda_{smooth}$ are implementation-dependent weighting factors for the respective terms. The weighting factors can have equal values in order to weight the terms equally. Or, the weighting factors can have different values as the result of performance tuning, so as to attach different degrees of importance to different terms. The Fusion4D reference details how the terms of the energy function E(G) are calculated, and it also describes various ways to optimize computation of the energy function E(G).

After the warp parameters G are determined, the Fusion4D system applies the warp parameters G to the vertices of the reference volume V. Any vertex $v_m$ in the reference volume V can be warped according to the equation:

$$\text{warp}(v_m; G) = R \sum_{k \in S_m} w_k^m [A_k(v_m - g_k) + g_k + t_k] + T, \quad (2)$$

where $w_k^m$ is a skinning weight and $g_k$ is sampling location for the node k. Any corresponding normal $n_m$ for points in the reference volume V can be transformed according to the equation:

$$\text{warp}^\perp(n_m; G) = R \sum_{k \in S_m} w_k^m A_k^{-T} n_m, \quad (3)$$

with normalization applied afterward.

Finally, in another data fusion stage, the warped reference volume V can be selectively combined with depth values in the depth maps for the current frame to determine a data volume for the current frame, which is associated with a mesh of vertices for the dynamic 3D model. In particular, the warped reference volume V can be used to fill in holes in the data volume for the current frame due to occlusions or camera failures, or to accumulate detail in areas of the data volume.

For additional details about the Fusion4D system, see the Fusion4D reference.

Figure 3A:
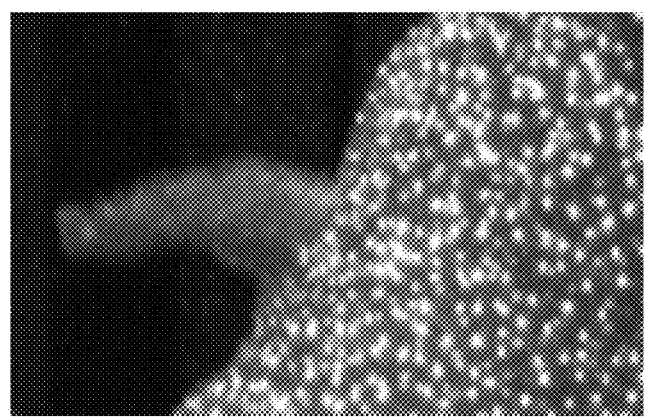
FIGS. 3a and 3b are images illustrating examples of imperfections in captured images that may cause errors when generating a dynamic 3D model.
Figure 3B:
Figure 3C:
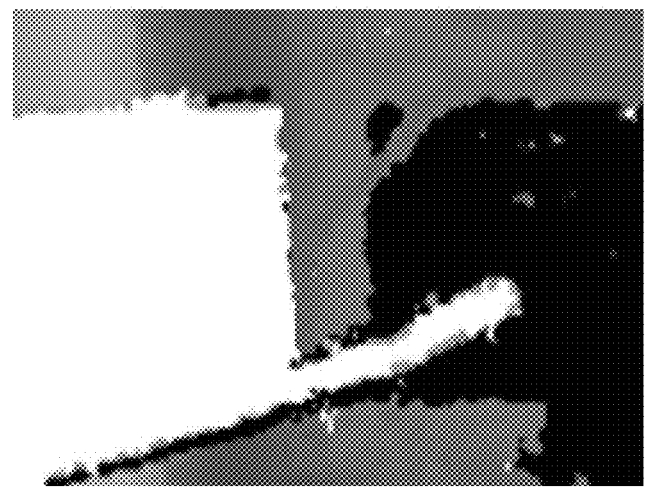
FIG. 3c is an image illustrating an example of imperfections in a depth map.

The approaches described in the Fusion4D reference use depth values in depth maps for frames to generate a dynamic 3D model. In such depth-only approaches, the quality of the dynamic 3D model can suffer under some conditions. For example, in some cases, depth values in depth maps are generated by matching patterns from structured IR lights (e.g., in images captured using monochrome video cameras with IR bandpass filters and an IR speckle pattern). The IR lighting patterns may miss thin structures in the environment. FIG. 3a shows an example (301) of this phenomenon. As another example, the images used to generated depth values can record unexpected flares due to camera imperfections, noise, or other factors. FIG. 3b shows an example (302) of this phenomenon. As another example, depth-only approaches, in many cases, do not generate a smooth silhouette of objects in an environment in a depth map. FIG. 3c shows an example (303) of this phenomenon.

B. Using Intrinsic Texture Values When Generating a Dynamic 3D Model.

A fusion component can assign "intrinsic" texture values from texture maps to points (e.g., vertices of a mesh, voxels of a volumetric representation) when generating a dynamic 3D model. For example, the fusion component can update points of a reference volume using intrinsic color values along with depth values. Or, as another example, the fusion component can determine warp parameters for a reference volume more accurately and reliably by using intrinsic texture values as well as depth values when comparing a warped reference volume with observed values (in texture maps and depth maps). By assigning intrinsic texture values to points when generating a dynamic 3D model, the fusion component can, in some cases, fill in information that is missing or unreliable in depth maps or the images used to generate depth values of depth maps.

FIG. 4 shows a generalized technique (400) for applying intrinsic texture values to points when generating a dynamic 3D model of a computer-represented environment. The texture values are typically color values (e.g., RGB values) of images, but can alternatively be some other type of texture values (e.g., opacity values, specularity coefficients). The points of the dynamic 3D model are, for example, vertices of a mesh of triangles or voxels of a volumetric representation. A fusion component such as the fusion component (280) shown in FIGS. 2a and 2b can perform the technique (400). Using the technique (400), a fusion component can generate dynamic 3D models in real-time using texture values and depth values captured from multiple cameras at different input viewpoints.

With reference to FIG. 4, the fusion component receives (410) texture maps for a current frame. Each of the texture maps includes texture values captured from a different input viewpoint in the computer-represented environment. For example, each of the texture maps is captured by a video camera of a different camera pod as shown in FIG. 2a or 2b, and each of the texture values is a color value in an RGB-type color space. When the texture values are color values, the fusion component can convert at least some of the color values from a first color space (e.g., an RGB-type color space) to a second color space (e.g., a YUV-type color space).

The fusion component receives (420) depth maps for the current frame. Each of the depth maps includes depth values from one of the different input viewpoints. For example, each of the depth maps is generated from images captured by a pair of monochrome video cameras of a different camera pod as shown in FIG. 2a or 2b. The spatial resolution of the depth maps can be the same as or different than the spatial resolution of the corresponding texture maps. Each of the depth values can include a distance value, a weight, and/or another parameter.

The fusion component selectively updates (430) a reference 3D model (also called a reference volume or key volume) based on the texture maps for the current frame and the depth maps for the current frame. In doing so, the fusion component selectively updates points of the reference 3D model using the depth maps. For example, for each point of at least some of the points of the reference 3D model, the fusion component projects the point back to locations in at least some of the depth maps and updates parameters (e.g., signed distance value and/or weight) of the point in the reference 3D model. The fusion component can identify one or more new points in at least one of the depth maps but not yet in the reference 3D model, and add the new point(s) to the reference 3D model. The fusion component can also identify one or more misaligned points and remove the misaligned point(s) from the reference 3D model.

When it selectively updates (430) the reference 3D model, the fusion component also selectively updates intrinsic texture values of the points of the reference 3D model. For example, for each point of at least some of the points of the reference 3D model, the fusion component projects the point back to locations in at least some of the texture maps, and assigns an intrinsic texture value of the point in the reference 3D model. For the intrinsic texture value, the fusion component can combine corresponding texture values from the texture maps at the back-projected locations in the texture maps (e.g., averaging the corresponding texture values, removing outlier texture values caused by occlusion or mis-registration using a majority voting approach or other approach, and/or determining a weighted combination of the corresponding texture values and a previous intrinsic texture value of the point).

With reference to FIG. 4, the fusion component also determines (440) points of a current 3D model (also called a data volume) from the depth maps for the current frame.

Based at least in part on the updated intrinsic texture values of the points of the reference 3D model and the texture maps for the current frame, the fusion component determines (450) warp parameters to warp the reference 3D model to the current frame. When determining (450) the warp parameters, the fusion component can also consider depth maps for the current frame. The warp parameters can include: (a) parameter(s) that specify a global translation of the reference 3D model, (b) parameter(s) that specify a global rotation of the reference 3D model, and (c) for each of multiple nodes of the reference 3D model, parameter(s) that specify a local affine translation and parameter(s) that specify a local translation of the node. FIG. 5 shows an example technique (500) for determining warp parameters based at least in part on intrinsic texture values. With the example technique (500), the fusion component determines (450) the warp parameters according to a non-rigid matching algorithm, which can help smooth generation of the dynamic 3D model. Alternatively, the fusion component can determine (450) the warp parameters using another approach.

The fusion component warps (460) the reference 3D model according to the warp parameters, and selectively combines (470) the current 3D model and the warped reference 3D model. The fusion component checks (480) whether to continue with the next frame and, if so, continues by receiving (410) texture maps and receiving (420) depth maps for the next frame (as the current frame). In this way, the fusion component can incorporate both texture maps and depth maps on a frame-by-frame basis when generating a dynamic 3D model using a reference 3D model (reference volume, key volume) and current 3D model (data volume for the current frame). Periodically or in response to a dramatic change, the fusion component can start a new reference 3D model.

C. Using Intrinsic Texture Values When Determining Warp Parameters.

With reference to FIG. 5, to determine warp parameters for a reference 3D model based at least in part on intrinsic texture values, the fusion component defines (510) nodes of the reference 3D model and assigns (520) the points of the reference 3D model to the nodes. The fusion component then samples (530) the updated intrinsic texture values for the points assigned to the nodes. The fusion component minimizes (540) an error function that penalizes mismatches between the warped reference 3D model (warped reference volume) and observed values for the current frame, finding an actual or approximate minimum of the error function. In particular, the error function includes a texture error term that quantifies error between the updated intrinsic texture values of back-projected points of the reference 3D model and corresponding texture values of the texture maps for the current frame. That is, points of the reference 3D model are back-projected to the texture maps, and the updated intrinsic texture values of the back-projected points are compared to corresponding texture values of the texture maps for the current frame. The error (between the updated intrinsic texture values of back-projected points of the reference 3D model and corresponding texture values of the texture maps for the current frame) can be quantified as a sum of squared differences or other measure of distortion. The error can be selectively calculated only for points visible in the respective texture maps, or the error can be calculated for points regardless of visibility.

In addition to the texture error term, the error function can include one or more other terms. For example, the other terms can be: (a) a depth error term that quantifies error between back-projected points of the reference 3D model and corresponding depth values of the depth maps for the current frame, (b) a visual hull error term that quantifies deviations of the warped reference 3D model from boundaries of a visual hull, (c) a rotation term that quantifies deviations of local affine transformations for nodes of the reference 3D model from rigid transformations, (d) a smoothness term that quantifies variability in local affine transformations for neighboring nodes of the reference 3D model, (e) a correspondence term that quantifies differences in texture value correspondences, and/or (f) another term. Using these terms can improve the quality of the real-time reconstruction of the dynamic 3D model.

Depending on implementation, for example, the error function to be minimized can be:

$$E(G) = \lambda_{depth}(G) + \lambda_{color} E_{color}(G) \tag{4},$$

or $$E(G) = \lambda_{depth} E_{depth}(G) + \lambda_{color} E_{color}(G) + \lambda_{corr} E_{corr}(G) + \lambda_{rot} E_{rot}(G) + \lambda_{smooth} E_{smooth}(G) \tag{5},$$

or $$E(G) = \lambda_{depth} E_{depth}(G) + \lambda_{color} E_{color}(G) + \lambda_{hull} E_{hull}(G) + \lambda_{corr} E_{corr}(G) + \lambda_{rot} E_{rot}(G) + \lambda_{smooth} E_{smooth}(G) \tag{6},$$

where $E_{color}(G)$ is a texture error term as defined below, and $\lambda_{color}$ is a weighting factor for the color error term. The terms $E_{hull}(G)$, $E_{corr}(G)$, $E_{rot}(G)$, and $E_{smooth}(G)$, and the weighting factors $\lambda_{hull}$, $\lambda_{corr}$, $\lambda_{rot}$, and $\lambda_{smooth}$, are defined as in the Fusion4D reference. The term $E_{depth}(G)$ is a depth error term that corresponds to the term $E_{data}(G)$ in the Fusion4D reference—it penalizes misalignment between the warped 3D model and the observed N depth maps for the current frame. $\lambda_{depth}$ is a weighting factor for the depth error term. The depth error term as: $E_{depth}(G)$ can be defined $$E_{depth}(G) = \sum_{n=1}^{N} \sum_{m=1}^{M} \min_{x \in P(D_n)} \|\text{Depth}(v_m; G) - x\|^2, \tag{7}$$

where M is the number of vertices of the reference 3D model, G represents warp parameters $\{R, T\} \cup \{A_k, t_k\}$ for k=1 to K, and K indicates the count of nodes. $P(D_n)$ is a point cloud extracted from the depth map $D_n$, and x represents the depth value for a point in that point cloud. A point cloud represents one or more objects in 3D space as a set of points. A point in the point cloud is associated with a position in 3D space (typically, a position having x, y, and z coordinates). In some example implementations, point cloud data is "voxelized" such that points are aligned with positions in a 3D grid that have regular spacing.

The function Depth($v_m$; G) applies the warp parameters G to the point $v_m$ and determines the depth value for the projected point. Thus, for each of the N depth maps, for each of the M vertices, the fusion component calculates the sum of squared differences between the depth value of the warped point (vertex) and corresponding depth value in the depth map $D_n$. As explained in the Fusion4D reference, the calculation of the depth error term can be limited to those points that are considered to be visible in depth map $D_n$:

$$E_{depth}(G) = \sum_{n=1}^{N} \sum_{m \in V_n(G)} \min_{x \in P(D_n)} \|\text{Depth}(v_m; G) - x\|^2, \quad (8)$$

where $V_n(G)$ indicates the points of the reference 3D model that are visible in depth map $D_n$ when projected by the warp parameters G. The depth error term can also be approximated using a point-to-plane term, as described in the Fusion4D reference.

The texture error term $E_{color}(G)$ can be defined as:

$$E_{color}(G) = \sum_{n=1}^{N} \sum_{m=1}^{M} \min_{c_{YUV} \in P(I_n)} \|\text{Color}(v_m; G)_{YUV} - c_{YUV}\|^2, \quad (9)$$

where N is the number of texture maps, M is the number of vertices of the reference 3D model, G represents warp parameters $\{R, T\} \cup \{A_k, t_k\}$ for k=1 to K, and K indicates the count of nodes. $P(I_n)$ is a point cloud extracted from the texture map $I_n$, and $c_{YUV}$ represents the color value for a point in that point cloud in a YUV-type color space. The function Color($v_m$; G)$_{YUV}$ applies the warp parameters G to the point $v_m$ and determines the color value for the projected point in the YUV-type color space. Thus, for each of the N texture maps, for each of the M vertices, the fusion component calculates the sum of squared differences between the intrinsic color value for the warped point and corresponding color value in the texture map $I_n$. The calculation of the texture error term can be limited to those points that are considered to be visible in texture map $I_n$:

$$E_{color}(G) = \sum_{n=1}^{N} \sum_{m \in V_n(G)} \min_{c_{YUV} \in P(I_n)} \|\text{Color}(v_m; G)_{YUV} - c_{YUV}\|^2, \quad (10)$$

where $V_n(G)$ indicates the points of the reference 3D model that are visible in texture map $I_n$ when projected by the warp parameters G. The texture error term can also be approximated using a point-to-plane term, using an approach analogous to the approach described in the Fusion4D reference for approximating the depth error term using a point-to-plane term.

IV. Applying Texture Values to a Dynamic 3D Model with Fewer Artifacts.

This section describes approaches to applying texture values to dynamic 3D models that, in many cases, avoid introduction of blurriness and noticeable seams in the textured, dynamic 3D models. The approaches can be implemented as part of a rendering component such as a rendering component (290) shown in FIGS. 2a and 2b. The rendering component receives model data for a dynamic 3D model for a frame and texture maps for the frame, and it generates a textured, dynamic 3D model for the frame. In some example implementations, the approaches described in this section extend approaches presented in Orts-Escolano et al., "Holoportation: Virtual 3D Teleportation in Real-time," *Proc. 29th Annual Symposium on User Interface Software and Technology*, 2016 ("Holoportation reference"). Alternatively, the approaches described in this section can be implemented in some other way. The approaches can be used for diverse applications such as 3D telepresence for immersive business conferencing or personal communication, broadcasting of live concerts or other events, and remote education.

A. Introduction.

The Holoportation reference presents approaches to stitching texture details from different viewpoints onto a dynamic 3D model. In many situations, the Holoportation system can provide real-time, high-fidelity 4D reconstruction without any prior knowledge of the imaged objects.

The Holoportation system generates model data for a dynamic 3D model for a current frame. For example, following an approach presented in the Fusion4D reference, the Holoportation system uses fast, non-rigid alignment estimation processes to fuse multiple depth maps into a volumetric representation. The Holoportation system stitches texture values to the dynamic 3D model. For a frame, given a triangle mesh and N texture maps $M_1$, $M_2$, ... $M_N$ streamed from one or more Fusion4D servers, the Holoportation system assigns for each mesh vertex v a vector ($w_v^1$, ..., $w_v^N$) of scalar texture weights. The texture weight field W represents the piecewise linear interpolation of these vectors over the triangle mesh. For each non-occluded vertex v, the Holoportation system calculates a pair of coordinates (x, y) of a corresponding location in each texture map using back-projection. A resulting color $c_v$, to be applied to the point (vertex v), is determined by blending the color values $c_v^i$ at the corresponding locations in the texture maps A using the normalized texture weight field $w_v^i$ for vertex v:

$$c_v = \sum_{i=1}^{N} c_v^i \cdot W_v^i = \sum_{i=1}^{N} \text{texture } 2D(M_i, x, y) \cdot W_v^i, \quad (11)$$

where the function texture2D( ) represents the color value $c_v^i$ at the back-projected location (x, y) in the texture map $M_i$. For each vertex v, the texture weight field $w_v^i$ for the ith input viewpoint/camera is defined as:

$$W_v^i = T_v \cdot \max(0, \hat{n}_v \cdot \text{dir}_i)^\alpha \quad (12),$$

where $T_v$ is a visibility test using dilated depth maps and a coarse-to-fine multi-level majority voting strategy. The term $\hat{n}_v$ is a smoothed normal vector at vertex v, and the term $\text{dir}_i$ is the direction of the ith input viewpoint/camera. The factor $\hat{n}_v \cdot \text{dir}_i$ provides normal-based (normal-weighted) blending of texture values. The term a determines the smoothness of the transition in terms of viewpoint direction, favoring frontal views. The value of a depends on implementation. For example, α is 2.

For the ith input viewpoint/camera, the visibility test T identifies which points of the dynamic mesh are visible. If a point is not visible from the $i^{th}$ input viewpoint/camera, the corresponding weight $w_v^i$ for that point v and viewpoint/camera i is set to zero.

For the visibility test $T_v$, a point can be marked as not visible if the point is occluded by one or more other points of the same object or a different object. The Holoportation system uses a dilated depth map to detect occluded points of regions, which can mitigate ghosting effects and remove other artifacts cased by inexact geometry. Specifically, at each point v on a surface, and for each input viewpoint/camera, the Holoportation system searches for any depth discontinuities in the projected 2D neighborhood of that point v within a rasterized depth map for the input viewpoint/camera. The 2D neighborhood includes locations within a radius of E pixels of the projection for the point v. For example, $\varepsilon=4$. If such a discontinuity in depth values is found, then $W_v^i=0$ for point v.

For the visibility test $T_v$, a point v can also be marked as not visible if the color values of corresponding locations in different texture maps are not sufficiently uniform. For this part of the test, the Holoportation system uses a multi-level, majority voting strategy. For a given vertex v and texture map $M_i$, the Holoportation system searches from coarse to fine levels. A sampled color $c_v^i$ in a texture map $M_i$ is trusted if color values of texture maps from at least half of the visible views for the point v are within a threshold of similarity in the Lab color space. Specifically, the majority voting test for point v is:

$$\sum_{i=1, j \neq i}^{N} (|c_v^i - c_v^j| < \delta) \geq \left\lfloor \frac{X}{2} \right\rfloor, \quad (13)$$

where X indicates the number of visible views and $\delta$ indicates the threshold of similarity. For example, $\delta=0.15$.

When stitching texture values to a dynamic 3D model, using a visibility test with dilated depth maps and a multi-level majority voting strategy can mitigate ghosting effects. Even so, some noticeable artifacts may remain after stitching texture values, especially blurred details and noticeable seams in regions of interest such as human faces. Blurring of details can be caused by several factors. Normal-based blending considers geometry data when setting texture weights, but a mesh may include missing or extruded triangles. Also, normal-based blending of texture values of different texture maps (from different viewpoints) can inappropriately mix texture values with different attributes. For example, divergent color values can be attributable to specular highlights for one viewpoint (but not other viewpoints) due to a light source, or divergent color values can be attributable to different calibration settings in different cameras. Blurring can also be caused by registration errors around seams when projecting texture maps from different viewpoints to geometry of the dynamic 3D model. Some seams (mis-registration seams) can be caused by imprecisely reconstructed geometry with missing triangles, extruded triangles or other problems with mesh geometry data itself. Texture weights of adjacent vertices may favor completely different viewpoints, leading to visible seams. Other seams (occlusion seams) can arise out of discontinuous transitions between texture values across fields-of-view from different cameras, or from self-occlusion of one part of a dynamic 3D model by another part of the dynamic 3D model from a given viewpoint.

This section describes example approaches to stitching multi-view video textures on dynamic 3D models. In many cases, these approaches can account for imprecise or missing mesh geometry information, and can mitigate blurring around seams, while satisfying critical time constraints for real-time and interactive performance. In some example implementations, the approaches improve upon rendering as in the Holoportation system to reduce ghosting effects when blending texture values. For example, instead of normal-based blending, some approaches use viewpoint-dependent rendering to determine the appropriate texture value for a vertex of a dynamic 3D model, which can avoid fuzziness caused by normal-based blending. As another example, some approaches use spatial smoothing of texture weights (e.g., using discrete-differential-geometry-guided geodesic weights to spatially diffuse texture fields) around seams to mitigate visibility of seams of a dynamic 3D model. As still another example, some approaches use temporal smoothing of texture weights (e.g., temporal texture fields) to maintain temporal consistency of textures applied to a dynamic 3D model, which can update the texture weights smoothly and help prevent texture weights from rapidly changing even if output viewpoint changes dramatically.

In some example implementations, the final rendering operation is the same as in the Holoportation system, but texture weights are determined in a different manner. For a frame, given a triangle mesh and N texture maps $M_1$, $M_2$, ..., $M_N$, a rendering component assigns for each mesh vertex v a vector $(w_v^1, \ldots W_v^N)$ of scalar texture weights. For each non-occluded vertex v, the rendering component calculates a pair of corresponding (x, y) coordinates for each texture map using back-projection. Finally, the resulting color $c_v$, to be applied to the point (vertex v), is determined by blending the color values $c_v^i$ at the corresponding locations in the texture maps A using the normalized texture weight field $W_v^i$ for vertex v:

$$c_v = \sum_{i=1}^{N} c_v^i \cdot W_v^i = \sum_{i=1}^{N} \text{texture } 2D(M_i, x, y) \cdot W_v^i, \quad (14)$$

where the function texture2D( ) represents the color value $c_v^i$ at the back-projected location (x, y) in the texture map $M_i$.

For each vertex v, the texture weight field $W_v^i$ for the $i^{th}$ input viewpoint/camera can be defined as described in the following sections. When the texture weights $W_v^i$ are determined, the rendering component can consider the spatial smoothness of the texture weights, temporal consistency of the texture weights, and/or sharpness of rendered views. With respect to spatial smoothness, transitions between texture fields of adjacent vertices should be smooth, because human perception is especially sensitive to texture discontinuities. With respect to temporal consistency, texture fields should vary smoothly over time as a dynamic 3D model changes and/or as the output viewpoint changes. Finally, rendered view should preserve fine-scale detail of input texture maps even if, due to imprecisely reconstructed geometry, applying all texture values onto a dynamic 3D model would result in blurring or ghosting artifacts.

B. Example Workflow.

Figure 6A:
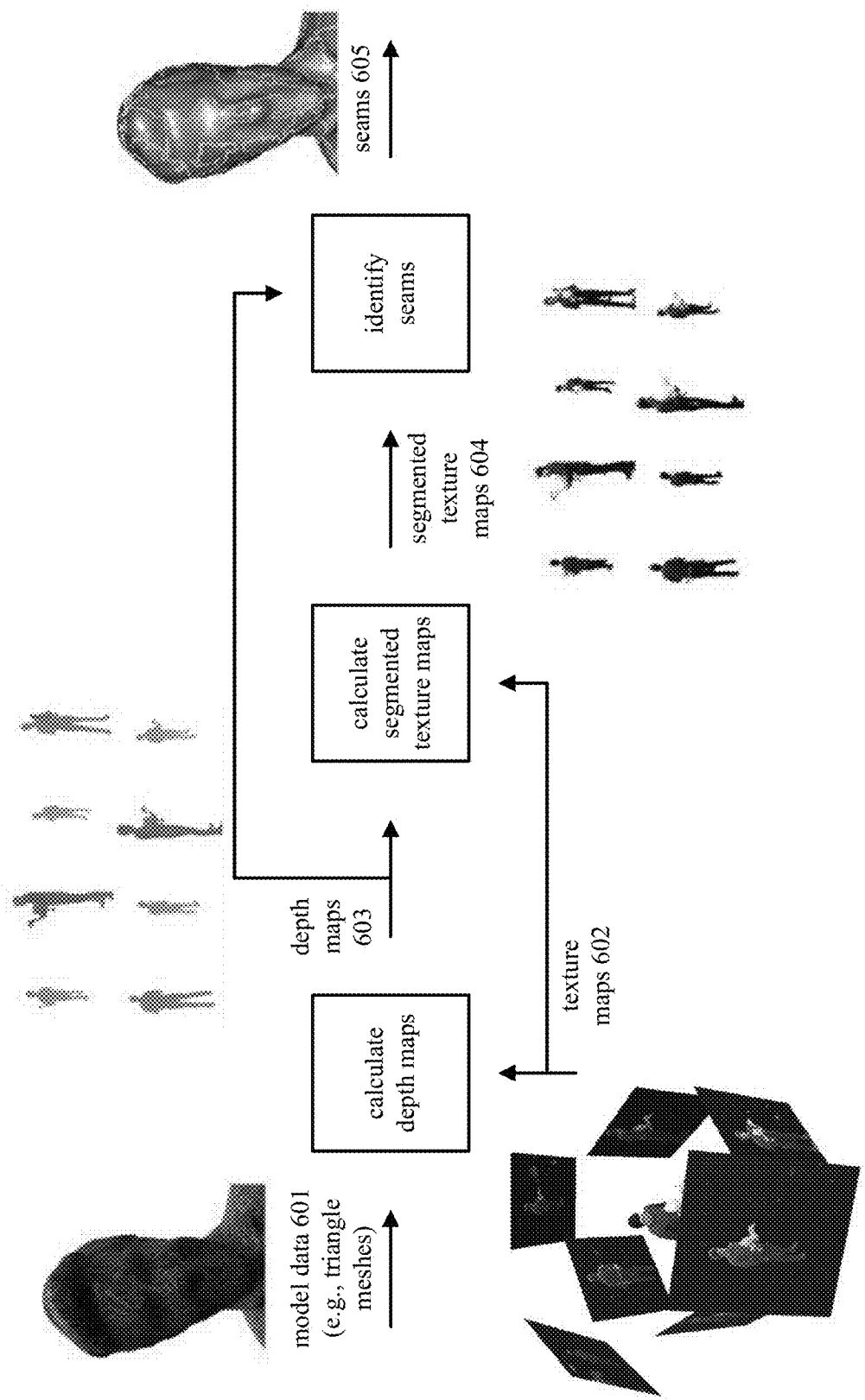

FIGS. 6a and 6b show an example workflow (600) in which texture values of texture maps are applied to a dynamic 3D model using smoothed, viewpoint-dependent texture weights. Operations shown in FIGS. 6a and 6b can be performed, for example, by a rendering component, as described with reference to FIGS. 2a and 2b, that runs on a client computer system.

The rendering component receives a stream of model data (601) for a dynamic 3D model, with the model data (601) being updated on a frame-by-frame basis. For example, the model data (601) is vertex data for a triangle mesh, vertex data for a polygonal mesh, dynamic voxels, or other data defining a deformable, volumetric representation for a dynamic 3D model. The model data (601) can be produced by a fusion component, as described with reference to FIGS. 2a and 2b, that runs on a server computer system.

The rendering component also receives, on a frame-by-frame basis, N texture maps (602) for frames. For a given frame, the N texture maps are captured from N different input viewpoints. For example, the texture maps (602) include texture values (e.g., color values) captured by video cameras from the respective input viewpoints. Alternatively, the texture maps (602) include some other type of texture values (e.g., albedo values, opacity values, values for a dynamic texture atlas, values for dynamic bump maps).

The rendering component can also receive orientation data (607) that indicates the respective N input viewpoints (that is, the pose, direction, perspective, configuration, etc. of the N cameras). The orientation data (607) can specify parameters used for projective mapping from the N input viewpoints (of the cameras) to the model space. The orientation data (607) can be specified for a first frame, with the same input viewpoints used for the video cameras for all frames. Alternatively, the rendering component can receive updated orientation data (607) periodically (e.g., per frame) or intermittently, which allows input viewpoints to change.

The rendering component calculates N rasterized depth maps (603) for a given frame from the texture maps (602) for that frame and model data (601) for the dynamic 3D model for the frame. From each of the N input viewpoints of the cameras for the respective texture maps (602), the rendering component determines a corresponding rasterized depth map (603). The rendering component can determine rasterized depth maps (603) for the N different input viewpoints in parallel with processing units of a GPU. Alternatively, the rendering component can receive the N depth maps (603) from another component.

From the N rasterized depth maps (603) and N texture maps (602) for the frame, the rendering component calculates N segmentation maps. Using the segmentation maps, the rendering component subtracts background details from the texture maps (602), producing N segmented texture maps (604) for the frame. For example, the rendering component processes the texture maps (602) with a background subtraction module, using an efficient real-time process for performing mean field inference. Alternatively, the rendering component can receive the N segmented texture maps (604) from another component.

The rendering component identifies seams (605) in the dynamic 3D model. For example, the seams (605) include occlusion seams and/or mis-registration seams. To identify occlusion seams, the rendering component can estimate dilated depth discontinuities from the rasterized depth maps (603), as described above for the visibility test in the Holoportation system, to identify locations of boundaries of occluded regions from different input viewpoints. Identifying occlusion boundaries can mitigate ghosting artifacts that might otherwise arise when missing geometry data or self-occlusion causes incorrect projection of texture values onto a dynamic 3D model. Thus, for an input viewpoint, the rendering component can use one of the rasterized depth maps (603) to identify boundaries of occluded regions from that input viewpoint based on locations near an edge/cliff in depth values in the depth map from the input viewpoint. To identify mis-registration seams, the rendering component can use a multi-level, majority voting strategy, as described above for the visibility test in the Holoportation system, to identify points for which texture values at corresponding locations in the segmented texture maps (604) are not sufficiently similar. Thus, for a vertex whose projected locations in different segmented texture maps (604) have color values that are not sufficiently similar, the rendering component can identify the vertex as being part of a mis-registration seam. The rendering component can also use the segmented texture maps (604) to determine seams due to each camera's limited field-of-view. Section IV.C describes examples of seams (605) and processes for identifying the seams (605).

As shown in FIG. 6b, after the identification of the seams (605), the rendering component calculates geodesic distance values (606) (or "geodesics") for vertices. For a given vertex, a geodesic distance field can include a value, for each of the N input viewpoints, indicating a straightest geodesic distance to a seam for that input viewpoint. For example, the value indicates the shortest geodesic distance to any of the seams (605)—that is, the geodesic distance to the closest of the seams (605) for the input viewpoint and vertex. The geodesic distance field can also include distance values to other seams. Section IV.D describes examples of ways to compute the geodesic distance values (606).

The rendering component then generates viewpoint-dependent texture weights ("VDTWs") based on the geodesic distance values (606), rasterized depth maps (603), segmented texture maps (604), orientation data (607), and view data (608), generating smoothed VDTWs (609). For example, for a given vertex, for each of the N input viewpoints, the rendering component calculates a base weight depending on the output viewpoint indicated by the view data (608) and one of the input viewpoints indicated by the orientation data (607). In particular, the base weight is dependent on the output viewpoint, which corresponds to the perspective of a virtual (or user) camera of the rendered view.

The rendering component can spatially smooth (diffuse) texture weights using weights based on the geodesic distance values (606), which effectively filters the texture weights in a non-linear manner according to the geodesic distance values (606). This can mitigate, or even eliminate, visible seams for static frames. In practice, for an input viewpoint, the rendering component can use the geodesic distance values (606) to assign a weight of zero to a vertex that is occluded or on one of the seams (605) for the input viewpoint, assign full weight (1) to a vertex far from any of the seams (605) for the input viewpoint, and assign a partial weight (between 0 and 1, depending on distance) to a vertex proximate any of the vertices of the seams (605) of the dynamic 3D model for the input viewpoint. Thus, with respect to contributions of texture values of a texture map from an input viewpoint, the rendering component can decrease weight for vertices close to seams and increase weight for vertices further from seams.

The rendering component can also temporally smooth texture weights in order to increase temporal consistency of the texture weights and thereby improve consistency of rendered views from frame-to-frame. Given an output viewpoint indicated by the view data (608), the rendering component determines viewpoint-dependent texture weights for each of the N input viewpoints/texture maps. If an abrupt change in output viewpoint occurs, the viewpoint-dependent texture weights can rapidly change, causing noticeable, sudden shifts of color values for points in the rendered views. To mitigate such effects when output viewpoint changes, the rendering component can temporally smooth the viewpoint-dependent texture weight so that they are adjusted smoothly over time towards target values of the texture weights.

Section IV.E describes examples of ways to determine and smooth viewpoint-dependent texture weights (609).

The rendering component applies the segmented texture maps (604) to the dynamic 3D model (as specified with the model data (601)) according to the smoothed, viewpoint-dependent texture weights (609), and renders a view of the textured, dynamic 3D model from the output viewpoint indicated by the view data (608). For example, the rendering component overlays sampled texture values from the segmented texture maps (604), as weighted by the smoothed, viewpoint-dependent texture weights (609), over the dynamic 3D model, and renders a view of the textured, dynamic 3D model from the output viewpoint. In practice, the operations of overlaying texture values and rendering can be combined, so that the overlaying operations are only performed for points included in the rendered view from the output viewpoint. For example, the rendering component applies sampled texture values from the segmented texture maps (604), as weighted by the smoothed, viewpoint-dependent texture weights (609), to the dynamic 3D model for each location in a rendered view. The rendering component can also perform post-processing for screen-space ambient occlusion.

C. Examples of Identification of Seams.

When projecting and applying texture values onto a dynamic 3D model, occlusion seams and mis-registration seams can cause undesired background pixels, ghosting artifacts, and/or blurred regions to appear in rendered views. To mitigate such artifacts, a rendering component can identify seams in the dynamic 3D model from the different input viewpoints, and perform additional operations when applying texture values for points around the seams. This section describes examples of ways to identify seams in a dynamic 3D model from different input viewpoints.

In some example implementations, a rendering component identifies seams caused by self-occlusion, lighting conditions, and/or field-of-view transitions between cameras. Alternatively, a rendering component can identify other types of seams. When the dynamic 3D model is a mesh of triangles, the rendering component can identify seam triangles in the dynamic 3D model by reviewing the respective triangles of the mesh. Alternatively, the rendering component can represent points of seams in a dynamic 3D model in some other way.

An occlusion seam can correspond to a boundary of a region of missing data in a texture map/depth map from an input viewpoint, due to occlusion of the region by another object or by part of the same object, or to a boundary of a background region. A triangle may be identified as a seam triangle at an occlusion boundary if one or two vertices of the triangle are occluded in a depth map (or dilated depth map) from an input viewpoint, but the other vertex/vertices of the triangle are not occluded from that input viewpoint. Thus, if at least one vertex of the triangle is visible from the input viewpoint, but at least one other vertex of the triangle is not visible from the input viewpoint, the triangle is deemed to be part of an occlusion seam. Also, a triangle can be identified as being part of an occlusion seam if at least one vertex, but not every vertex, of the triangle is projected to be in a subtracted background region of the texture map for an input viewpoint.

An occlusion seam can also correspond to a boundary of a field-of-view from an input viewpoint. A triangle may also be identified as a seam triangle at an occlusion boundary if one or two vertices of the triangle are outside the field-of-view from an input viewpoint, but the other vertex/vertices of the triangle are inside the field-of-view from that input viewpoint. Thus, for example, a triangle can be identified as being part of an occlusion seam if at least one vertex, but not every vertex, of the triangle is projected to be outside the field-of-view of the texture map for an input viewpoint.

A mis-registration seam results from registrations of texture values of texture maps from different input viewpoints that do not match at an overlap. A triangle may be identified as a seam triangle at a mis-registration boundary if vertices of the triangle have different results according to a majority voting test, which might be caused by mis-registration or self-occlusion. In this context, a vertex "passes" a majority voting test if a threshold number of corresponding locations in texture maps for that vertex have sufficiently similar texture values, but otherwise "fails" the majority voting test. (Section IV.A describes an example majority voting test.) In some example implementations, if at least one vertex of a triangle "passes" the majority voting test but at least one vertex of the triangle "fails" the majority voting test, the triangle is deemed to be part of a mis-registration seam. In other example implementations, if vertices of a triangle have different counts of corresponding locations with sufficiently similar texture values, the triangle is deemed to be part of a mis-registration seam.

Figure 7C:
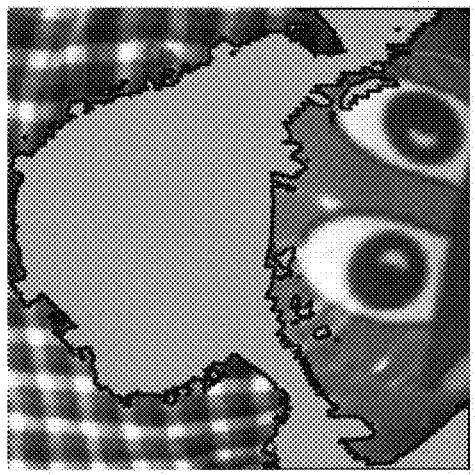
FIGS. 7a-7e are images illustrating examples of seams.
Figure 7B:
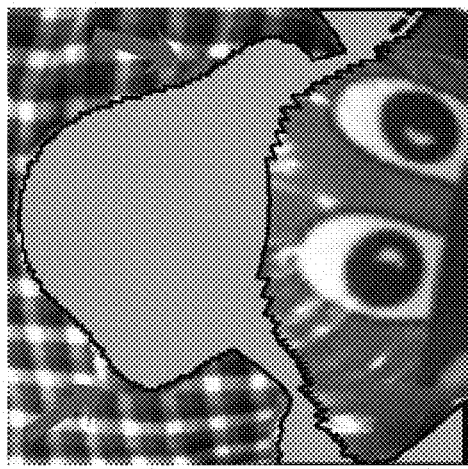
Figure 7A:
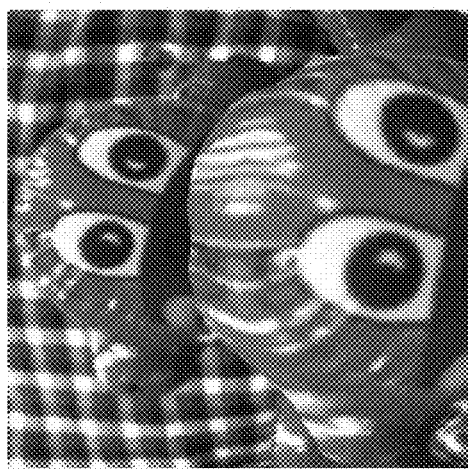

The image (701) of FIG. 7a shows the raw results of projection-mapping an input texture map, captured from an input viewpoint below a figure and facing upward, to a dynamic 3D model of the figure. For the output viewpoint, the image (701) exhibits ghosting artifacts—phantom details of the stuffed toy appear over the plaid shirt of the figure—because the region with the ghosting artifacts was occluded by the stuffed toy from the input viewpoint. The image (702) of FIG. 7b shows seams and occluded regions, overlaid on the projection mapping of FIG. 7a, after detection of occlusion boundaries with dilated depth maps. The image (703) of FIG. 7c shows seams and occluded regions, overlaid on the projection mapping of FIG. 7a, after application of the majority voting test. Detection of occlusion with dilated depth maps fails to remove some ghosting artifacts (marked with arrows in FIG. 7b), but the majority voting test removes most of the ghosting artifacts.

Figure 7E:
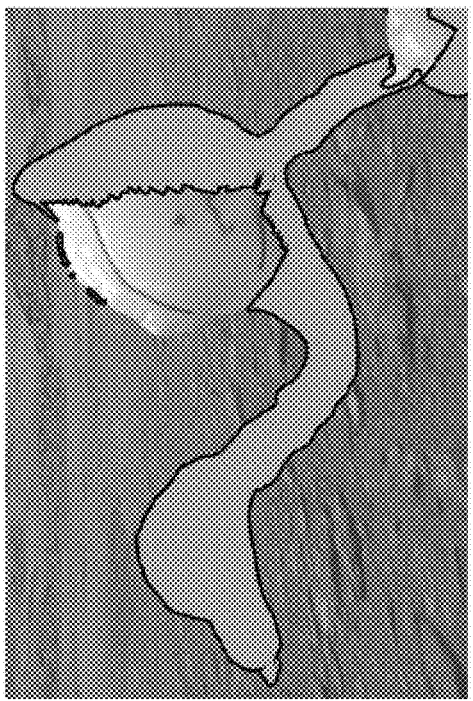
Figure 7D:
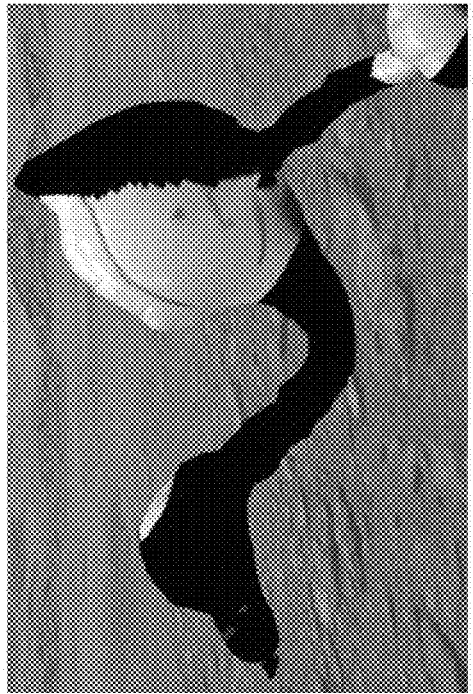

The image (704) of FIG. 7d shows the raw results of projection-mapping an input texture map, captured from an input viewpoint above a figure and facing downward, to a dynamic 3D model of the figure. The image (705) of FIG. 7e shows seams and occluded regions, overlaid on the projection mapping of FIG. 7d, after application of a field-of-view test.

D. Examples of Diffusion of Geodesic Distance Values Around Seams.

In many scenarios, a relatively small percentage (e.g., 1%) of triangles of a dynamic 3D model are identified as seam triangles. Texture weights for points at or near seams can be attenuated for those input viewpoints affected by the seams. This section describes ways of quantifying how much texture weights should be attenuated for points at or near seams. In particular, in some example implementations, geodesic distance values from points to seams are calculated using a diffusion procedure as described in this section. After the geodesic distance values are calculated, they can be used to adjust texture weights, as described in section IV.E.

Figure 8A:
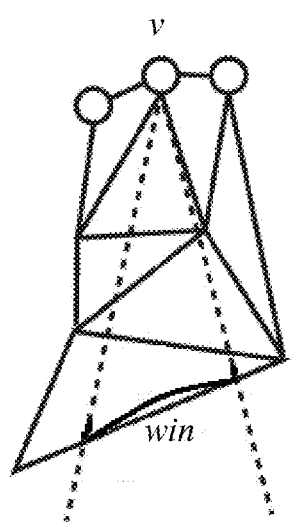
FIGS. 8a-8c are diagrams illustrating features of calculation of geodesic distance values.
Figure 8B:
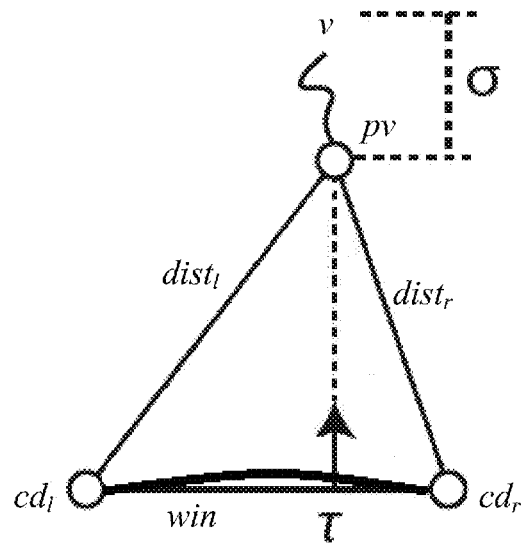
Figure 8C:
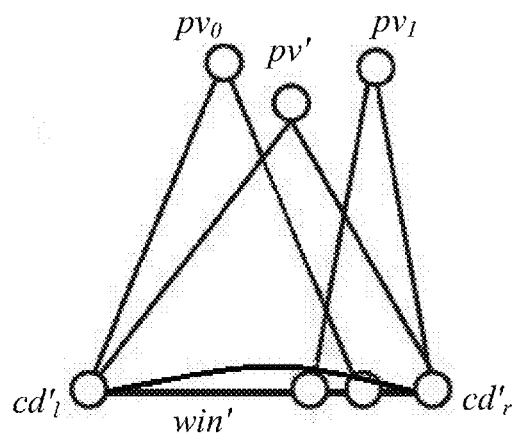

Geodesic distance values can be calculated as described in Surazhsky et al., "Fast Exact and Approximate Geodesics on Meshes," *ACM Transactions on Graphics* (2005) ("Surazhsky reference"). In general, suppose S is a piecewise planar surface defined by a triangle mesh. The geodesic distance function is $\mathcal{D}: S \mapsto \mathbb{R}$. The vertices $V_s \in S$ from seam triangles are source vertices for calculating geodesic distance values. For any point $p \in S$, the geodesic distance value is the length of the geodesic path (p) from p back to the closest seam vertex $v \in V_s$. For each edge e, a small number of windows win(e) are maintained. The diagram (801) of FIG. 8*a* shows a geodesic window win from a single source vertex v. The diagram (802) of FIG. 8*b* shows components within a window. A window consists of a pair of coordinates $(cd_1, cd_r)$ (counterclockwise). Corresponding geodesic distances $(dist_1, dist_r)$ to the closest pseudo-source pv, the direction of the geodesic path τ, and the geodesic length σ=(pv) are also maintained. The position of pv can be calculated by intersecting two circles. When propagating a window $win_1(e)$ with another window $win_0(e)$ on the same edge, the two windows can be merged—$win'(e)=win_0(e) \cup win_1(e)$—if the directions $\tau_0$ and $\tau_1$ agree with each other, and the estimated geodesic lengths are within a bounded error: $|\mathcal{D}(win_1) - \mathcal{D}(win_1)|<$threshold. The diagram (803) of FIG. 8*c* shows the merging process of two overlapping windows (having pseudo-sources $pv_0$ and $pv_1$) for approximation as a new window win' having a pseudo-source pv' and coordinates $cd'_l$ and $cd'_r$.

Figure 9:
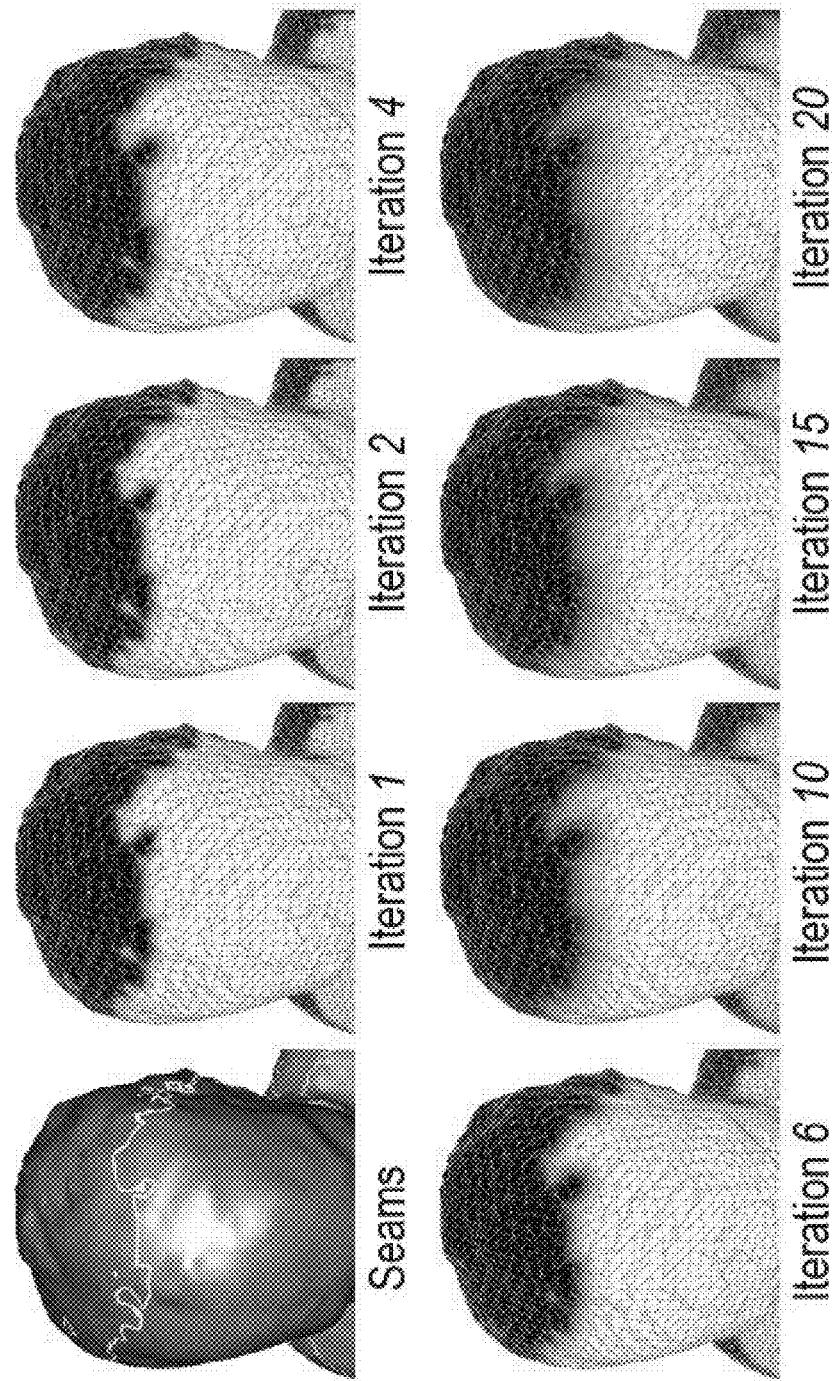
FIG. 9 is a set of images illustrating iterative updating of geodesic distance values for points near a seam.

Geodesic distance values can be iteratively diffused starting from seam triangles and moving towards non-occluded triangles. In some example implementations, in order to allow for interactive rates of rendering, diffusion extends at most m triangles from the seam triangles in M iterations. The values of m and M depend on implementation. For example, m is 15, and M is 20. In the propagation process, two windows are maintained per edge—the rest are discarded. Setting m<M allows each vertex's minimum geodesic distance field to be updated from the vertices that are M−m edges away. FIG. 9 shows an example (900) of iterative updating of geodesic distance values for points near a seam, which shows propagation of the geodesic distance values away from the same. Subsequent filtering of texture weights spatially near the seams, using the geodesic distance values, can mitigate perceptible artifacts around the seams.

For additional details about calculation of geodesic distance values, see the Surazhsky reference. Alternatively, geodesic distance values can be calculated in some other way. Or, adjustments to texture weights for points, depending on proximity to seams, can be quantified in some other way.

E. Examples of Determining Texture Weights and Smoothing Texture Weights.

This section describes various ways to compute determine weights used when blending texture values of texture maps to apply to points of a dynamic 3D model. Texture weights can be determined using normal-based blending or in a viewpoint-dependent manner. Texture weights can be adjusted by various factors depending on the visibility of points or the significance of input viewpoints. Texture weights can be smoothed spatially around seams and/or smoothed temporally, or not smoothed at all.

As explained in section IV.A, in prior approaches, texture weights $W_v^i$ for the $i^{th}$ input viewpoint/camera and a vertex v are calculated with normal-based blending:

$$W_v^i = T_v \cdot \max(0, \hat{n}_v \cdot dir_i)^\alpha, \qquad (15)$$

where the factor $\hat{n}_v \cdot dir_i$ indicates the dot product between the smoothed normal vector $\hat{n}_v$ at vertex v and the direction $dir_i$ of the $i^{th}$ input viewpoint/camera. $T_v$ is a visibility test at vertex v using dilated depth maps and a multi-level majority voting strategy, and the term a determines the smoothness of transitions in terms of viewpoint direction, favoring frontal views. Normal-based blending can cause blurriness or fuzziness in rendered views.

To mitigate such artifacts, a rendering component can calculate viewpoint-dependent texture weights. For example, texture weights $W_v^1$ for the $i^{th}$ input viewpoint/camera and a vertex v are calculated as:

$$W_v^i = T_v \cdot \max(0, dir_o \cdot dir_i)^\alpha \qquad (16),$$

where the factor $dir_o \cdot dir_i$ indicates the dot product between two vectors—the direction $dir_o$ of the output viewpoint (for a virtual camera of a user) and the direction $dir_o$ of the $i^{th}$ input viewpoint/camera. This factor produces a highest weight when the direction $dir_o$ of the output viewpoint perfectly aligns with the direction $dir_i$ of the $i^{th}$ input viewpoint/camera, in which case the $i^{th}$ input viewpoint/camera is understood to provide the "best" information. On the other hand, this factor produces a weight of zero when the direction $dir_o$ of the output viewpoint is orthogonal to the direction $dir_i$ of the $i^{th}$ input viewpoint/camera, in which case the $i^{th}$ input viewpoint/camera provides no information for a view from the direction of the output viewpoint. (Because of the max(0,x) function, the $i^{th}$ input viewpoint/camera also provides no information for a view from an output viewpoint opposite the $i^{th}$ input viewpoint/camera.)

Texture weights for a given viewpoint/camera can be adjusted using a global visibility score for that viewpoint/camera. For example, texture weights $W_v^i$ for the $i^{th}$ input viewpoint/camera and a vertex v can be calculated as:

$$W_v^i = T_v \cdot g^i \cdot \max(0, dir_o \cdot dir_i)^\alpha \qquad (17),$$

where $g^i$ is a normalized global visibility score of the $i^{th}$ input viewpoint/camera. The normalized global visibility score $g^i$ can be calculated as the number of visible vertices from the $i^{th}$ input viewpoint/camera. Using a global visibility score can reduce texture weights for less significant views. Alternatively, a global visibility score can be used for texture weights computed with normal-based blending (e.g., as an additional term $g^i$ in equation (15)).

Texture weights can be spatially smoothed in order to decrease contributions from points near seams and increase contributions from points farther away from seams. For example, texture weights for the $i^{th}$ input viewpoint/camera and a vertex v can be calculated as:

$$W_v^i = T_v \cdot g^i \cdot \gamma_v^i \cdot \max(0, dir_o \cdot dir^\alpha) \qquad (18),$$

where $\gamma_v^i$ indicates diffusion weights for the vertex v. For the vertex v, there is a diffusion weight per texture map $M_i$. For the texture map $M_i$, the diffusion weight can be the minimum length of equidistance geodesics for vertex v to the seams from the $i^{th}$ input viewpoint/camera. Alternatively, diffusion weights can quantify some other measure of distance between points and seams. For example, the diffusion weight for the texture map $M_i$ is 1 if the vertex v is in an "interior" region away from seams from the perspective of the $i^{th}$ input viewpoint/camera, is 0 if the vertex v is on a seam or occluded region from the perspective of the $i^{th}$ input viewpoint/camera, and increases from 0 to 1 as the vertex v is further from any seam from the perspective of the $i^{th}$ input viewpoint/camera. Alternatively, spatial smoothing can be used on texture weights calculated without a global visibility score $g^i$. For highly occluded regions, if $\Sigma_i \gamma_v^i < 1$, the rendering component can apply texture values as in equation (15), with normal-based blending, to fill in missing texture values.

If the texture value contribution from the $i^{th}$ input viewpoint/camera for a vertex v changes dramatically (e.g., from 0.1 to 0.9 over a single frame or other short period), there could be perceptible artifacts. Texture weights can be temporally smoothed in order to increase temporal consistency from frame-to-frame. This can prevent texture weights from changing too quickly during sudden view transitions. Instead, the texture value contribution from the $i^{th}$ input viewpoint/camera for a vertex v changes gradually (e.g., from 0.1 to 0.9 over a period of 15 or 20 frames). For example, suppose initial, target texture weights for the $i^{th}$ input viewpoint/camera and a vertex v for a current frame t are defined as in equation (15), (16), (17), or (18). For the $i^{th}$ input viewpoint/camera and vertex v, the final texture weights $W_v^i(t)$ for the current frame t are calculated using the texture weights $W_v^i(t-1)$ for the previous frame as:

$$W_v^i(t) = W_v^1(t-1) + \lambda \cdot \nabla W_v^i(t) \qquad (19),$$

where $\lambda$ is a rate factor that controls how quickly texture weights can transition to target values, and $\Box W_v^i(t)$ represents a smoothed gradient towards the initial, target texture weights for the $i^{th}$ input viewpoint/camera and vertex v for the current frame t. The gradient quantifies changes from the texture weights $W_v^i(t-1)$ for the previous frame to the initial, target texture weights. The rate factor X depends on implementation. For example, $\lambda=0.05$.

Alternatively, texture weights can be temporally smoothed in some other way. For example, the texture weights for the current frame t are calculated as a linear combination of the initial, target texture weights and texture weights from one or more previous frames.

After the texture weights have been calculated, the rendering component can normalize the texture weights and apply sampled texture values to points of the dynamic 3D model as in equation (11).

F. Example Techniques for Using Smoothed Texture Weights When Applying Texture Values.

Figure 10:
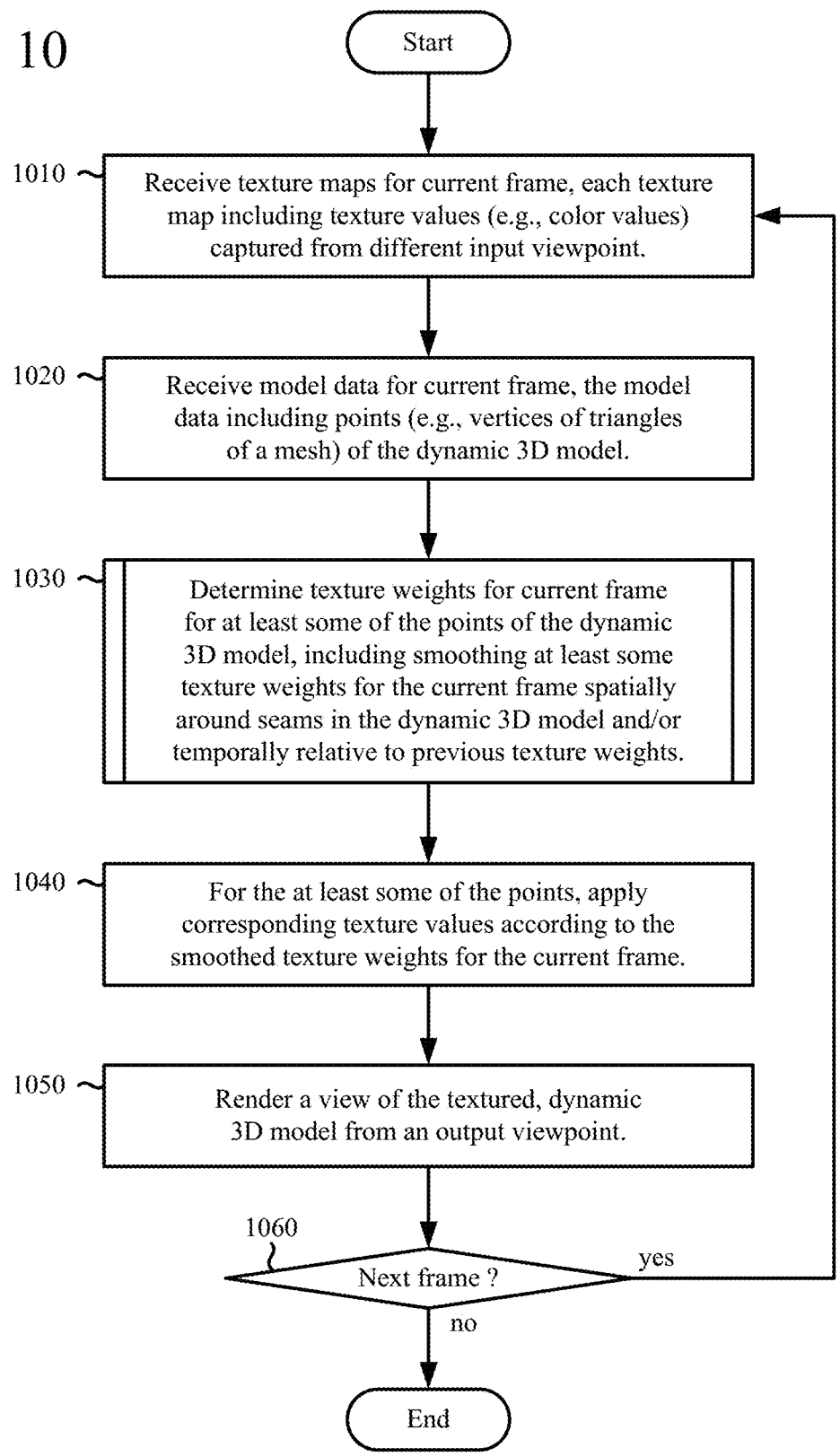
FIG. 10 is a flowchart illustrating a generalized technique for applying texture values of texture maps to a dynamic 3D model using smoothed texture weights.

FIG. 10 shows a generalized technique (1000) for applying texture values of texture maps to a dynamic 3D model of a computer-represented environment using smoothed texture weights. A rendering component such as a rendering component (290) shown in FIGS. 2a and 2b can perform the technique (1000).

The rendering component receives (1010), e.g., in a buffer, texture maps for a current frame. Each of the texture maps includes texture values captured from a different input viewpoint in the computer-represented environment. The texture values are typically color values (e.g., RGB values) of images, but can alternatively be some other type of texture values (e.g., opacity values, specularity coefficients). For use in later operations, the rendering component can determine segmentation maps for the respective texture maps and subtract background details from the texture maps, respectively, to isolate texture values for one or more objects of the dynamic 3D model in the respective texture maps.

The rendering component also receives (1020), e.g., in a buffer, model data for the current frame. The model data includes points of the dynamic 3D model. The points of the dynamic 3D model are, for example, vertices of a mesh of triangles or voxels of a volumetric representation.

The rendering component determines (1030) texture weights for the current frame for at least some of the points of the dynamic 3D model. In doing so, the rendering component smoothes at least some of the texture weights for the current frame spatially around seams in the dynamic 3D model and/or temporally relative to previous texture weights. For example, texture weights can be smoothed spatially around the seams in the dynamic 3D model, as described with reference to FIG. 11 or using another approach. Or, as another example, texture weights can be smoothed temporally relative to the previous texture weights, as described with reference to FIG. 12 or using another approach. Or, as another example, texture weights can be smoothed spatially around the seams in the dynamic 3D model and smoothed temporally relative to the previous texture weights.

The texture weights for the current frame can include, for each point among the at least some of the points of the dynamic 3D model, a scalar weight per different input viewpoint. The texture weights can be viewpoint-dependent texture weights. In this case, the determining (1020) the texture weights for the current frame includes, for a given point among the at least some points of the dynamic 3D model, for a given input viewpoint among the different input viewpoints, determining a base weight based at least in part on the given input viewpoint and the output viewpoint.

After determining (1030) the texture weights, for the at least some of the points of the dynamic 3D model, the rendering component applies (1040) corresponding texture values from the texture maps according to the smoothed texture weights for the current frame. For example, for a given point among the points of the dynamic 3D model, for each of the texture maps, the rendering component projects the given point to a location in the texture map and scales a texture value at the location in the texture map by one of the texture weights for the different input viewpoint of the texture map. The rendering component combines the scaled texture values for the given point. Finally, the rendering component renders (1050) a view of the textured (with applied texture values), dynamic 3D model from an output viewpoint. For the same frame, the rendering component can render one or more additional views of the textured, dynamic 3D model from the same output viewpoint or one or more different output viewpoints.

The rendering component checks (1060) whether to continue with the next frame. If so, the rendering component receives (1010) texture maps and receives (1020) model data for the next frame, as the current frame.

FIG. 11 shows an example technique (1100) for spatial smoothing of texture weights. The example technique (1100) can be performed as part of determining (1030) texture weights.

To start, the rendering component identifies (1110) seams in the dynamic 3D model. For example, the rendering component identifies points of the dynamic 3D model that are occluded from a given input viewpoint among the different input viewpoints but adjacent to points of the dynamic 3D model that are not occluded from the given input viewpoint. In this way, the rendering component can identify instances of self-occlusion among the points of the dynamic 3D model from the different input viewpoints. Or, the rendering component identifies points of the dynamic 3D model whose corresponding texture values from different ones of the texture maps fail to satisfy a threshold of similarity (e.g., according a majority voting test). In this way, the rendering component can identify instances of lighting differences or camera calibration differences between the different input viewpoints. Or, the rendering component identifies points of the dynamic 3D model whose projections are within a field-of-view of the given input viewpoint but adjacent to points of the dynamic 3D model whose projections are outside the field-of-view of the given input viewpoint. In this way, the rendering component can identify instances of points of the dynamic 3D model at the boundaries of fields-of-view of the respective input viewpoints. Section IV.C describes examples of ways to identify (1110) seams.

After calculating base weights (e.g., viewpoint-dependent weights or normal-based weights), the rendering component attenuates (1120) at least some of the texture weights, with attenuation increasing as distance to a nearest one of the seams decreases. For example, the rendering component computes geodesic distances from the seams in the dynamic 3D model to at least some points in the dynamic 3D model, and at least some of the texture weights are attenuated using the geodesic distances. Section IV.D describes examples of ways to calculate geodesic distance values.

For a given input viewpoint among the different input viewpoints, the rendering component optionally applies (1130) a global visibility score for the given input viewpoint. Section IV.E describes examples of global visibility scores.

The rendering component also applies (1140) a threshold test, based at least in part upon the model data and rasterized depth maps for the current frame from the different input viewpoints, respectively, for the at least some of the points of the dynamic 3D model from the output viewpoint. The rasterized depth maps for the current frame can be determined, based at least in part upon the model data and orientation data indicating the different input viewpoints for the respective texture maps. For example, to apply (1140) the threshold test, for a given point among the at least some of the points of the dynamic 3D model, the rendering component sets a scalar weight to zero for a given input viewpoint among the different input viewpoints if: (a) the given point is not visible from the given input viewpoint, (b) the given point is within a threshold distance of an edge of the dynamic 3D model from the given input viewpoint, the edge being characterized by depth discontinuity in the rasterized depth map from the given input viewpoint, and/or (c) corresponding texture values from different ones of the texture maps fail to satisfy a threshold of similarity. Sections IV.A and IV.E describes examples of threshold tests using dilated depth maps and majority voting strategies.

FIG. 12 shows an example technique (1200) for temporal smoothing of texture weights. The example technique (1200) can be performed as part of determining (1030) texture weights.

The rendering component determines (1210) a gradient of texture weights for a current frame. Next, the rendering component scales (1220) the gradient by a rate factor. Finally, the rendering component adds (1230) the scaled gradient to texture weights for a previous frame. Alternatively, the rendering component can temporally smooth texture weights in some other way, e.g., scaling initial texture weights for a current frame, scaling previous texture weights, and combining the scaled initial texture weights for the current frame and the scaled previous texture weights. Section IV.E describes examples of ways to perform temporal smoothing of texture weights.

G. Example Techniques for Using Viewpoint-Dependent Texture Weights When Applying Texture Values.

FIG. 13 shows a generalized technique (1300) for applying texture values of texture maps to a dynamic 3D model of a computer-represented environment using viewpoint-dependent texture weights. A rendering component such as a rendering component (290) shown in FIGS. 2a and 2b can perform the technique (1300).

The rendering component receives (1310), e.g., in a buffer, texture maps for a current frame. Each of the texture maps includes texture values captured from a different input viewpoint in the computer-represented environment. The texture values are typically color values (e.g., RGB values) of images, but can alternatively be some other type of texture values (e.g., opacity values, specularity coefficients).

The rendering component also receives (1320), e.g., in a buffer, model data for the current frame. The model data includes points of the dynamic 3D model. The points of the dynamic 3D model are, for example, vertices of a mesh of triangles or voxels of a volumetric representation.

The rendering component determines (1330) viewpoint-dependent texture weights for the current frame for at least some of the points of the dynamic 3D model. In doing so, for a given point among the at least some points of the dynamic 3D model, for a given input viewpoint among the different input viewpoints, the rendering component determines a base weight based at least in part on the given input viewpoint and an output viewpoint. The viewpoint-dependent texture weights for the current frame can include, for each point among the at least some of the points of the dynamic 3D model, a scalar weight per different input viewpoint. The rendering component can smooth at least some of the viewpoint-dependent texture weights for the current frame spatially around seams in the dynamic 3D model and/or temporally relative to previous texture weights, as described with reference to FIGS. 10-12 and Section IV.E.

Then, for the at least some of the points of the dynamic 3D model, the rendering component applies (1340) corresponding texture values according to the viewpoint-dependent texture weights for the current frame. For example, for a given point among the points of the dynamic 3D model, for each of the texture maps, the rendering component projects the given point to a location in the texture map and scales a texture value at the location in the texture map by one of the viewpoint-dependent texture weights for the different input viewpoint of the texture map. The rendering component combines the scaled texture values for the given point. Finally, the rendering component renders (1350) a view of the textured, dynamic 3D model from an output viewpoint. For the same frame, the rendering component can render one or more additional views of the textured, dynamic 3D model from the same output viewpoint or one or more different output viewpoints.

The rendering component checks (1360) whether to continue with the next frame. If so, the rendering component receives (1310) texture maps and receives (1320) model data for the next frame, as the current frame.

H. Results.

In some example implementations, a rendering component uses seam identification, spatial smoothing of texture weights based on geodesic distance fields, temporal smoothing of transitions between texture fields, and viewpoint-dependent texture weights when blending video textures onto dynamic 3D meshes. Such a rendering component can blend video textures onto dynamic 3D meshes in an interactive, real-time manner, with nearly indiscernible view transitions. Compared to previous approaches (such as those used in the Holoportation system), rendered views are sharper, allowing users to discern facial expressions and other fine details for immersive telepresence and communication applications. In some example implementations, interactive, real-time rendering at frame rates of 100 frames per second, or higher, is provided using commodity hardware.

Figure 14A:
FIGS. 14a-14m are images illustrating various aspects of applying texture values of texture maps to a dynamic 3D model using smoothed, viewpoint-dependent texture weights.
Figure 14B:
Figure 14C:
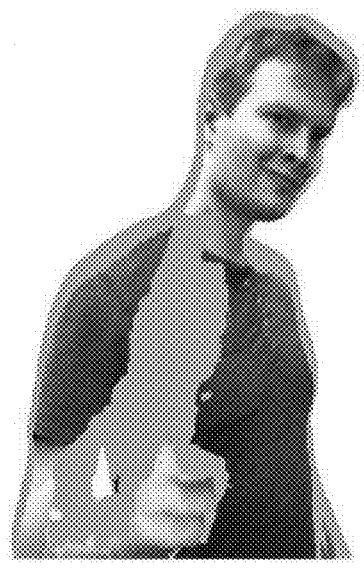
Figure 14D:
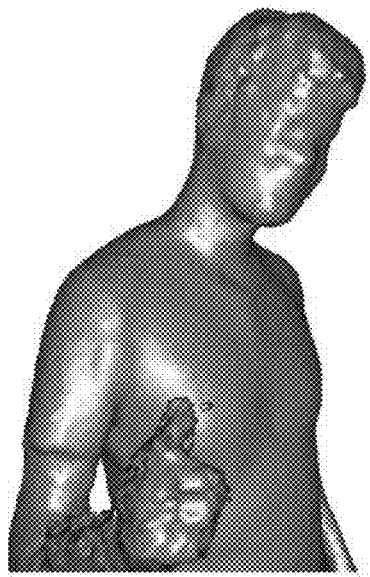
Figure 14E:
Figure 14F:
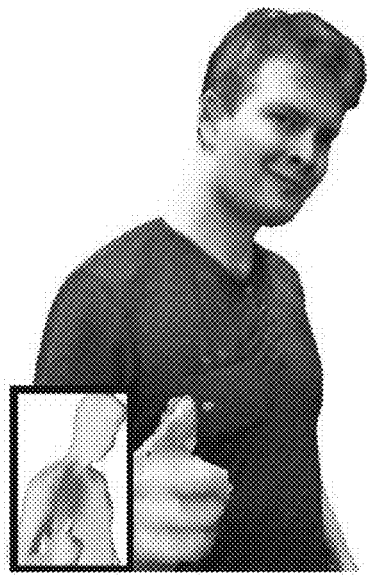

FIGS. 14a-14f show an example of how using smoothed, viewpoint-dependent texture weight fields can improve rendering quality. The image (1401) of FIG. 14*a* shows the raw results of projection-mapping an input texture map, captured from an input viewpoint below a figure and facing upward, to a dynamic 3D model of the figure. The image (1402) of FIG. 14*b* shows pixels culled after applying a simple visibility test to remove occluded points. From the input viewpoint, the occluded points are behind the forearm and hand. The image (1403) of FIG. 14*c* shows pixels culled after applying a visibility test with dilated depth maps and a majority voting strategy. Compared to the image (1402) of FIG. 14*b*, additional pixels are culled around edges. For comparison, the image (1404) of FIG. 14*d* shows the dynamic 3D model. The image (1406) of FIG. 14*f* shows the results of rendering using smoothed, viewpoint-dependent texture weights, along with the texture weights (overlay). The image (1405) of FIG. 14*e* shows the results of rendering with the Holoportation system, along with the texture weights (overlay). Ghosting artifacts (such as the extra forearm and hand of the image (1401) of FIG. 14*a*) are mitigated in the image (1405) of FIG. 14*e*, but some details are blurred and some visible seams are introduced. In contrast, the image (1406) of FIG. 14*f* lacks such blurred details and visible seams, and ghosting artifacts are still mitigated.

Figure 14G:
Figure 14H:
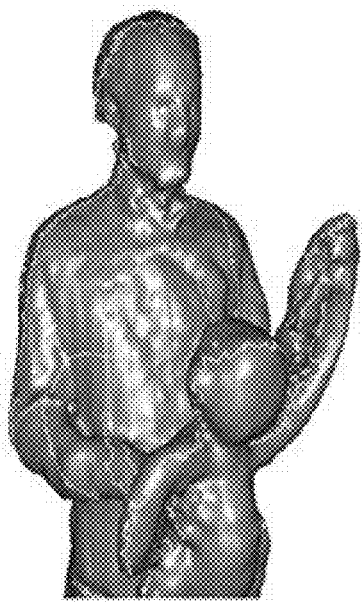
Figure 14I:
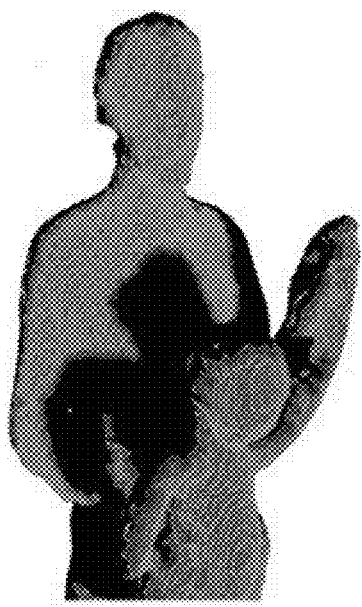
Figure 14J:
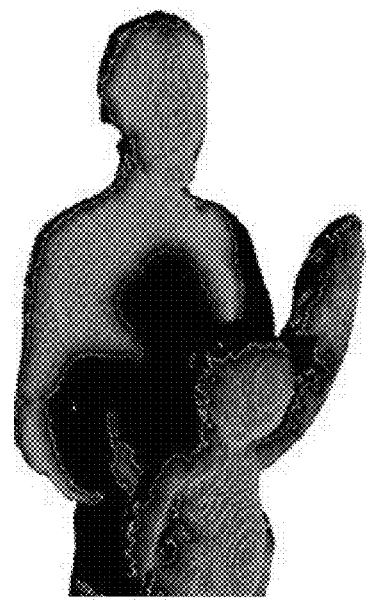
Figure 14K:
Figure 14L:

FIGS. 14*g*-14*l* show another example of how using smoothed, viewpoint-dependent texture weight fields can improve rendering quality. The image (1407) of FIG. 14*g* shows results of projection-mapping an input texture map to a dynamic 3D model of a figure, with pixels culled after applying a simple visibility test. (The input texture map was captured from an input viewpoint below and to the right of a figure, facing upward and to the left. From the input viewpoint, the occluded points are behind the stuffed toy.) The image (1408) of FIG. 14*f* shows the dynamic 3D model and seams (highlighted) caused by occlusion or field-of-view transitions. The images (1409, 1410) of FIGS. 14*i* and 14*j* illustrate the results of spatial diffusion of texture weights for the input texture map, with weights being attenuated near the seams. The image (1412) of FIG. 14*l* shows the results of rendering using smoothed, viewpoint-dependent texture weights. The image (1411) of FIG. 14*k* shows the results of rendering with the Holoportation system. Ghosting artifacts (such as "phantom" details from the stuffed toy) are mitigated in the image (1411) of FIG. 14*k*, but some details are blurred and some visible seams are introduced. In contrast, the image (1412) of FIG. 14*l* lacks such blurred details and visible seams, and ghosting artifacts are still mitigated.

Figure 14M:
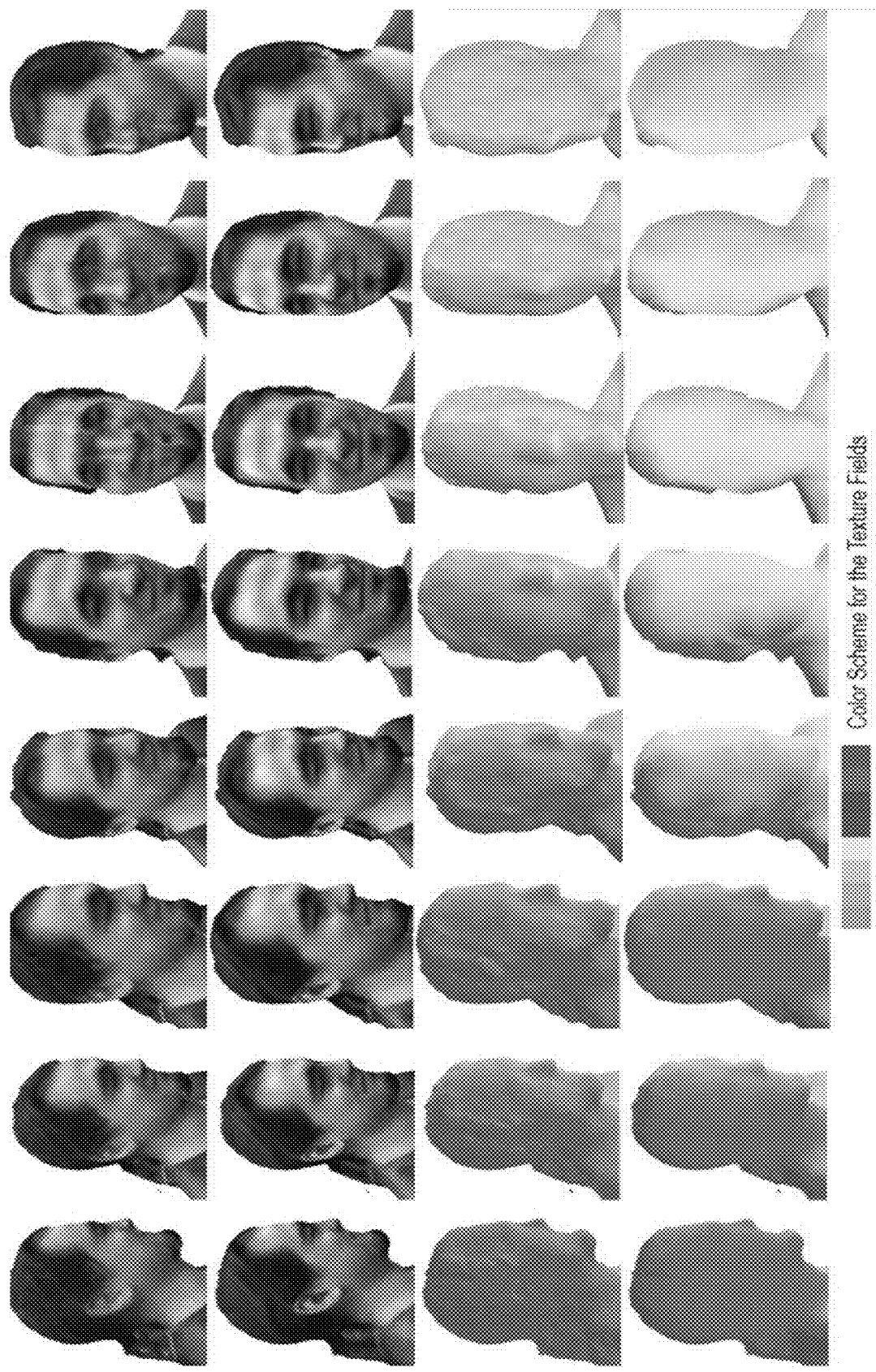

Finally, for eight different input viewpoints captured for a given frame and rendered across 40 output views, the image (1413) of FIG. 14*m* juxtaposes the results of rendering with the Holoportation system (top row) with the results of rendering that uses smoothed, viewpoint-dependent texture weight fields (second row). The image (1413) of FIG. 14*m* also shows the texture weights used by the Holoportation system (third row) and new approaches (fourth row). By using smoothed, viewpoint-dependent texture weights, the new approaches largely avoid blurring of details and introduction of visible seams, while also providing for smooth transitions in space and time.

I. Alternatives and Variations.

When geometry data includes extruded triangles (e.g., due to reconstruction during very fast motion), the results of rendering with smoothed, viewpoint-dependent texture weights can still include visible artifacts. In this situation, re-meshing of the geometry data can eliminate or smooth over extruded triangles.

In some cases, texture values of input texture maps are not sufficiently reliable. For offline applications, gaps can be filled using user-guided in-painting and seamless cloning. For real-time, interactive applications, gaps can be filled by interpolation without user intervention.

V. Special Effects for Rendered Views of a Textured, Dynamic 3D Model.

This section describes ways to specify and apply special effects for rendered views of a textured, dynamic 3D model. Some special effects can alter the outlines of objects or texture details of objects in the dynamic 3D model. Other special effects can add or alter background details or foreground details. Still other special effects can adjust lighting sources, add objects, or cause other changes. With such effects, a broadcaster, editor, content author, or other contributor can assert artistic control over the presentation of the textured, dynamic 3D model, even when texture values and model data for the dynamic 3D model are provided to end users on a real-time, interactive basis.

A. Example Architectures for Providing Special Effects.

Figure 15A:
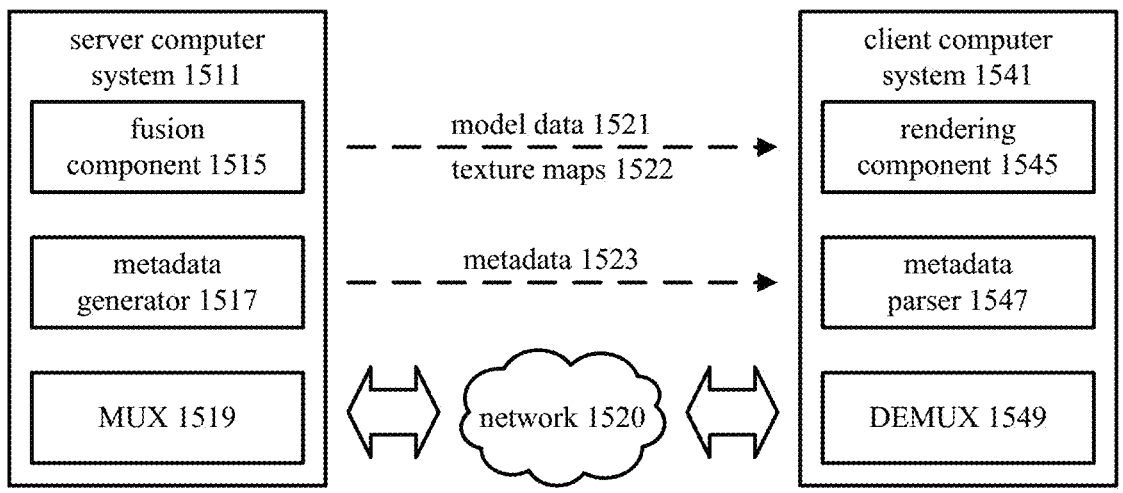
FIGS. 15a and 15b are diagrams illustrating example architectures for providing and applying special effects to rendered views of textured, dynamic 3D models.
Figure 15B:
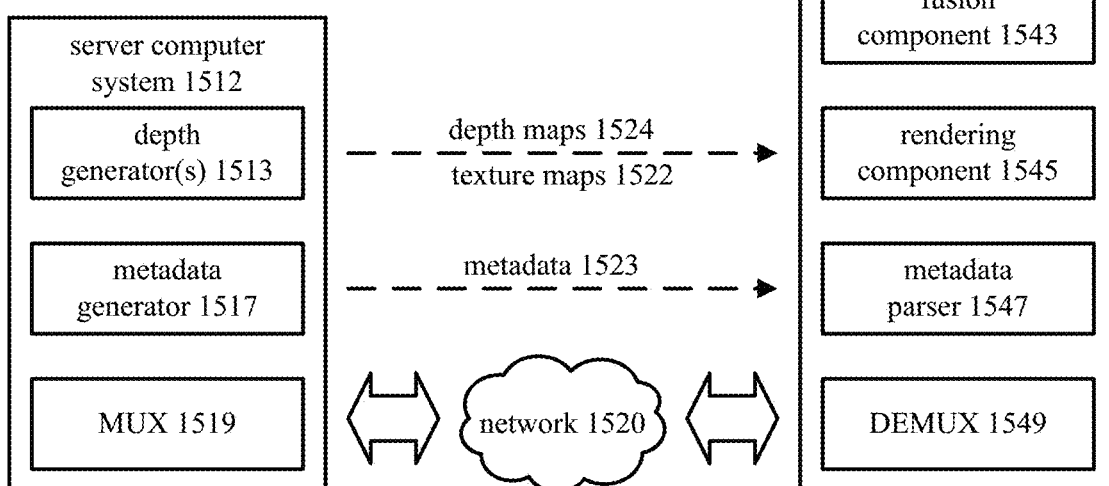

FIGS. 15*a* and 15*b* show example architectures (1501, 1502) for providing and applying special effects to rendered views of textured, dynamic 3D models. Each of the example architectures (1501, 1502) includes a server computer system of a content provider and a client computer system of an end user. Although FIGS. 15*a* and 15*b* show a single client computer system, for a broadcasting scenario, the example architectures (1501, 1502) can include multiple client computer systems of different end users.

A broadcaster, editor, content author, or other contributor can define one or more special effects to be incorporated in rendered views of a textured, dynamic 3D model. At a server computer system, metadata indicating the special effect(s) can be set then sent to a client computer system. The client computer system can then perform operations to incorporate the special effect(s) indicated by the metadata. In this way, the example architectures (1501, 1502) can support streaming and free-viewpoint rendering of stylized views of dynamic 3D models for real-time, interactive viewing experiences.

In the example architecture (1501) of FIG. 15*a*, the server computer system (1511) includes a fusion component (1515), a metadata generator (1517), and a multiplexer (1519). The fusion component (1515) receives depth maps from depth generators and generates a dynamic 3D model, producing model data (1521) for the dynamic 3D model. The fusion component (1515) can be implemented as described in the Fusion4D reference, as described in section III, or in some other way. The server computer system (1511) also receives (e.g., from camera pods, from a distributor) texture maps (1522) for the dynamic 3D model.

In the server computer system (1511), the metadata generator (1517) sets metadata (1523) that specifies one or more special effects for rendered views. Examples of metadata (1523) and special effects are described in the following sections. The metadata (1523) can be the same from frame-to-frame. Or, the metadata (1523) can change from frame-to-frame. In this way, stylization of rendered views of a textured, dynamic 3D model can change in real-time for interactive 4D stylization effects.

On a frame-by-frame basis, the multiplexer (1519) multiplexes model data (1521) for the dynamic 3D model for a frame, texture maps (1522) for the frame, and the metadata (1523). (If the metadata (1523) is unchanged, it can be omitted.) On a frame-by-frame basis, the server computer system (1511) sends the multiplexed data over the network (1520) to the client computer system (1541). Alternatively, the data is multiplexed and sent to the client computer system (1541) in some other way.

The client computer system (1541) receives the multiplexed data. In the client computer system (1541), on a frame-by-frame basis, a demultiplexer (1549) demultiplexes the model data (1521) for the dynamic 3D model for a frame, the texture maps (1522) for the frame, and (if present) the metadata (1523). Alternatively, the data is received from the server computer system (1511) and demultiplexed in some other way.

A metadata parser (1547) parses the metadata (1523) and determines how to apply the special effect(s) indicated by the metadata. The rendering component (1545) receives the model data (1521) and texture maps (1522), applies texture values from the texture maps (1522) to the dynamic 3D model, and renders views of the textured, dynamic 3D model for output to a mobile phone, tablet computer, head-mounted display, or other display device. The rendering component (1545) can be implemented as described in the Holoportation reference, as described in section IV, or in some other way. In one or more passes after blending texture values and rendering a view, the rendering component (1545) performs operations indicated by the metadata (1523) for the special effect(s). Examples of operations performed for special effects are described in the following sections.

In the example architecture (1502) of FIG. 15b, the server computer system (1512) includes one or more depth generator(s) (1513). The depth generator(s) (1513) receive video (e.g., comprising monochrome images) from video cameras in camera pods and generate depth maps (1524) from different input viewpoints for frames from the received video. The server computer system (1512) includes a metadata generator (1517) and multiplexer (1519), which generally operate as described with reference to the example architecture (1501) of FIG. 15a. The server computer system (1512) sends the multiplexed data over the network (1520) to the client computer system (1542).

The client computer system (1542) receives the multiplexed data. The client computer system (1542) includes a demultiplexer (1549), metadata parser (1547), and rendering component (1545), which generally operate as described with reference to the example architecture (1501) of FIG. 15a. The fusion component (1543) is part of the client computer system (1542), not a server computer system, but otherwise operates as described with reference to the example architecture (1501) of FIG. 15a.

Alternatively, components shown in the computer systems of FIGS. 15a and 15b can be organized in other ways. For example, components shown in a single computer system (e.g., single server computer system or single client computer system) can be split between multiple computer systems that are connected locally or over the network (1520).

An end user can potentially override how special effects are applied at a client computer system. For example, the end user can pick a filter, background details, foreground details, lighting source, or other feature of a special effect. Or, as another example, the end user can enable/disable the application of different special effects. Alternatively, a client computer system can send information to a server computer system that indicates preferences of an end user or settings regarding special effects, which the server computer system can incorporate when specifying special effects and setting the metadata. In this way, the end user can, at least to some extent, personalize the stylization of rendered views of textured, dynamic 3D models.

B. Example Techniques for Specifying Special Effects.

FIG. 16 shows a generalized technique (1600) for specifying metadata that indicates special effects for rendered views of a textured, dynamic 3D model of a computer-represented environment. A server computer system (1510, 1511) as described with reference to FIGS. 15a and 15b, or other server computer system, can perform the technique (1600).

The server computer system sends (1610) texture maps for a current frame. Each of the texture maps includes texture values captured from a different input viewpoint in the computer-represented environment. The texture values can be color values or some other type of texture values.

The server computer system also sends (1620) depth maps or model data for the current frame. If depth maps are sent, the depth maps can be used to update a dynamic 3D model of the computer-represented environment. If model data is sent, the model data includes points of the dynamic 3D model. The points of the dynamic 3D model can be vertices of triangles of a mesh, vertices of other polygons of a mesh, or other points of a deformable, volumetric representation.

The server computer system sets (1630) metadata that indicates one or more special effects and sends (1640) the metadata that indicates the special effect(s). In general, the special effect(s) are to be incorporated by a client computer system that receives the metadata when, for at least some of the points of the dynamic 3D model, the client computer system applies texture values and renders a view of the textured, dynamic 3D model from an output viewpoint. For example, the metadata can include parameters that specify: (a) a filter to apply during the rendering, (b) a color space conversion operation to apply during the rendering, (c) background details to add during the rendering, (d) foreground details to add during the rendering, (e) lighting sources to apply during the applying, and/or (f) an effects model for one or more objects to add to the dynamic 3D model before the rendering. Alternatively, the metadata can include other and/or additional parameters.

The server computer system can interact with a client computer system when specifying the special effect(s). For example, the server computer system receives an indication of user input that indicates a setting and/or a preference for the special effect(s). The server computer system adjusts the metadata to account for the user input.

The server computer system can repeat the technique (1600) on a frame-by-frame basis or some other basis.

C. Example Techniques for Applying Special Effects.

FIG. 17 shows a generalized technique (1700) for applying special effects indicated by metadata for rendered views of a textured, dynamic 3D model of a computer-represented environment. A client computer system (1540, 1541) as described with reference to FIGS. 15a and 15b, or other client computer system, can perform the technique (1700).

The client computer system receives (1710) texture maps for a current frame. Each of the texture maps includes texture values captured from a different input viewpoint in the computer-represented environment. The texture values can be color values or some other type of texture values.

The client computer system also receives (1720) model data for the current frame. The model data includes points of a dynamic 3D model. The points of the dynamic 3D model can be vertices of triangles of a mesh, vertices of other polygons of a mesh, or other points of a deformable, volumetric representation.

The client computer system receives (1730) metadata that indicates one or more special effects. For example, the metadata can include parameters that specify: (a) a filter to apply during the rendering, (b) a color space conversion operation to apply during the rendering, (c) background details to add during the rendering, (d) foreground details to add during the rendering, (e) lighting sources to apply during the applying, and/or (f) an effects model for one or more objects to add to the dynamic 3D model before the rendering. Alternatively, the metadata can include other and/or additional parameters.

For at least some of the points of the dynamic 3D model, the client computer system applies (1740) texture values. The client computer system renders (1750) a view of the textured, dynamic 3D model from an output viewpoint. The rendered view incorporates the special effect(s) indicated with the metadata. Section V.D describes examples of operations that the client computer system can perform when applying (1740) texture values and/or rendering (1750) the view. Depending on the special effect, operations to implement the special effect can be performed by a rendering component and/or fusion component. For the same frame, the rendering component can render one or more additional views of the textured, dynamic 3D model (with special effects incorporated) from the same output viewpoint or one or more different output viewpoints.

A client computer system can interact with a server computer system that specifies the special effect(s). For example, the client computer system receives user input that indicates a setting and/or a preference for the special effect(s). The client computer sends an indication of the user input to a metadata generator at the server computer system, which reacts by adjusting the metadata to account for the user input.

A client computer system can also directly adjust special effect(s) in response to user input. For example, the client computer system receives user input that indicates a setting and/or a preference for the special effect(s). The client computer system then modifies, according to the user input, how the special effect(s) are incorporated into rendered views.

The client computer system can repeat the technique (1700) on a frame-by-frame basis or some other basis.

D. Example Special Effects.

Figure 18B:
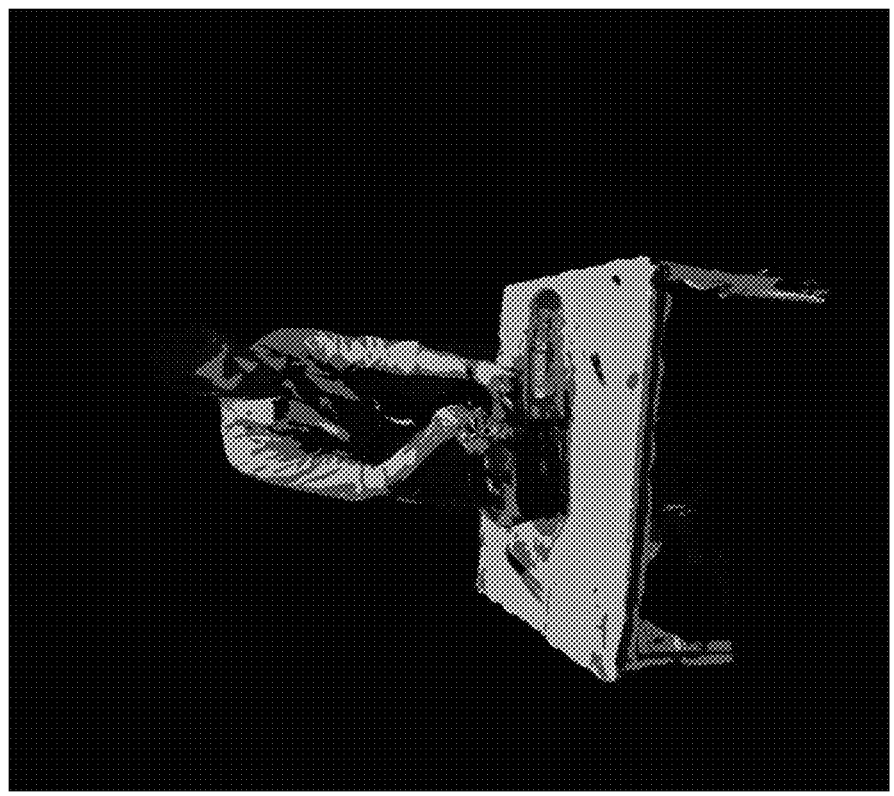
FIGS. 18a-18m are images illustrating examples of special effects applied to rendered views of textured, dynamic 3D models.
Figure 18A:
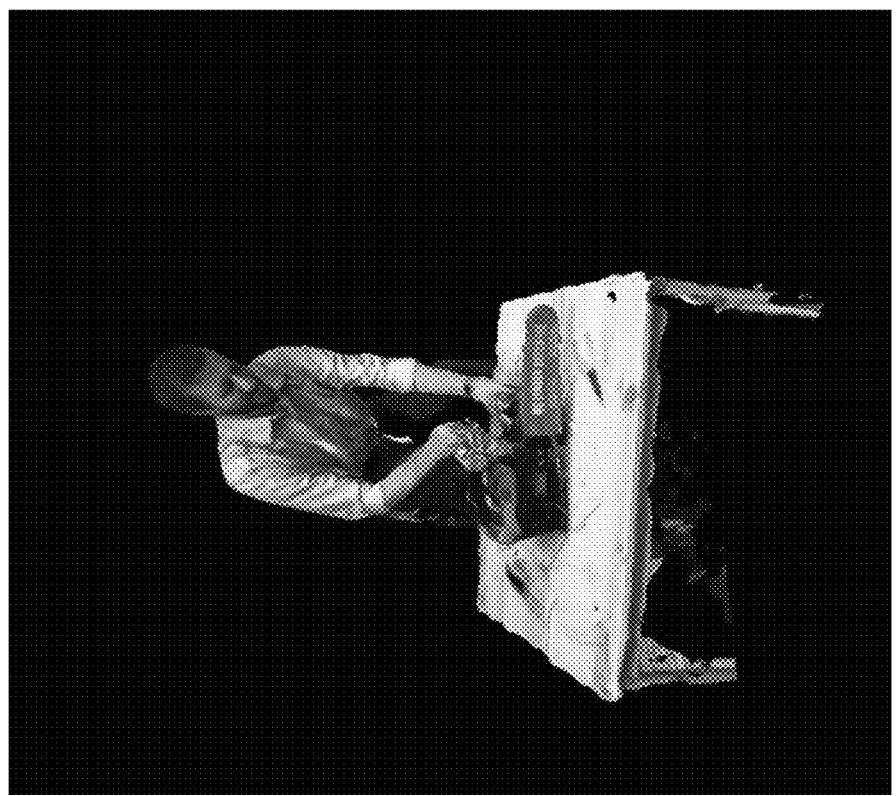

This section describes several examples of special effects that can be applied to rendered views of a textured, dynamic 3D model. For comparison, FIG. 18*a* shows an image (1801) of a rendered view of a textured, dynamic 3D model without special effects.

1. Examples of Modifying Texture Values.

A rendering component can modify texture values of texture maps applied to a dynamic 3D model or modify texture values of a rendered view. In general, as part of rendering, the rendering component projects at least some points of the dynamic 3D model to locations in the view from the perspective of the output viewpoint. The rendering component assigns corresponding texture values (applied to the points of the 3D model) to the locations in the view. To incorporate a special effect, the rendering component can perform various operations such as conversion of color values to a different color space, adjustment of selected color values, and/or filtering to detect edges.

The texture values of the view can be color values in a first color space such as an RGB-type color space. To incorporate a special effect indicated with metadata, the rendering component can convert the texture values of the view to brightness values and color-difference values in a second color space such as a YUV-type color space. The rendering component can then perform other operations to implement the special effect.

For example, the rendering component can quantize the brightness values, and then convert the quantized brightness values and color-difference values back to the first color space. FIG. 18*b* shows an image (1802) in which color values of the image (1801) of FIG. 18*a* are modified for a "poster" effect. To produce the image (1802) in FIG. 18*b*, after texture blending, the rendering component converts RGB color values to YUV values. The color-difference (U, V) values are unchanged, but the rendering component evenly clusters brightness (Y) values into Q groups. Q is, for example, 4, 8, or 16. In effect, this quantizes the brightness (Y) values into one of Q different brightness values. The rendering component then converts the YUV values back to RGB values.

Figure 18D:
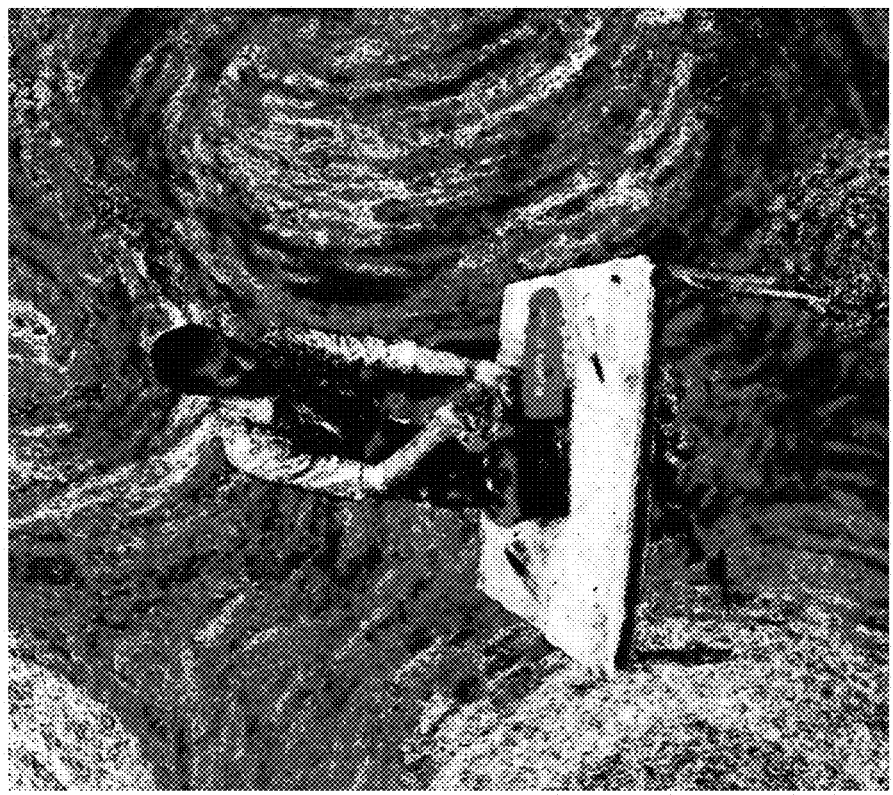
Figure 18C:
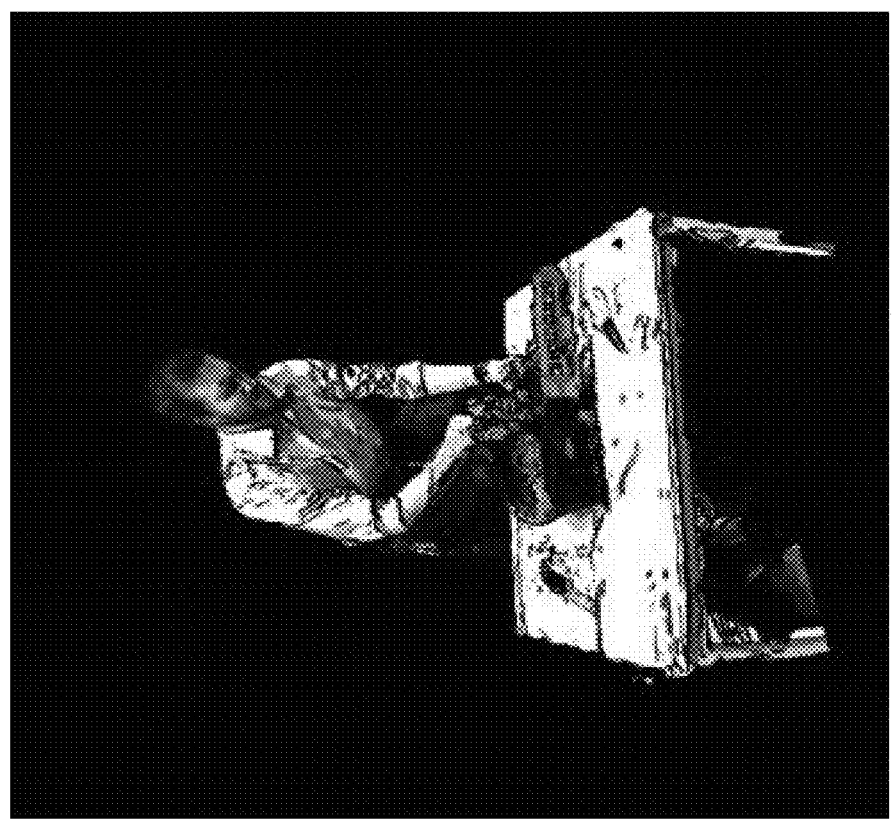

Or, as another example, the rendering component can selectively increase the brightness of those of the brightness values that are brighter than a threshold level of brightness, adjust the color-difference values to be zero, and selectively add hue to at least some of the color-difference values. The rendering component can then apply a filter to detect edges in the view and selectively decrease the brightness of the detected edges. FIG. 18*c* shows an image (1803) in which color values of an image are modified for a "faded blue" effect. To produce the image (1803) in FIG. 18*c*, after texture blending, the rendering component converts RGB color values to YUV values. The rendering component adjusts the brightness of brightness (Y) values that are higher than a threshold amount (e.g., a midpoint gray value), increasing the brightness of such values to a brightest value. The rendering component zeros out the color-difference (U, V) values then adds blue to at least some of the color-difference (U, V) values. The rendering component detects edges using a convolution filter or Sobel filter, then highlights the edges by decreasing the brightness values along the edges.

2. Examples of Adding Background Details.

A rendering component can add background details to a rendered view of a textured, dynamic 3D model. After projecting at least some points of a dynamic 3D model to locations in the view from the perspective of the output viewpoint, and assigning corresponding texture values (applied to the points of the 3D model) to the locations in the view, the rendering component can add a background image to the texture values of the view. For example, the rendering component can store the background image in a depth buffer and layer the texture values of the view, in a screen buffer, over the background image. The rendering component can select the background image from a library of background images, which can include paintings, stock scenery, or other imagery. Or, the rendering component can select the background image from a video sequence (e.g., part of an animation sequence or film).

The rendering component can perform various other operations on the texture values of the view and background image. For example, the rendering component can selectively increase the contrast of the texture values and selectively blend texture values of adjacent locations. FIG. 18*d* shows an image (1804) in which background details in a depth buffer have been replaced with details from a painting by Van Gogh. To produce the image (1804) in FIG. 18*d*, the rendering component increases the contrast of texture values in the screen buffer. Then, the rendering component iteratively (e.g., 8 times, 16 times, 24 times) calculates gradients between color values and samples color values from adjacent locations using the gradients with a random vector. The rendering component then computes the averages of the sampled color values for the locations of the view.

3. Examples of Adding Foreground Details.

Figure 18F:
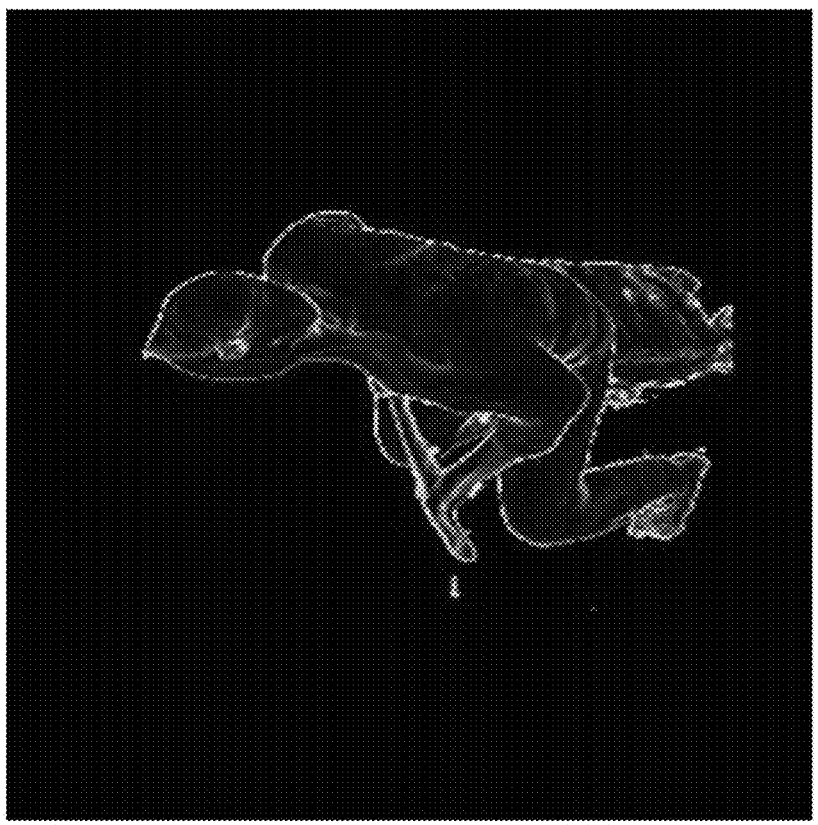
Figure 18E:
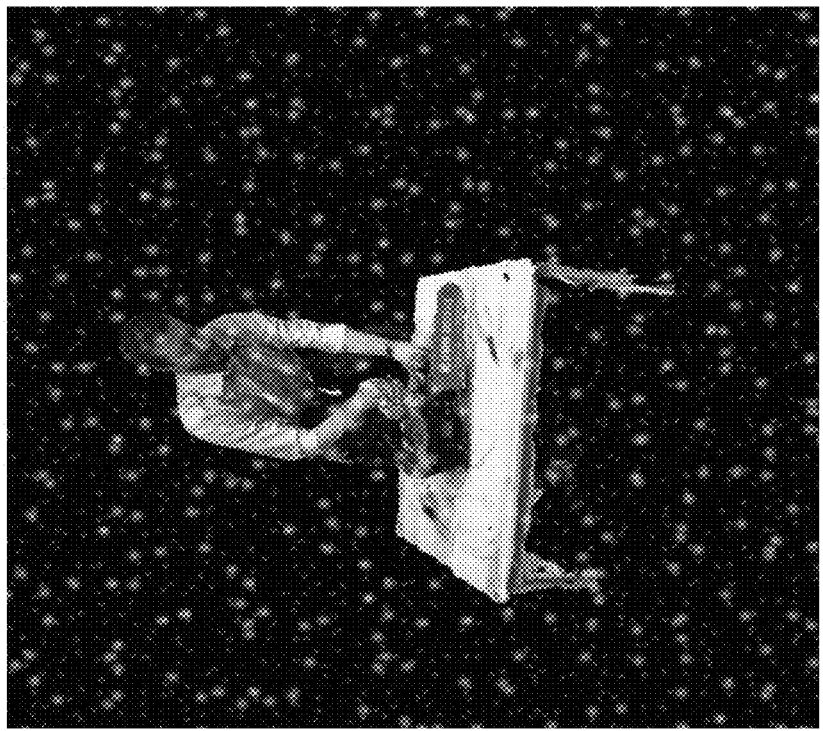

A rendering component can add foreground details to a rendered view of a textured, dynamic 3D model. After projecting at least some points of a dynamic 3D model to locations in the view from the perspective of the output viewpoint, and assigning corresponding texture values (applied to the points of the 3D model) to the locations in the view, the rendering component can add a foreground image to the texture values of the view. For example, the rendering component can store the foreground image in a buffer and layer the foreground image over the texture values of the view. The rendering component can select the foreground image from a library of foreground images, which can include weather effects or other imagery. Or, the rendering component can select the foreground image from a video sequence (e.g., part of an animation sequence or film). FIG. 18e shows an image (1805) in which foreground details in a buffer have been added to provide a "snow" effect.

The rendering component can perform various other operations on the texture values of the view and foreground image.

4. Examples of Adding Stylized Edges and/or Surfaces.

A rendering component can add stylized edges and/or surfaces to a rendered view of a textured, dynamic 3D model. For example, the applied texture values can be color values and/or alpha (opacity/transparency) values dependent on normal vector values for at least some points of the dynamic 3D model. As part of the rendering, the rendering component can project the at least some points of the dynamic 3D model to locations in the view, and assign corresponding applied texture values to the locations in the view. The rendering component can then apply a filter to emphasize edges and de-emphasize non-edges in the view. FIG. 18f shows an image (1806) in which edges are emphasized and non-edges are deemphasized in the image (1801) of FIG. 18a, for a "glassy" effect. To produce the image (1806) in FIG. 18f, after texture blending, the rendering component uses normal vector values to colorize the dynamic 3D model, then convolves the colorized image with a Sobel filter to emphasize edges and deemphasize non-edges.

Figure 18H:
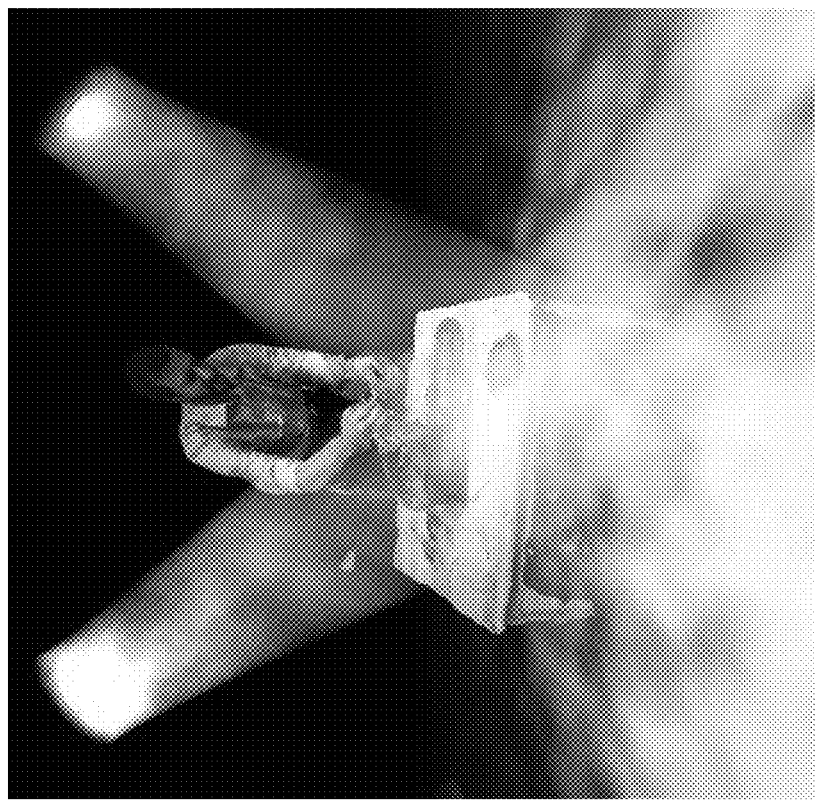
Figure 18G:
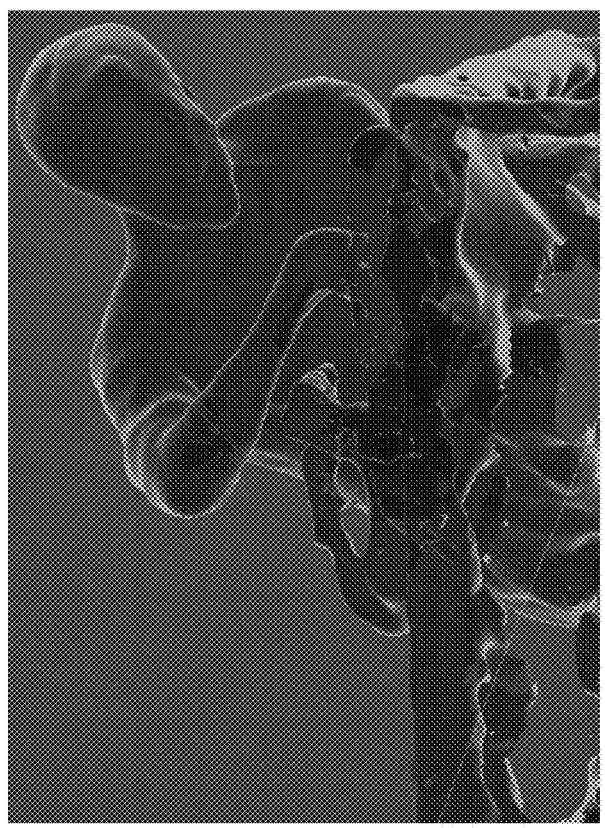

Or, as another example, FIG. 18g shows an image (1807) in which the same color value is assigned to every point (vertex) in a dynamic 3D model but alpha values vary between points, for a "smoke" or "ghost" effect. To produce the image (1807), a color value (such as gray, blue, or green) is assigned to the points of the dynamic 3D model. For at least those points of the dynamic 3D model that are projected to locations in a view, the rendering component compares the normal vector value at each point to the output viewpoint. For a point, the rendering component assigns an alpha value depending on how close the normal vector value and output viewpoint are to being perpendicular. For example, if the normal vector and output viewpoint are (nearly) parallel, the alpha value makes the point (almost) transparent. On the other hand, if the normal vector and output viewpoint are (nearly) perpendicular, the alpha value makes the point (almost) opaque.

5. Examples of Adding Lighting Effects.

A rendering component can add lighting effects to a rendered view of a textured, dynamic 3D model. The lighting effects can be added as a foreground image (as shown in the image (1808) of FIG. 18h) or added earlier in the processing pipeline. For example, lighting effects can affect the brightness of texture values applied to the dynamic 3D model to model light emanating from a light source.

6. Examples of Adjusting Points of Dynamic 3D Model.

A fusion component and/or rendering component can adjust points (vertices) of a dynamic 3D model, which are then included as part of a rendered view of a textured, dynamic 3D model. Points of the dynamic 3D model can be grouped/clustered, replaced with other points, and/or moved.

Figure 18I:
Figure 18J:
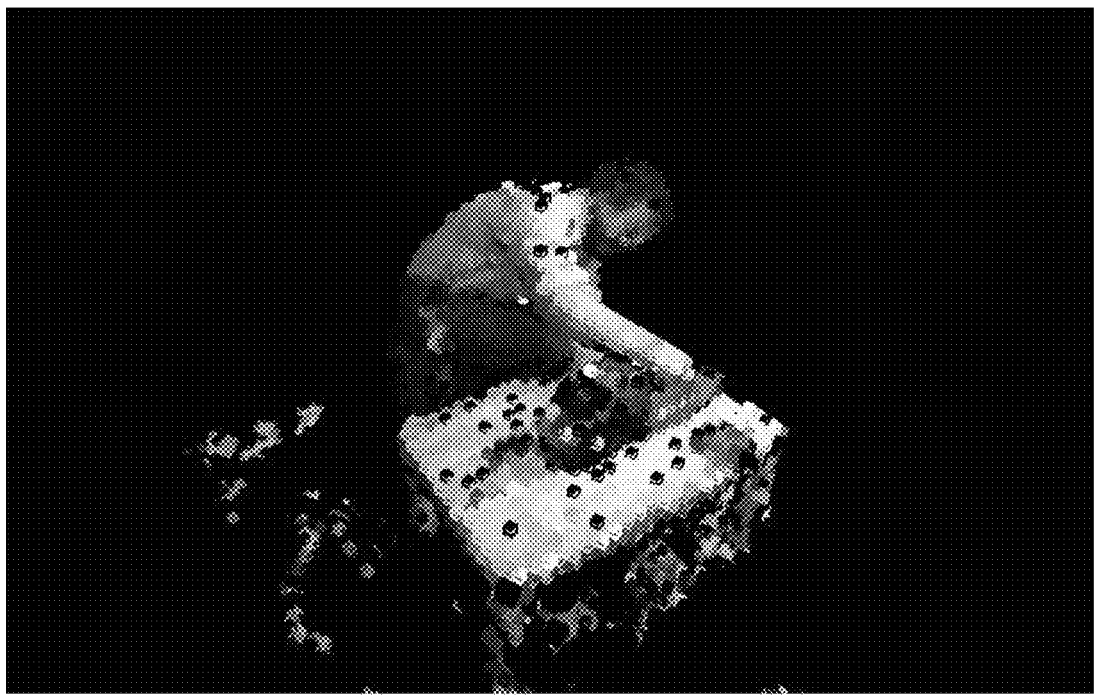

For example, for a "voxelization" effect, points of a dynamic 3D model are grouped/clustered into bins of a defined increment (e.g., 2 centimeters, 5 centimeters). The defined increment sets the size of voxels, with a larger increment resulting in larger voxels for a "blockier" view. A box is generated for each bin. For example, from a vertex for a bin, a geometric shader generates six faces of a box. A texture value (e.g., color value) is assigned to the box (and its faces) using the average of the texture values (e.g., color values) of the points grouped/clustered in the bin. As part of rendering, the rendering component can project the at least some voxelized points of the dynamic 3D model to locations in a view, and assign corresponding applied texture values to the locations in the view. FIGS. 18i and 18j show images (1809, 1810) with voxelization effects applied. In the image (1809) of FIG. 18i, the defined increment for the voxels is relatively small (e.g., 2 centimeters). In the image (1810) of FIG. 18j, the defined increment for the voxels is larger (e.g., 5 centimeters), and the voxels are more noticeable.

Figure 18K:
Figure 18L:
Figure 18M:
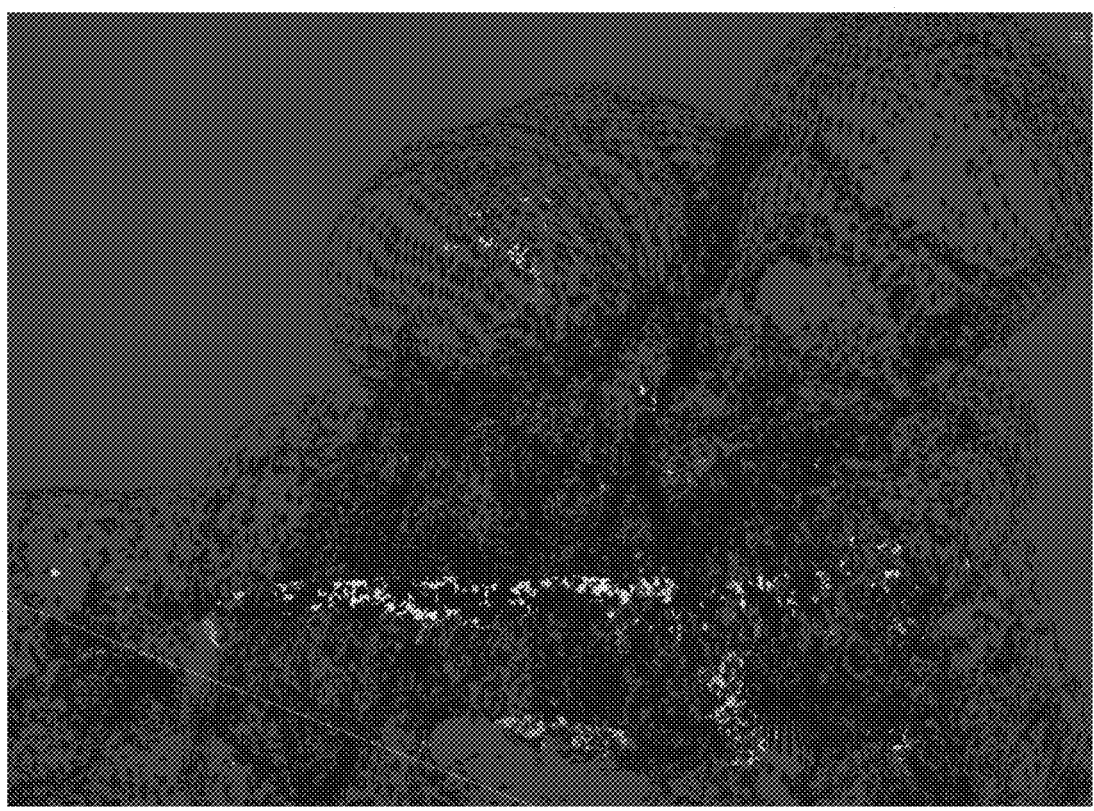

As another example, for a "fragmentation" effect, for each triangle in a dynamic 3D model, a normal vector value is calculated, and the three vertices of the triangle are translated along that normal vector value. Translating vertices of triangles along the normal vector values for the respective triangles, away from the dynamic 3D model, can create an "explosion" effect. Translating vertices of triangles along the normal vector values for the respective triangles, back toward the dynamic 3D model, can reconstruct the dynamic 3D model from an "exploded" version. Or, translating vertices of triangles along reversed normal vector values for the respective triangles, toward the dynamic 3D model, can create an "implosion" effect. As part of rendering, the rendering component can project the at least some fragmented points of the dynamic 3D model to locations in a view, and assign corresponding applied texture values to the locations in the view. FIGS. 18k, 18l, and 18m show images (1811, 1812, 1813) with "fragmentation" effects applied. In the images (1811, 1812, 1813) of FIGS. 18k, 18l, and 18m, vertices of triangles are translated along normal vector values for the respective triangles, away from the dynamic 3D model, by distances that increase successively for FIGS. 18k, 18l, and 18m.

7. Examples of Adding Objects.

A fusion component can add objects to a dynamic 3D model, which are then included as part of a rendered view of the textured, dynamic 3D model. For example, the fusion component adjusts the dynamic 3D model by adding one or more objects as indicated by the metadata. The fusion component can generate new points in the dynamic 3D model for the added object(s) according to an effects model indicated by the metadata, then apply texture values to the new points according to the effects model. The effects model can indicate points and texture values for weather phenomena such as snow, rain, clouds, etc. or for other objects.

VI. Alternatives and Variations.

Further, different embodiments may include one or more of the inventive features shown in the following table of features.

| | Texturing of Dynamic 3D Models with Viewpoint-Dependent Texture Weights |
|---|---|
| A1 | In a computer system, a method of texturing a dynamic three-dimensional ("3D") model of a computer-represented environment, the method comprising: receiving texture maps for a current frame, each of the texture maps including texture values captured from a different input viewpoint in the computer-represented environment; receiving model data for the current frame, the model data including points of the dynamic 3D model of the computer-represented environment; determining viewpoint-dependent texture weights for the current frame for at least some of the points of the dynamic 3D model, including, for a given point among the at least some points of the dynamic 3D model, for a given input viewpoint among the different input viewpoints, determining a base weight based at least in part on the given input viewpoint and an output viewpoint; for the at least some of the points of the dynamic 3D model, applying corresponding texture values from the texture maps according to the viewpoint-dependent texture weights for the current frame; and rendering a view of the textured, dynamic 3D model from the output viewpoint. |
| A2 | The method of A1, wherein the viewpoint-dependent texture weights for the current frame include, for each point among the at least some of the points of the dynamic 3D model, a scalar weight per different input viewpoint. |
| A3 | The method of A1, wherein the determining the viewpoint-dependent texture weights further includes smoothing at least some of the viewpoint-dependent texture weights for the current frame spatially around seams in the dynamic 3D model and/or temporally relative to previous texture weights. |
| A4 | The method of A1, wherein the applying the corresponding texture values includes, for a given point among the points of the dynamic 3D model: for each of the texture maps: projecting the given point to a location in the texture map; and scaling a texture value at the location in the texture map by one of the viewpoint-dependent texture weights for the different input viewpoint of the texture map; combining the scaled texture values. |
| A5 | The method of A1, further comprising: determining segmentation maps for the respective texture maps; and subtracting background details from the texture maps, respectively, to isolate texture values for one or more objects of the dynamic 3D model in the respective texture maps. |
| A6 | The method of A1, wherein the texture values are color values. |
| A7 | The method of A1, wherein the points of the dynamic 3D model are vertices of triangles of a mesh. |
| A8 | One or more computer-readable media storing computer-executable instructions for causing a computer system, when programmed thereby, to perform operations of the method of any one of A1-A7. |
| A9 | A computer system comprising one or more processing units and memory, wherein the computer system implements a rendering component configured to perform operations of the method of any one of A1-A7. |

| | Adding Special Effects to Textured, Dynamic 3D Models |
|---|---|
| B1 | In a computer system, a method of applying special effects to rendered views of a textured, dynamic three-dimensional ("3D") model of a computer-represented environment, the method comprising: receiving texture maps for a current frame, each of the texture maps including texture values captured from a different input viewpoint in the computer-represented environment; receiving model data for the current frame, the model data including points of the dynamic 3D model of the computer-represented environment; receiving metadata that indicates one or more special effects; for at least some of the points of the dynamic 3D model, applying texture values; and rendering a view of the textured, dynamic 3D model from an output viewpoint, the rendered view incorporating the one or more special effects indicated with the metadata. |
| B2 | The method of B1, wherein the applied texture values are texture values, from the texture maps, that correspond to the at least some points of the dynamic 3D model, and wherein the rendering includes: projecting the at least some points of the dynamic 3D model to locations in the view; and assigning corresponding applied texture values to the locations in the view. |
| B3 | The method of B2, wherein the texture values of the view are in a first color space, and wherein the rendering further includes, to incorporate the one or more special effects indicated with the metadata: converting the texture values of the view to brightness values and color-difference values in a second color space; quantizing the brightness values; and converting the quantized brightness values and color-difference values back to the first color space. |
| B4 | The method of B2, wherein the texture values of the view are in a first color space, and wherein the rendering further includes, to incorporate the one or more special effects indicated with the metadata: converting the texture values of the view to brightness values and color-difference values in a second color space; selectively increasing brightness of those of the brightness values that are brighter than a threshold level of brightness; adjusting the color-difference values to be zero; and selectively adding hue to at least some of the color-difference values. |
| B5 | The method of B4, wherein the rendering further includes, to incorporate the one or more special effects indicated with the metadata: applying a filter to detect edges in the view; and selectively decreasing brightness of the detected edges. |
| B6 | The method of B2, wherein the rendering includes, to incorporate the one or more special effects indicated with the metadata: adding a background image to the texture values of the view. |
| B7 | The method of B6, wherein the adding the background image includes: storing the background image in a depth buffer; and layering the texture values of the view, in a screen buffer, over the background image. |
| B8 | The method of B6, wherein the rendering further includes, to incorporate the one or more special effects indicated with the metadata: selecting the background image from a library of background images, wherein the library of background images include paintings and stock scenery. |
| B9 | The method of B6, wherein the background image is part of a sequence. |

| | |
|---|---|
| B10 | The method of B6, wherein the rendering further includes, to incorporate the one or more special effects indicated with the metadata:<br>    increasing contrast of the texture values; and<br>    selectively blending texture values of adjacent locations. |
| B11 | The method of B2, wherein the rendering includes, to incorporate the one or more special effects indicated with the metadata:<br>    adding a foreground image to the texture values of the view. |
| B12 | The method of B11, wherein the adding the foreground image includes:<br>    storing the foreground image in a buffer; and<br>    layering the foreground image over the texture values of the view. |
| B13 | The method of B11, wherein the rendering further includes, to incorporate the one or more special effects indicated with the metadata:<br>    selecting the foreground image from a library of foreground images, wherein the library of foreground images include weather effects. |
| B14 | The method of B11, wherein the foreground image is part of a sequence. |
| B15 | The method of B1, wherein the applied texture values are color values dependent on normal vector values for the respective at least some points of the dynamic 3D model, and wherein the rendering includes, to incorporate the one or more special effects indicated with the metadata:<br>    projecting the at least some points of the dynamic 3D model to locations in the view; and<br>    assigning corresponding applied texture values to the locations in the view. |
| B16 | The method of B15, wherein the rendering further includes, to incorporate the one or more special effects indicated with the metadata:<br>    applying a filter to emphasize edges and de-emphasize non-edges in the view. |
| B17 | The method of B1, further comprising, to incorporate the one or more special effects indicated with the metadata:<br>    adjusting the dynamic 3D model by adding one or more objects as indicated by the metadata. |
| B18 | The method of B17, further comprising, to incorporate the one or more special effects indicated with the metadata:<br>    generating new points in the dynamic 3D model for the one or more added objects according to an effects model indicated by the metadata; and<br>    applying texture values to the new points according to the effects model. |
| B19 | The method of B1, wherein the metadata includes parameters that specify:<br>    a filter to apply during the rendering;<br>    a color space conversion operation to apply during the rendering;<br>    background details to add during the rendering;<br>    foreground details to add during the rendering;<br>    lighting sources to apply during the applying; and/or<br>    an effects model for one or more objects to add to the dynamic 3D model before the rendering. |
| B20 | The method of B1, wherein the texture values are color values, and wherein the points of the dynamic 3D model are vertices of triangles of a mesh. |
| B21 | The method of B1, further comprising:<br>    receiving user input that indicates a setting and/or a preference for the one or more special effects; and<br>    modifying, according to the user input, how the one or more special effects are incorporated into the rendered view. |
| B22 | The method of B1, further comprising:<br>    receiving user input that indicates a setting and/or a preference for the one or more special effects; and<br>    sending an indication of the user input to a metadata generator, wherein the received metadata accounts for the user input. |
| B23 | In a computer system, a method of specifying special effects for rendered views of a textured, dynamic three-dimensional ("3D") model of a computer-represented environment, the method comprising:<br>    sending texture maps for a current frame, each of the texture maps including texture values captured from a different input viewpoint in the computer-represented environment;<br>    sending depth maps or model data for the current frame, the model data including points of the dynamic 3D model of the computer-represented environment;<br>    setting metadata that indicates one or more special effects to be incorporated when, for at least some of the points of the dynamic 3D model, applying texture values and rendering a view of the textured, dynamic 3D model from an output viewpoint; and<br>    sending the metadata that indicates the one or more special effects. |
| B24 | The method of B23, wherein the metadata includes parameters that specify:<br>    a filter to apply during the rendering;<br>    a color space conversion operation to apply during the rendering;<br>    background details to add during the rendering;<br>    foreground details to add during the rendering;<br>    lighting sources to apply during the applying; and/or<br>    an effects model for one or more objects to add to the dynamic 3D model before the rendering. |
| B25 | The method of B23, wherein the texture values are color values, and wherein the points of the dynamic 3D model are vertices of triangles of a mesh. |
| B26 | The method of B23, further comprising:<br>    receiving an indication of user input that indicates a setting and/or a preference for the one or more special effects; and<br>    adjusting the metadata to account for the user input. |
| B27 | One or more computer-readable media storing computer-executable instructions for causing a computer system, when programmed thereby, to perform operations of the method of any one of B1-B26. |
| B28 | A computer system comprising one or more processing units and memory, wherein the computer system implements a component configured to perform operations of the method of any one of B1-B26. |

Considering Intrinsic Texture Values When Fusing a Dynamic 3D Model

| | |
|---|---|
| C1 | In a computer system, a method of generating a dynamic three-dimensional ("3D") model of a computer-represented environment, the method comprising:<br>    receiving texture maps for a current frame, each of the texture maps including texture values captured from a different input viewpoint in the computer-represented environment;<br>    receiving depth maps for the current frame, each of the depth maps including depth values from one of the different input viewpoints; and<br>    selectively updating a reference 3D model based on the texture maps for the current frame and the depth maps for the current frame, including:<br>        selectively updating points of the reference 3D model; and<br>        selectively updating intrinsic texture values of the points of the reference 3D model. |
| C2 | The method of C1, wherein the updating the points of the reference 3D model includes, for each of at least some of the points of the reference 3D model:<br>    projecting the point back to locations in at least some of the depth maps; and<br>    updating parameters of the point in the reference 3D model, the parameters of the point including one or more of a signed distance value and a weight. |

C3 The method of C2, wherein the updating the points of the reference 3D model further includes:
   identifying one or more new points in at least one of the depth maps but not yet in the reference 3D model; and
   adding the one or more new points to the reference 3D model.
C4 The method of C2, wherein the updating the points of the reference 3D model further includes:
   identifying one or more misaligned points; and
   removing the one or more misaligned points from the reference 3D model.
C5 The method of C1, wherein the updating the intrinsic texture values includes, for each of at least some of the points of the reference 3D model:
   projecting the point back to locations in at least some of the texture maps; and
   assigning the intrinsic texture value of the point in the reference 3D model.
C6 The method of C5, wherein the assigning the intrinsic texture value of the point includes combining corresponding texture values from the texture maps at the locations.
C7 The method of C6, wherein the combining the corresponding texture values includes one or more of:
   averaging the corresponding texture values from the texture maps at the locations;
   removing outlier texture values caused by occlusion or mis-registration; and
   determining a weighted combination of the corresponding texture values from the texture maps at the locations and a previous intrinsic texture value of the point.
C8 The method of C1, wherein the texture values are color values, and wherein the updating the reference 3D model further includes:
   converting at least some of the color values from a first color space to a second color space.
C9 The method of C8, wherein the first color space is an RGB-type color space, and wherein the second color space is a YUV-type color space.
C10 The method of C1, further comprising:
   determining points of a current 3D model from the depth maps for the current frame;
   determining, based at least in part on the updated intrinsic texture values of the points of the reference 3D model and the texture maps for the current frame, warp parameters to warp the reference 3D model to the current frame;
   warping the reference 3D model according to the warp parameters; and
   selectively combining the current 3D model and the warped reference 3D model.
C11 The method of C10, wherein the determining the warp parameters includes:
   defining nodes of the reference 3D model;
   assigning the points of the reference 3D model to the nodes; and
   sampling the updated intrinsic texture values for the points assigned to the nodes.
C12 The method of C10, wherein the determining the warp parameters includes:
   minimizing an error function that penalizes mismatches between the warped reference 3D model and observed values for the current frame, wherein the error function includes a texture error term that quantifies error between the updated intrinsic texture values of back-projected points of the reference 3D model and corresponding texture values of the texture maps for the current frame.
C13 The method of C12, wherein the error is quantified as a sum of squared differences.
C14 The method of C12, wherein the error is selectively calculated only for points visible in the respective texture maps.
C15 The method of C12, wherein the error function further includes:
   a depth error term that quantifies error between the back-projected points of the reference 3D model and corresponding depth values of the depth maps for the current frame;
   a visual hull error term that quantifies deviations of the warped reference 3D model from boundaries of a visual hull;
   a rotation term that quantifies deviations of local affine transformations for nodes of the reference 3D model from rigid transformations;
   a smoothness term that quantifies variability in local affine transformations for neighboring nodes of the reference 3D model; and/or
   a correspondence term that quantifies differences in texture value correspondences.
C16 The method of C10, wherein the warp parameters include:
   one or more parameters that specify a global translation of the reference 3D model;
   one or more parameters that specify a global rotation of the reference 3D model; and
   for each of multiple nodes of the reference 3D model:
      one or more parameters that specify a local affine translation of the node; and
      one or more parameters that specify a local translation of the node.
C17 One or more computer-readable media storing computer-executable instructions for causing a computer system, when programmed thereby, to perform operations of the method of any one of C1-C16.
C18 A computer system comprising one or more processing units and memory, wherein the computer system implements a fusion component configured to perform operations of the method of any one of C1-C16.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing computer-executable instructions for causing a computer system, when programmed thereby, to perform operations to specify special effects for artistic control over presentation of rendered views of a textured, dynamic three-dimensional ("3D") model of a computer-represented environment, the operations comprising:
   receiving user input that specifies one or more special effects for artistic control over presentation of rendered views of the textured, dynamic 3D model of the computer-represented environment;
   sending texture maps for a current frame, each of the texture maps including texture values captured from a different input viewpoint in the computer-represented environment;
   sending depth maps or model data for the current frame, the model data including points of the dynamic 3D model of the computer-represented environment;
   setting, based at least in part the user input, artistic control metadata that indicates the one or more special effects, the one or more special effects to be incorporated when, for at least some of the points of the dynamic 3D model, applying texture values and rendering a view of the textured, dynamic 3D model from an output viewpoint, the applied texture values being texture values that correspond to at least some points of the dynamic 3D model, and the rendering including projecting the at least some points of the dynamic 3D model to locations in the view and assigning corresponding applied texture values to the locations in the view, the artistic control metadata indicating additions or changes to at least some of the points of the dynamic 3D model as a deformable volumetric representation before the rendering; and sending the artistic control metadata that indicates the one or more special effects.

2. The one or more computer-readable media of claim 1, wherein the artistic control metadata includes parameters that specify an effects model for one or more objects to add to the dynamic 3D model before the rendering, and wherein the artistic control metadata further includes parameters that specify:

a filter to apply during the rendering;
a color space conversion operation to apply during the rendering;
background details to add during the rendering;
foreground details to add during the rendering; and/or
lighting sources to apply during the applying.

3. The one or more computer-readable media of claim 1, wherein the texture values are color values, and wherein the points of the dynamic 3D model are vertices of triangles of a mesh.

4. The one or more computer-readable media of claim 1, wherein the operations further comprise:

receiving, from a client computer system, an indication of additional user input that indicates a setting and/or a preference for the one or more special effects; and
adjusting the artistic control metadata to account for the additional user input.

5. In a computer system, a method of applying special effects for artistic control over presentation of rendered views of a textured, dynamic three-dimensional ("3D") model of a computer-represented environment, the method comprising:

receiving texture maps for a current frame, each of the texture maps including texture values captured from a different input viewpoint in the computer-represented environment;
receiving model data for the current frame, the model data including points of the dynamic 3D model of the computer-represented environment;
receiving artistic control metadata that indicates one or more user-specified special effects for artistic control over presentation of rendered views of the textured, dynamic 3D model of the computer-represented environment;
adjusting, according to at least some of the artistic control metadata, the dynamic 3D model to add or change at least some of the points of the dynamic 3D model as a deformable volumetric representation;
for at least some of the points of the adjusted dynamic 3D model, applying texture values, wherein the applied texture values are texture values that correspond to the at least some points of the adjusted dynamic 3D model; and
rendering a view of the textured, adjusted dynamic 3D model from an output viewpoint, the rendered view incorporating the one or more user-specified special effects indicated with the artistic control metadata, wherein the rendering includes:
projecting the at least some points of the adjusted dynamic 3D model to locations in the view; and
assigning corresponding applied texture values to the locations in the view.

6. The method of claim 5, wherein the assigned texture values of the view are in a first color space, and wherein the rendering further includes, as part of incorporating the one or more user-specified special effects indicated with the artistic control metadata:

converting the assigned texture values of the view to brightness values and color-difference values in a second color space;
quantizing the brightness values; and
converting the quantized brightness values and color-difference values back to the first color space.

7. The method of claim 5, wherein the assigned texture values of the view are in a first color space, and wherein the rendering further includes, as part of incorporating the one or more user-specified special effects indicated with the artistic control metadata:

converting the assigned texture values of the view to brightness values and color-difference values in a second color space;
selectively increasing brightness of those of the brightness values that are brighter than a threshold level of brightness;
adjusting the color-difference values to be zero; and
selectively adding hue to at least some of the color-difference values.

8. The method of claim 5, wherein the rendering includes, as part of incorporating the one or more user-specified special effects indicated with the artistic control metadata:

adding a background image to the assigned texture values of the view.

9. The method of claim 8, wherein the adding the background image includes:

storing the background image in a depth buffer; and
layering the assigned texture values of the view, in a screen buffer, over the background image.

10. The method of claim 5, wherein the rendering includes, as part of incorporating the one or more user-specified special effects indicated with the artistic control metadata:

adding a foreground image to the assigned texture values of the view.

11. The method of claim 10, wherein the adding the foreground image includes:

storing the foreground image in a buffer; and
layering the foreground image over the assigned texture values of the view.

12. The method of claim 5, wherein the applied texture values are color values dependent on normal vector values for the respective at least some points of the dynamic 3D model.

13. The method of claim 5, wherein the adjusting the dynamic 3D model includes:

adding one or more objects as indicated by the artistic control metadata.

14. The method of claim 13, wherein the adding the one or more objects includes generating new points in the dynamic 3D model for the one or more added objects according to an effects model indicated by the artistic control metadata, and wherein the applied texture values are applied to the new points according to the effects model.

15. The method of claim 5, wherein the artistic control metadata includes parameters that specify an effects model for one or more objects to add to the dynamic 3D model before the rendering, and wherein the artistic control metadata further includes parameters that specify:

a filter to apply during the rendering;
a color space conversion operation to apply during the rendering;
background details to add during the rendering;
foreground details to add during the rendering; and/or
lighting sources to apply during the applying.

16. The method of claim 5, wherein the texture values are color values, and wherein the points of the dynamic 3D model are vertices of triangles of a mesh.

17. The method of claim 5, further comprising:
receiving additional user input that indicates a setting and/or a preference for the one or more user-specified special effects; and
modifying, according to the additional user input, how the one or more user-specified special effects are incorporated into the rendered view.

18. The method of claim 5, further comprising:
receiving additional user input that indicates a setting and/or a preference for the one or more user-specified special effects; and
sending an indication of the additional user input to a metadata generator, wherein the received artistic control metadata accounts for the additional user input.

19. The method of claim 5, wherein, for a given one of the points of the adjusted dynamic 3D model, the applying the texture values uses texture weights to blend texture values from different ones of the texture maps, and wherein the applying and the rendering are combined so that the applying is only performed for points of the adjusted dynamic 3D model included in the view and includes determining the corresponding applied texture values assigned to respective locations in the view.

20. A computer system comprising one or more processing units and memory, wherein the computer system implements a tool for applying special effects for artistic control over presentation of rendered views of a textured, dynamic three-dimensional ("3D") model of a computer-represented environment, the tool comprising:
one or more buffers, in the memory, configured to receive:
texture maps for a current frame, each of the texture maps including texture values captured from a different input viewpoint in the computer-represented environment;
model data for the current frame, the model data including points of the dynamic 3D model of the computer-represented environment; and
artistic control metadata that indicates one or more user-specified special effects for artistic control over presentation of rendered views of the textured, dynamic 3D model of the computer-represented environment, the artistic control metadata indicating adjustments to the dynamic 3D model by adding or changing at least some of the points of the dynamic 3D model as a deformable volumetric representation; and
a rendering component configured to:
for at least some of the points of the adjusted dynamic 3D model, apply texture values, wherein the applied texture values are texture values that correspond to the at least some points of the adjusted dynamic 3D model; and
render a view of the textured, adjusted dynamic 3D model from an output viewpoint, the rendered view incorporating the one or more user-specified special effects indicated with the artistic control metadata, wherein the rendering component is configured to:
project the at least some points of the adjusted dynamic 3D model to locations in the view; and
assign corresponding applied texture values to the locations in the view.

21. The computer system of claim 20, wherein the assigned texture values of the view are in a first color space, and wherein the rendering component is further configured to, to render the view:
convert the assigned texture values of the view to brightness values and color-difference values in a second color space.

22. The computer system of claim 20, wherein the rendering component is further configured to, to render the view:
add a background image to the assigned texture values of the view; or
add a foreground image to the assigned texture values of the view.

23. The computer system of claim 20, wherein the applied texture values are color values dependent on normal vector values for the respective at least some points of the dynamic 3D model.

24. The computer system of claim 20, wherein the adjustments to the dynamic 3D model include addition of one or more objects as indicated by the artistic control metadata, and wherein the addition of the one or more objects includes generating new points in the dynamic 3D model for the one or more added objects according to an effects model indicated by the artistic control metadata, and wherein the applied texture values are applied to the new points according to the effects model.

25. The computer system of claim 20, wherein, for a given one of the points of the adjusted dynamic 3D model, the rendering component is configured to, as part of applying the texture values, use texture weights to blend texture values from different ones of the texture maps, and wherein the rendering component is configured to apply the texture values for points of the adjusted dynamic 3D model included in the view.

* * * * *